(12) United States Patent
Zuchoski et al.

(10) Patent No.: US 9,505,451 B2
(45) Date of Patent: Nov. 29, 2016

(54) ENDLESS TRACK FOR TRACTION OF AN OFF-ROAD VEHICLE SUCH AS AN ALL-TERRAIN VEHICLE (ATV) OR A SNOWMOBILE

(71) Applicant: Camoplast Solideal Inc., Sherbrooke (CA)

(72) Inventors: Jeremie Zuchoski, Sherbrooke (CA); Bernard Jean, St-Mathieu du Parc (CA)

(73) Assignee: Camso Inc., Magog (CA)

( * ) Notice: Subject to any disclaimer, the term of this patent is extended or adjusted under 35 U.S.C. 154(b) by 939 days.

(21) Appl. No.: 13/649,312

(22) Filed: Oct. 11, 2012

(65) Prior Publication Data

US 2014/0103704 A1 Apr. 17, 2014

(51) Int. Cl.
*B62D 55/24* (2006.01)
*B62D 55/04* (2006.01)
*B62D 55/12* (2006.01)
*B62D 55/14* (2006.01)

(52) U.S. Cl.
CPC ............ *B62D 55/04* (2013.01); *B62D 55/12* (2013.01); *B62D 55/14* (2013.01); *B62D 55/24* (2013.01); *B62D 55/244* (2013.01)

(58) Field of Classification Search
CPC ...... B62D 55/04; B62D 55/12; B62D 55/14; B62D 55/24; B62D 55/244
USPC ....... 305/165, 168, 178, 179, 180, 146, 151, 305/190, 191; 180/9, 9.1, 9.3, 10
See application file for complete search history.

(56) References Cited

U.S. PATENT DOCUMENTS

| D216,301 | S | 12/1969 | Chaumont |
| 3,582,144 | A * | 6/1971 | Woolard .................. 406/88 |
| 3,582,154 | A | 6/1971 | Russ, Sr. |
| D222,247 | S | 10/1971 | Perreault |
| 3,637,267 | A | 1/1972 | Bombardier et al. |
| 3,754,798 | A | 8/1973 | Chaumont |
| 3,756,668 | A | 9/1973 | Russ, Sr. |
| D242,612 | S | 12/1976 | Perreault |
| D243,517 | S | 3/1977 | Belanger |
| D260,899 | S | 9/1981 | Joseph et al. |
| D283,206 | S | 4/1986 | Talbot |

(Continued)

FOREIGN PATENT DOCUMENTS

CA 2606039 4/2009

OTHER PUBLICATIONS

Goodwin, Mark Alan, "*Ex Parte Quayle* Office Action", U.S. Appl. No. 29/434,240, mailed on Dec. 21, 2012 (7 pages).

(Continued)

*Primary Examiner* — S. Joseph Morano
*Assistant Examiner* — Jean Charleston
(74) *Attorney, Agent, or Firm* — Fish & Richardson P.C.

(57) ABSTRACT

An endless track for traction of an off-road vehicle, such as an all-terrain vehicle (ATV) or a snowmobile. The endless track comprises an inner side for facing track-contacting wheels around which it is mountable and a ground-engaging outer side for engaging the ground. The ground-engaging outer side comprises a plurality of traction projections distributed along a longitudinal direction of the endless track. The traction projections may be designed to control rigidity characteristics, such as a longitudinal rigidity and a widthwise rigidity, of the endless track, while maintaining a weight of the endless track relatively low.

41 Claims, 39 Drawing Sheets

(56) References Cited

U.S. PATENT DOCUMENTS

| | | |
|---|---|---|
| D298,018 S | 10/1988 | Cartwright |
| D302,017 S | 7/1989 | Grawey et al. |
| D376,996 S | 12/1996 | Soucy et al. |
| D380,419 S | 7/1997 | Thompson et al. |
| D386,721 S | 11/1997 | Bedard |
| D389,428 S | 1/1998 | Dandurand |
| D389,429 S | 1/1998 | Dandurand |
| D389,430 S | 1/1998 | Dandurand |
| D389,431 S | 1/1998 | Dandurand |
| D389,432 S | 1/1998 | Dandurand |
| D389,433 S | 1/1998 | Dandurand |
| D389,434 S | 1/1998 | Dandurand |
| D389,435 S | 1/1998 | Dandurand |
| 5,713,645 A | 2/1998 | Thompson et al. |
| 5,730,510 A | 3/1998 | Courtemanche |
| D393,607 S | 4/1998 | Dandurand |
| D394,615 S | 5/1998 | Dandurand |
| D408,326 S | 4/1999 | Dandurand |
| 6,109,705 A | 8/2000 | Courtemanche |
| D431,015 S | 9/2000 | Lussier |
| D436,892 S | 1/2001 | Soucy et al. |
| 6,406,655 B1 | 6/2002 | Courtemanche |
| 6,575,540 B2 | 6/2003 | Soucy et al. |
| 6,626,258 B1 | 9/2003 | Forbes |
| 6,935,708 B2 * | 8/2005 | Courtemanche ............ 305/165 |
| D511,481 S | 11/2005 | Sampson |
| D565,605 S | 4/2008 | Tateishi |
| D567,823 S | 4/2008 | Hagio |
| 7,367,637 B2 * | 5/2008 | Gleasman ................ 305/165 |
| D588,169 S | 3/2009 | Hagio |
| D619,930 S | 7/2010 | Faucher et al. |
| D636,793 S | 4/2011 | Vladimirovich |

OTHER PUBLICATIONS

Goodwin, Mark Alan, "*Ex Parte Quayle* Office Action", U.S. Appl. No. 29/434,244, mailed on Dec. 21, 2012 (7 pages).

International Search Report and Written Opinion; PCT/CA2013/000864; Jan. 31, 2014; 8 pp.

\* cited by examiner

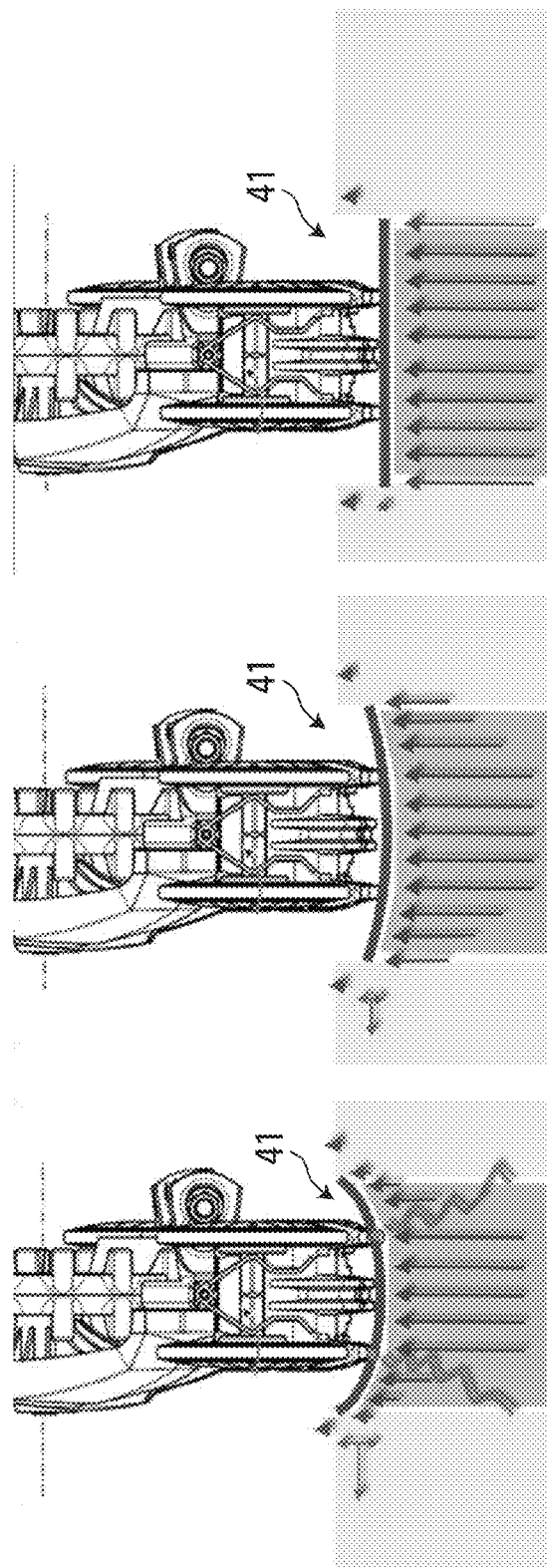

ENDLESS TRACK FOR TRACTION OF AN OFF-ROAD VEHICLE SUCH AS AN ALL-TERRAIN VEHICLE (ATV) OR A SNOWMOBILE

FIELD OF THE INVENTION

The invention relates generally to off-road vehicles such as all-terrain vehicles (ATVs) and snowmobiles and, more particularly, to endless tracks for providing traction to ATVs, snowmobiles and other off-road vehicles.

BACKGROUND

Certain off-road vehicles, such as snowmobiles and all-terrain vehicles (ATVs), may be equipped with elastomeric endless tracks which enhance their traction and floatation on soft, slippery and/or irregular grounds (e.g., soil, mud, sand, ice, snow, etc.) on which they operate Traction, floatation and other performance aspects of tracked vehicles depend on various factors, including their endless tracks.

For example, rigidity characteristics of an endless track can have a significant influence on traction, floatation and other performance aspects of a vehicle propelled by the track. For instance, while the track needs to be longitudinally flexible to flex around a track-engaging assembly (e.g., comprising a drive wheel and roller wheels) of the vehicle, large deflections of a bottom run of the track (e.g., in gaps between adjacent rollers wheels) may occur if the track's longitudinal flexibility is too great, thereby detrimentally affecting traction and pressure distribution on the ground. Also, the track may comprise transversal stiffening rods such that it is very rigid transversally or may be free of transversal stiffening rods such that it is very flexible transversally, but a very high transversal rigidity or flexibility may present drawbacks (e.g., poor traction on uneven ground areas if too rigid transversally, poor floatation if too flexible transversally, etc.).

For these and other reasons, there is a need to improve endless tracks for ATVs, snowmobiles and other off-road vehicles.

SUMMARY OF THE INVENTION

According to an aspect of the invention, there is provided an endless track for traction of an off-road vehicle. The endless track is mountable around a plurality of track-contacting wheels which includes a drive wheel for driving the endless track. The endless track comprises elastomeric material allowing the endless track to flex around the track-contacting wheels. The endless track comprises an inner side for facing the track-contacting wheels and a ground-engaging outer side for engaging the ground. The ground-engaging outer side comprises a plurality of traction projections distributed along a longitudinal direction of the endless track. Each traction projection of the plurality of traction projections comprises: a transversal protrusion extending transversally to the longitudinal direction of the endless track; and an enlarged protrusion larger in the longitudinal direction of the endless track than the transversal protrusion of the traction projection. The enlarged protrusions of the traction projections are dimensioned and disposed relative to one another to enhance a rigidity of a bottom run of the endless track in the longitudinal direction of the endless track.

According to another aspect of the invention, there is provided an endless track for traction of an off-road vehicle. The endless track is mountable around a plurality of track-contacting wheels which includes (i) a drive wheel for driving the endless track and (ii) a plurality of roller wheels for rolling on a bottom run of the endless track. The endless track comprises elastomeric material allowing the endless track to flex around the track-contacting wheels. The endless track comprises an inner side for facing the track-contacting wheels and a ground-engaging outer side for engaging the ground. The ground-engaging outer side comprises a plurality of traction projections distributed along a longitudinal direction of the endless track. Each traction projection of the plurality of traction projections comprises: a transversal protrusion extending transversally to the longitudinal direction of the endless track; and an enlarged protrusion larger in the longitudinal direction of the endless track than the transversal protrusion of the traction projection. The enlarged protrusions of the traction projections are dimensioned and disposed relative to one another to oppose a tendency of the bottom run of the endless track to flex inwardly in a gap between adjacent ones of the roller wheels.

According to another aspect of the invention, there is provided an endless track for traction of an off-road vehicle. The endless track is mountable around a plurality of track-contacting wheels which includes a drive wheel for driving the endless track. The endless track comprises elastomeric material allowing the endless track to flex around the track-contacting wheels. The endless track comprises an inner side for facing the track-contacting wheels and a ground-engaging outer side for engaging the ground. The ground-engaging outer side comprises a plurality of traction projections distributed along a longitudinal direction of the endless track. Each traction projection of the plurality of traction projections comprises: a transversal protrusion extending transversally to the longitudinal direction of the endless track; and an enlarged protrusion larger in the longitudinal direction of the endless track than the transversal protrusion of the traction projection. A ratio of (i) a width of the enlarged protrusion of a first one of the traction projections in the longitudinal direction of the endless track over (ii) a longitudinal spacing of the first one of the traction projections and a second one of the traction projections which succeeds the first one of the traction projections in the longitudinal direction of the endless track is at least 0.8.

According to another aspect of the invention, there is provided an endless track for traction of an off-road vehicle. The endless track is mountable around a plurality of track-contacting wheels which includes a drive wheel for driving the endless track. The endless track comprises elastomeric material allowing the endless track to flex around the track-contacting wheels. The endless track comprises an inner side for facing the track-contacting wheels and a ground-engaging outer side for engaging the ground. The ground-engaging outer side comprises a plurality of traction projections distributed along a longitudinal direction of the endless track. Each traction projection of the plurality of traction projections comprises: a transversal protrusion extending transversally to the longitudinal direction of the endless track; a first enlarged protrusion larger in the longitudinal direction of the endless track than the transversal protrusion of the traction projection; and a second enlarged protrusion larger in the longitudinal direction of the endless track than the transversal protrusion of the traction projection. The first enlarged protrusion and the second enlarged protrusion of the traction projection are spaced apart in a widthwise direction of the endless track. The first enlarged protrusion of the traction projection is larger in the longitudinal direction of the endless track than the second enlarged protrusion of the traction projection.

According to another aspect of the invention, there is provided an endless track for traction of an off-road vehicle. The endless track is mountable around a plurality of track-contacting wheels which includes a drive wheel for driving the endless track. The endless track comprises elastomeric material allowing the endless track to flex around the track-contacting wheels. The endless track comprises an inner side for facing the track-contacting wheels and a ground-engaging outer side for engaging the ground. The ground-engaging outer side comprises a plurality of traction projections distributed along a longitudinal direction of the endless track. Each traction projection of the plurality of traction projections extends transversally to the longitudinal direction of the endless track. A ratio of (i) a bending stiffness of the traction projection in a widthwise direction of the endless track over (ii) a cross-sectional weight per unit length of the traction projection at a cross-section of the traction projection is at least 5000 in.$^3$.

According to another aspect of the invention, there is provided an endless track for traction of an off-road vehicle. The endless track is mountable around a plurality of track-contacting wheels which includes a drive wheel for driving the endless track. The endless track comprises elastomeric material allowing the endless track to flex around the track-contacting wheels. The endless track comprises an inner side for facing the track-contacting wheels and a ground-engaging outer side for engaging the ground. The ground-engaging outer side comprises a plurality of traction projections distributed along a longitudinal direction of the endless track. Each traction projection of the plurality of traction projections extends transversally to the longitudinal direction of the endless track. A cross-section of the traction projection has: a width in the longitudinal direction of the endless track; a minimal dimension in the longitudinal direction of the endless track that is less than the width of the cross-section of the traction projection; and a height in a thickness direction of the endless track. A ratio of the width of the cross-section of the traction projection over the minimal dimension of the cross-section of the traction projection in the longitudinal direction of the endless track is at least 4. A ratio of the height of the cross-section of the traction projection over the minimal dimension of the cross-section of the traction projection in the longitudinal direction of the endless track is at least 6.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIG. 30A shows an example of controlled flexion of the endless track in its widthwise direction;

FIG. 30B shows a situation if there was excessive flexion of the endless track in its widthwise direction;

FIG. 30C shows a situation if there was substantially no flexion of the endless track in its widthwise direction;

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1A:
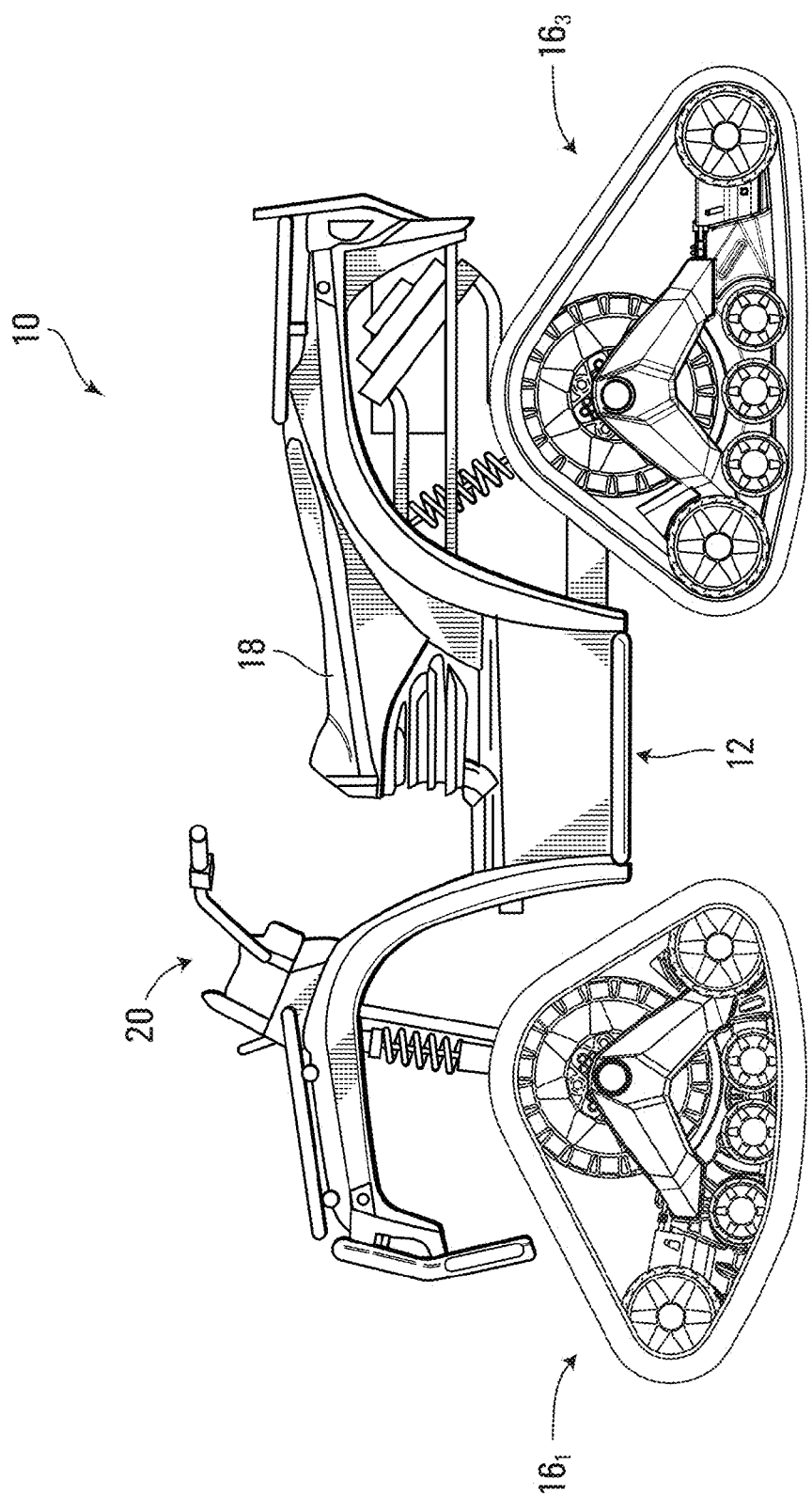
FIGS. 1A and 1B show an example of an all-terrain vehicle (ATV) comprising track assemblies which comprise endless tracks in accordance with an embodiment of the invention.
Figure 1B:
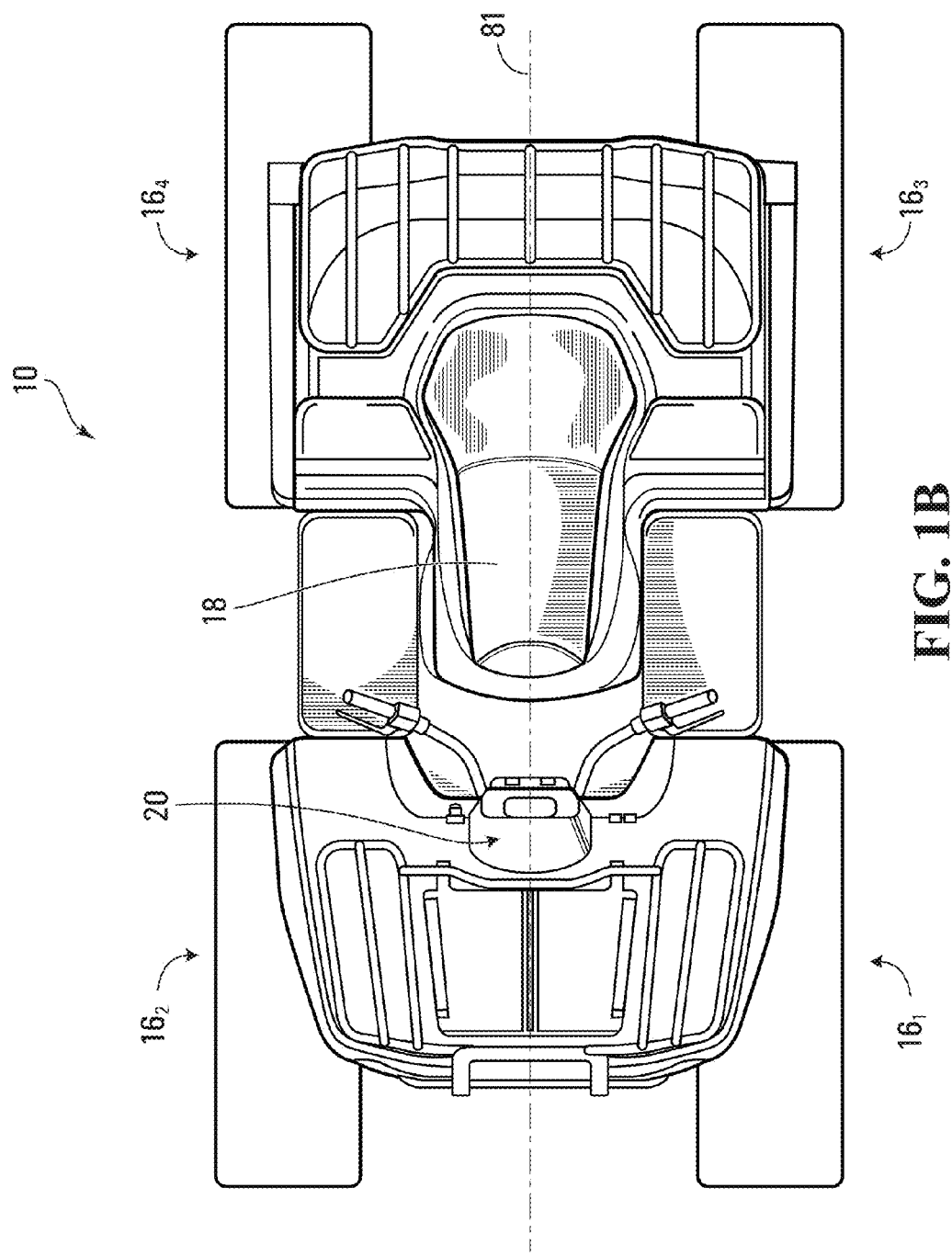

FIGS. 1A and 1B show an example of an all-terrain vehicle (ATV) 10 in accordance with an embodiment of the invention. The ATV 10 is a small open vehicle designed to travel off-road on a variety of terrains, including roadless rugged terrain, for recreational, utility and/or other purposes.

In this embodiment, the ATV 10 comprises a prime mover 12, a plurality of track assemblies $16_1$-$16_4$, a seat 18, and a user interface 20, which enable a user of the ATV to ride the ATV 10 on the ground.

The prime mover 12 is a source of motive power that comprises one or more motors. For example, in this embodiment, the prime mover 12 comprises an internal combustion engine. In other embodiments, the prime mover 12 may comprise another type of motor (e.g., an electric motor) or a combination of different types of motor (e.g., an internal combustion engine and an electric motor).

The prime mover 12 is in a driving relationship with one or more of the track assemblies $16_1$-$16_4$. That is, motive power generated by the prime mover 12 is transmitted to one or more of the track assemblies $16_1$-$16_2$ via a powertrain of the ATV 10 (e.g., via a transmission and a differential of the powertrain).

In this case, the seat 18 is a straddle seat and the ATV 10 is usable by a single person such that the seat 18 accommodates only that person driving the ATV 10. In other cases, the seat 18 may be another type of seat, and/or the ATV 10 may be usable by two individuals, namely one person driving the ATV 10 and a passenger, such that the seat 18 may accommodate both of these individuals (e.g., behind one another or side-by-side) or the ATV 10 may comprise an additional seat for the passenger. For example, in other embodiments, the ATV 10 may be a side-by-side ATV, sometimes referred to as a "utility terrain vehicle" or "UTV".

The user interface 20 allows the user to interact with the ATV 10. More particularly, the user interface 20 comprises an accelerator, a brake control, and a steering device that are operated by the user to control motion of the ATV 10 on the ground. In this case, the steering device comprises handlebars. In other cases, the steering device may comprise a steering wheel or other type of steering element. The user interface 20 also comprises an instrument panel (e.g., a dashboard) which provides indicators (e.g., a speedometer indicator, a tachometer indicator, etc.) to convey information to the user.

The track assemblies $16_1$-$16_4$ engage the ground to provide traction to the ATV 10. More particularly, in this example, front ones of the track assemblies $16_1$-$16_4$ provide front traction to the ATV 10 while rear ones of the track assemblies $16_1$-$16_4$ provide rear traction to the ATV 10. Each of the front ones of the track assemblies $16_1$-$16_4$ is pivotable about a steering axis of the ATV 10 in response to input of the user at the handlebars in order to steer the ATV 10 on the ground.

Figure 2A:
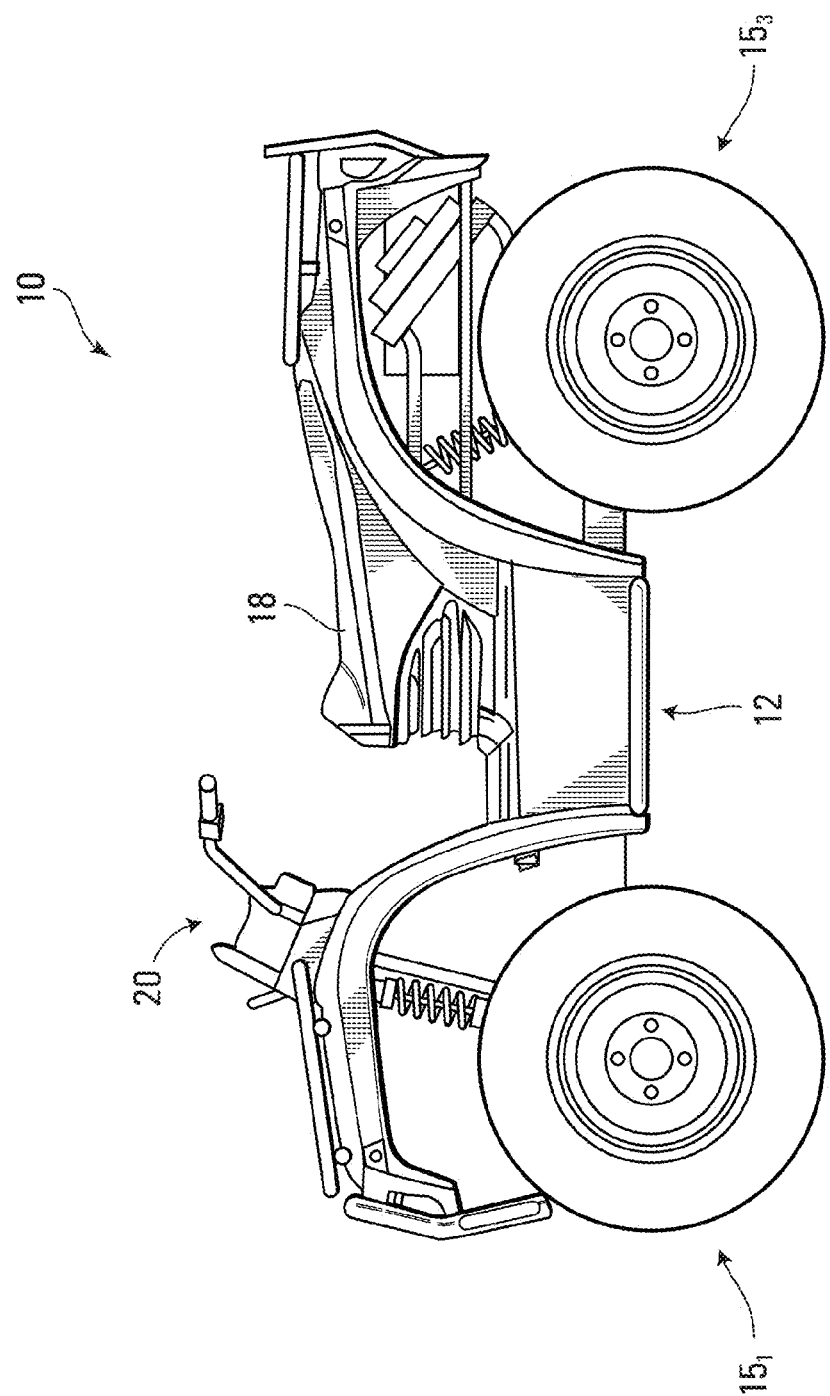
FIGS. 2A and 2B show the ATV equipped with ground-engaging wheels instead of the track assemblies.
Figure 2B:
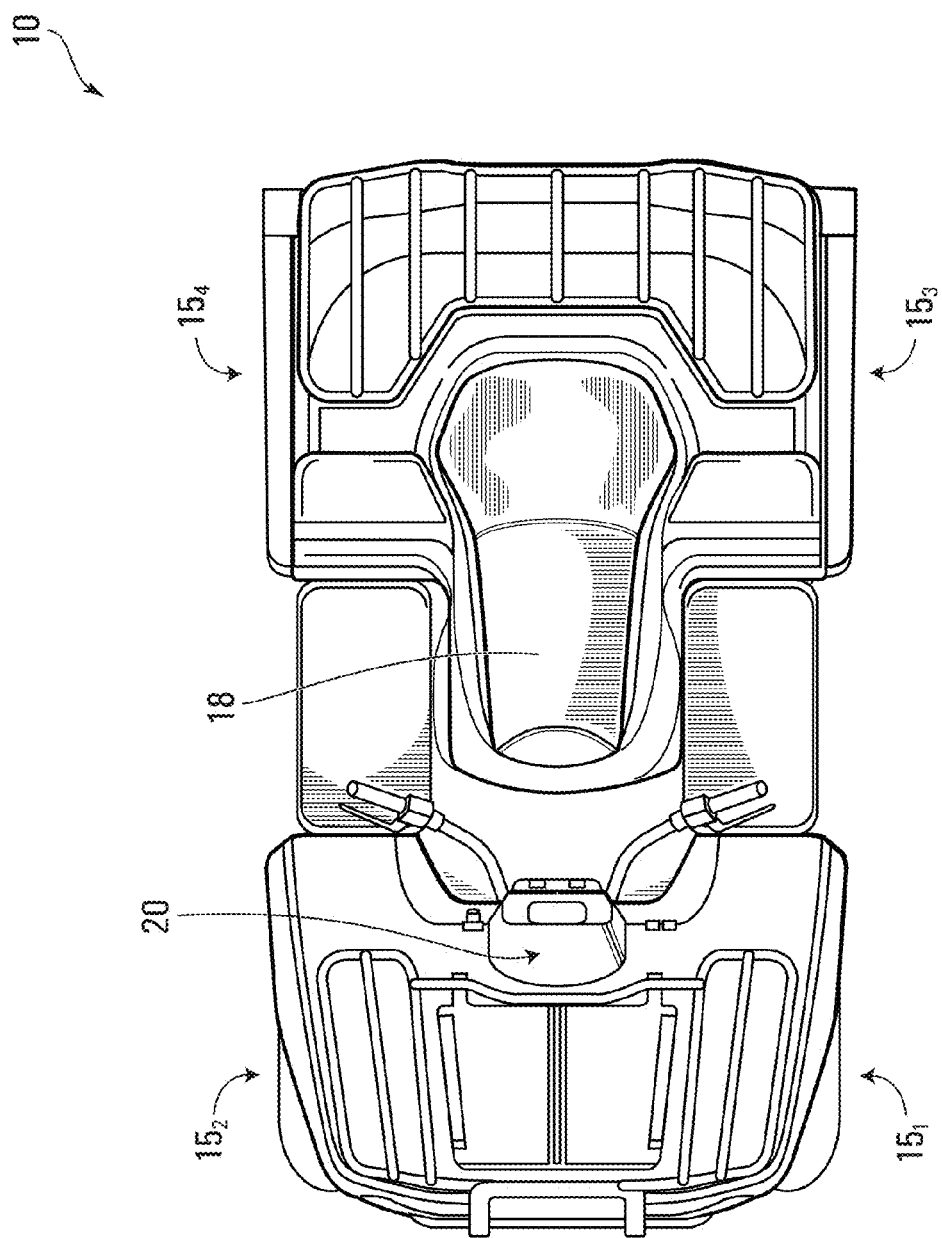
Figure 3:
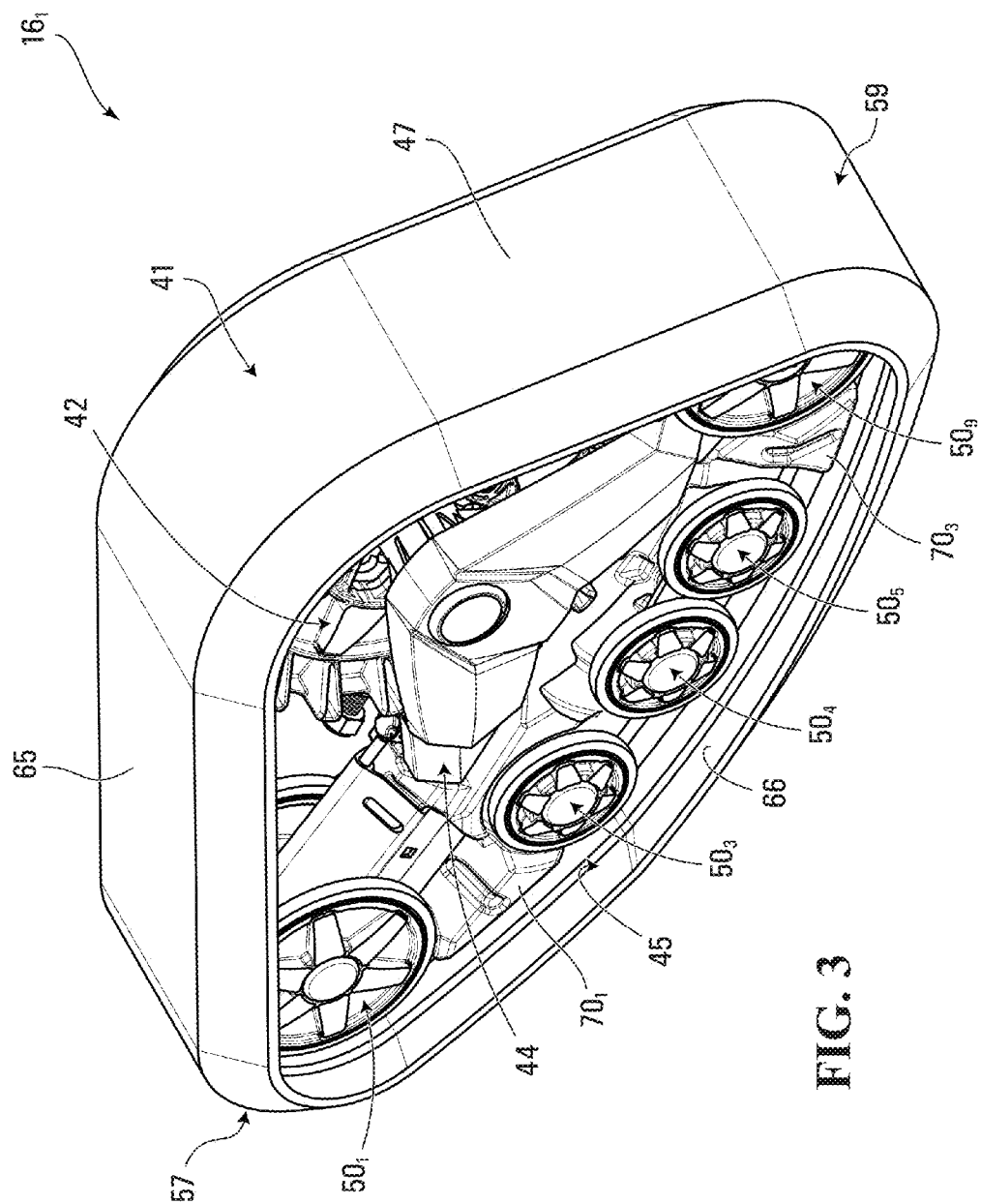
FIGS. 3 and 4 show perspective views of a front one and a rear one of the track assemblies.
Figure 4:
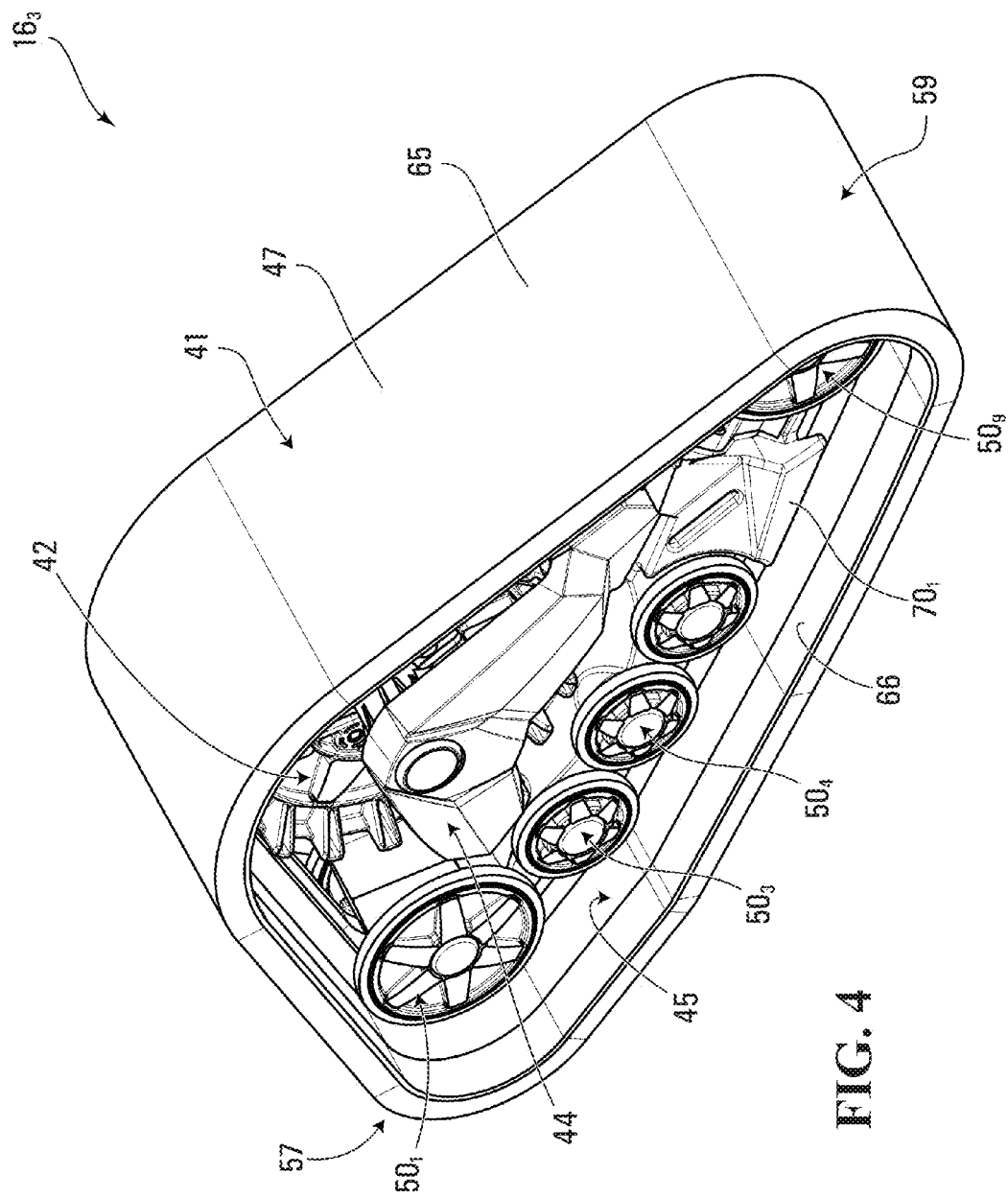
Figure 5:
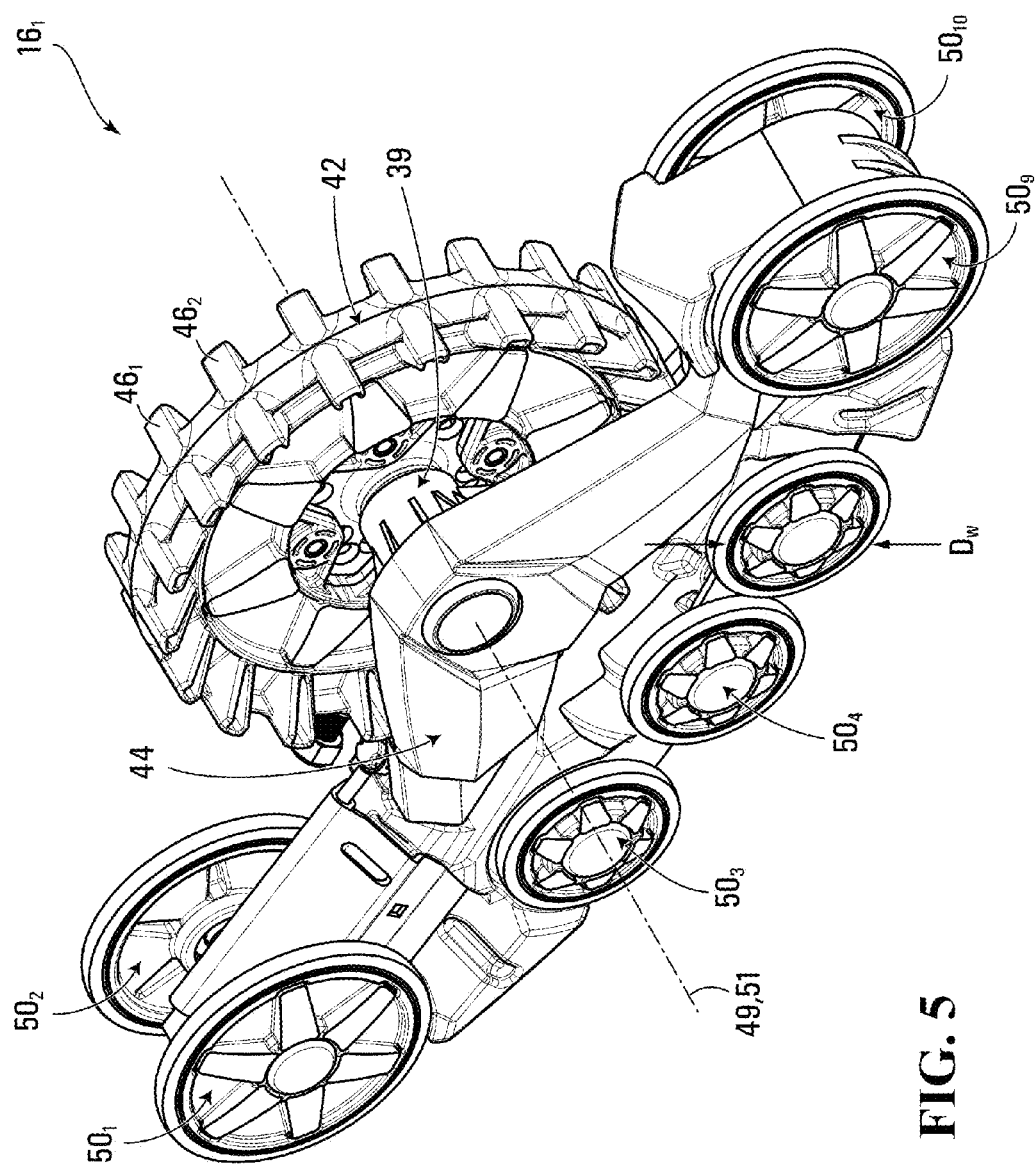
FIGS. 5 and 6 show perspective views of the front one and the rear one of the track assemblies without their endless track.
Figure 6:
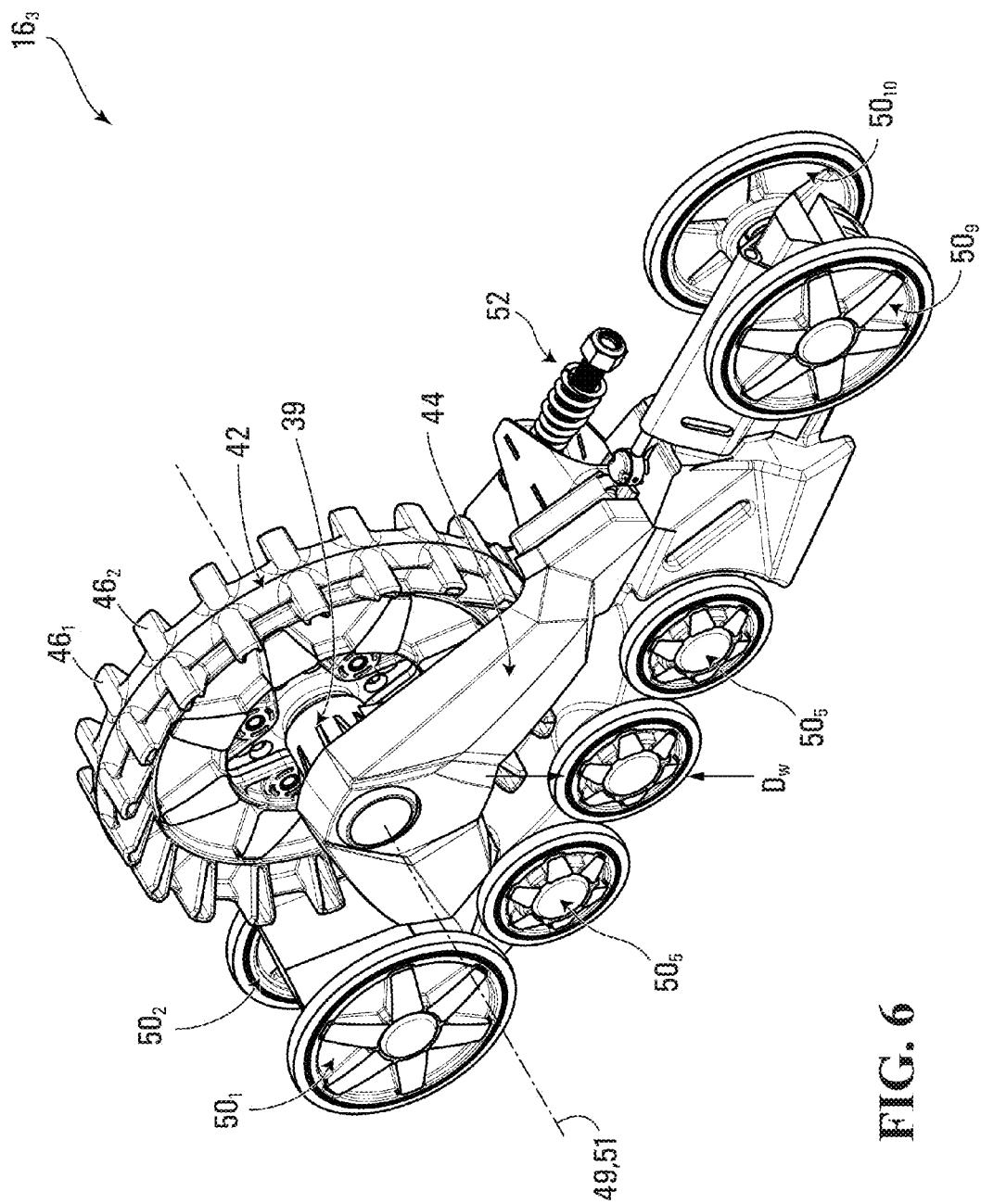
Figure 7:
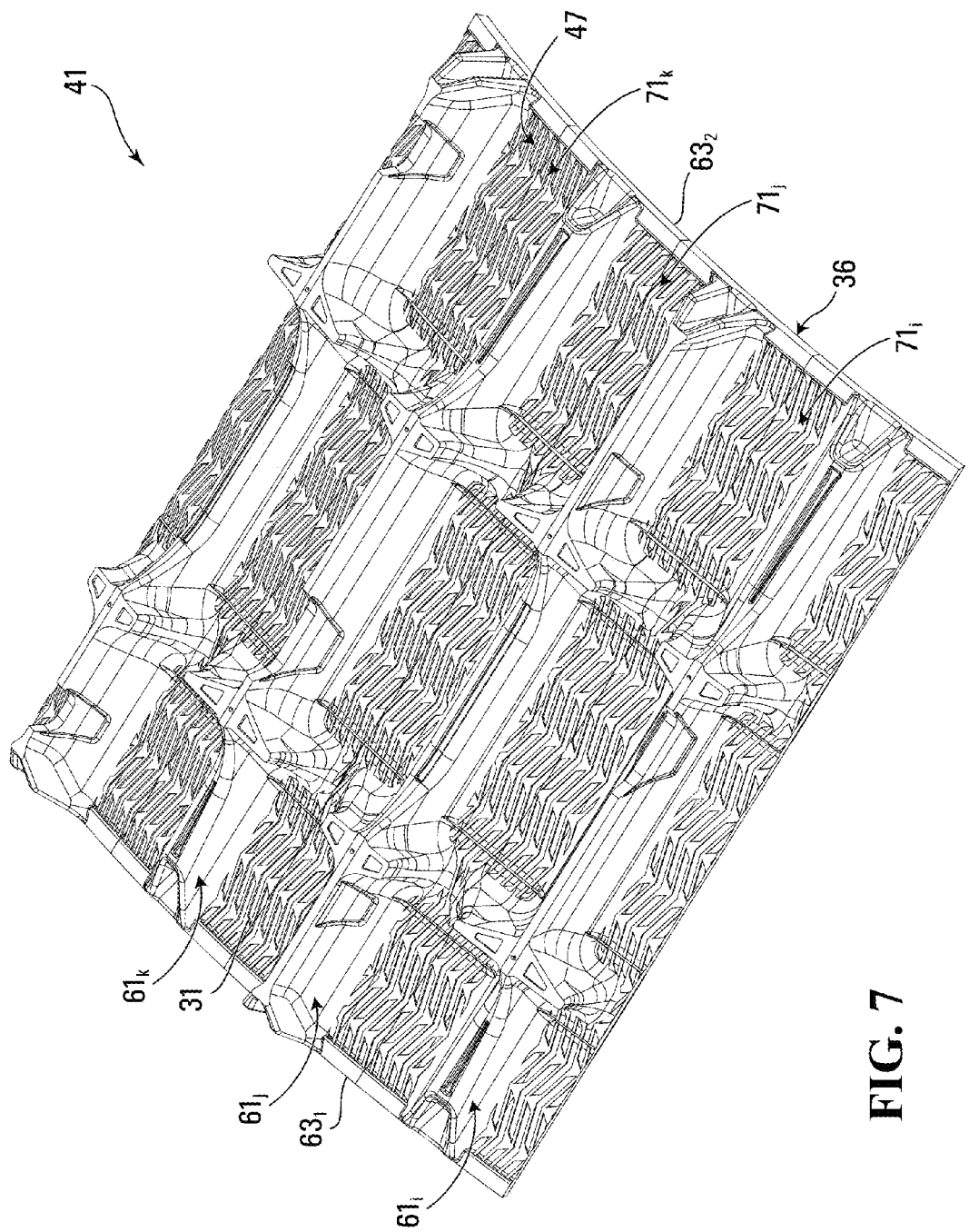
FIGS. 7 and 8 show perspective views of a segment of the endless track of the rear track assembly, which depict features of an inner side and a ground-engaging outer side of the endless track that are not depicted in FIGS. 1A, 1B, 3 and 4, including traction projections of the endless track.
Figure 8:
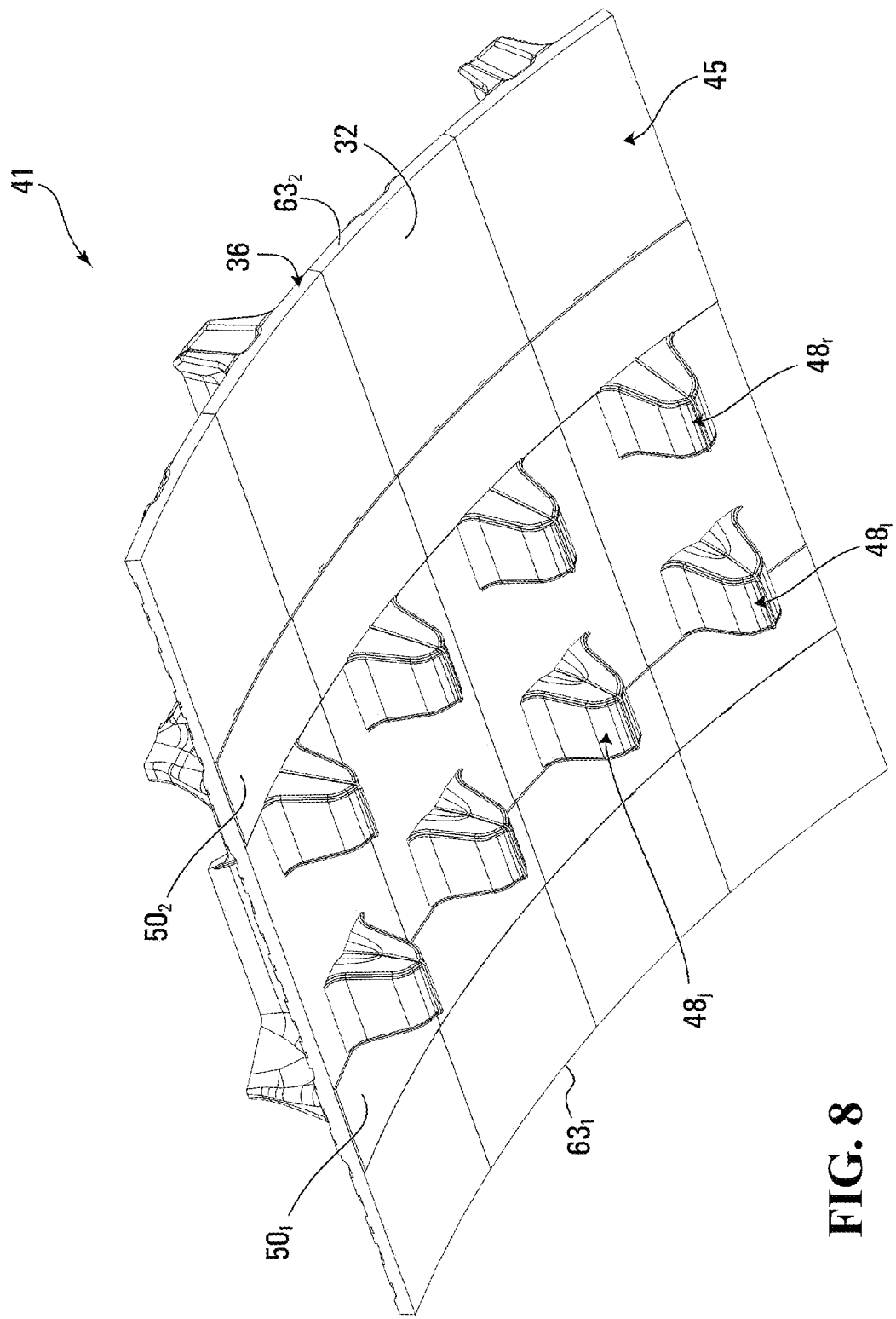
Figure 9:
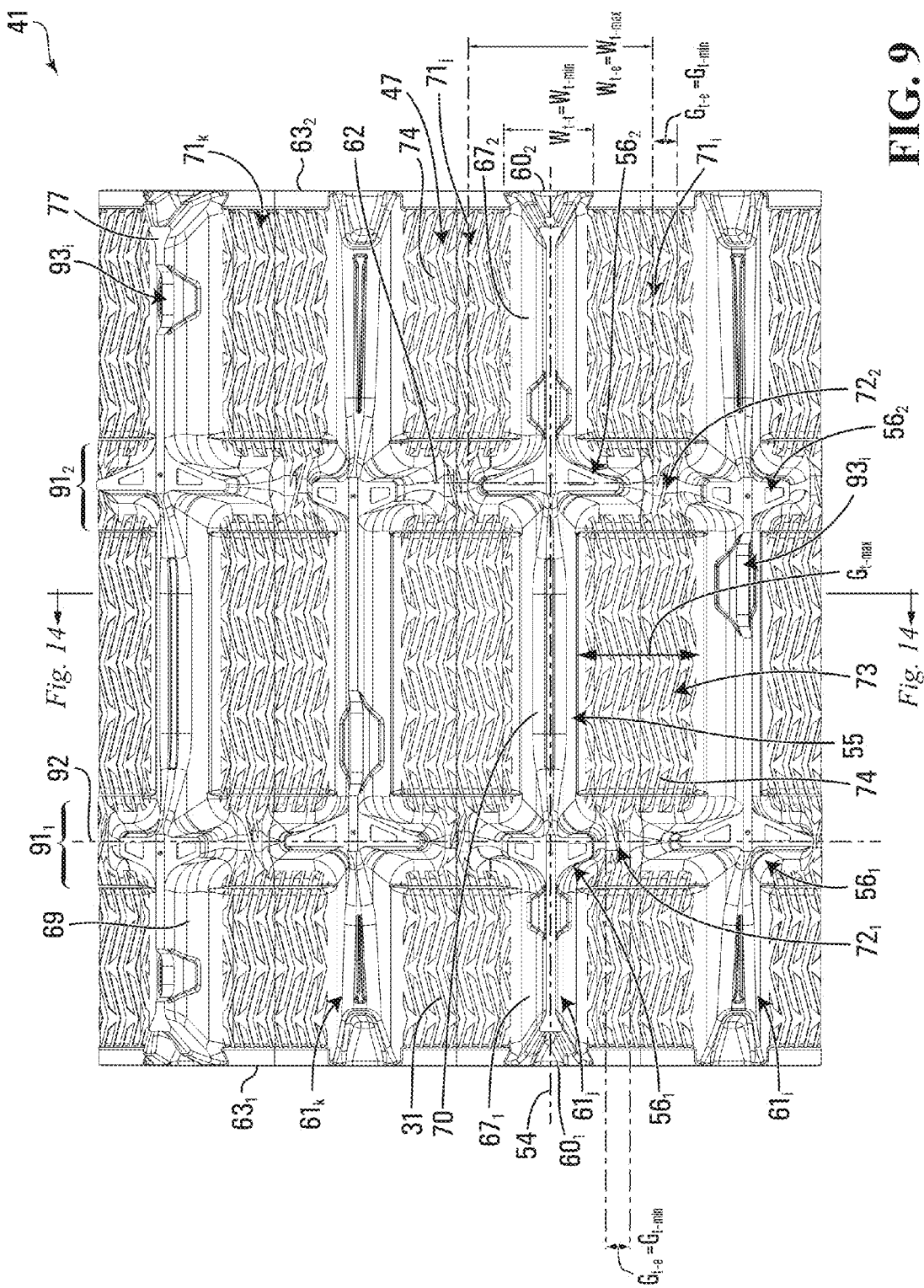
FIGS. 9 and 10 show views of the ground-engaging outer side and the inner side of the endless track of the rear track assembly.

In this embodiment, each track assembly $16_i$ is mounted in place of a ground-engaging wheel that may otherwise be mounted at a position of the track assembly $16_i$ to propel the ATV 10 on the ground. For example, as shown in FIGS. 2A and 2B, the ATV 10 may be propelled on the ground by four ground-engaging wheels $15_1$-$15_4$ with tires instead of the track assemblies $16_1$-$16_4$. Basically, in this embodiment, the track assemblies $16_1$-$16_4$ may be used to convert the ATV 10 from a wheeled vehicle into a tracked vehicle, thereby enhancing its traction and floatation on the ground.

With additional reference to FIGS. 3 to 6, in this embodiment, each track assembly $16_i$ comprises a frame 44, a plurality of track-contacting wheels which includes a drive wheel 42 and a plurality of idler wheels $50_1$-$50_{10}$, and an elastomeric endless track 41 disposed around the frame 44 and the wheels 42, $50_1$-$50_{10}$. The track assembly $16_i$ has a front longitudinal end 57 and a rear longitudinal end 59 that define a length of the track assembly $16_i$. A width of the track assembly $16_i$ is defined by a width of the endless track 41. An envelope of the track assembly $16_i$ is defined by a length of the track 41. The track assembly $16_i$ has a longitudinal direction, a widthwise direction, and a height direction.

The elastomeric endless track 41 engages the ground to provide traction to the ATV 10. Referring additionally to FIGS. 7 to 14, the track 41 comprises an inner side 45 facing the wheels 42, $50_1$-$50_{10}$ and defining an inner area of the track 41 in which these wheels are located. The track 41 also comprises a ground-engaging outer side 47 opposite the inner side 45 for engaging the ground on which the ATV 10 travels. Lateral edges $63_1$, $63_2$ of the track 41 define the track's width. The track 41 has a top run 65 which extends between the longitudinal ends 57, 59 of the track assembly $16_i$ and over the drive wheel 42, and a bottom run 66 which extends between the longitudinal ends 57, 59 of the track assembly $16_i$ and under the idler wheels $50_1$-$50_{10}$. The track 41 has a longitudinal direction, a widthwise direction, and a thickness direction.

The endless track 41 is elastomeric in that it comprises elastomeric material allowing it to flex around the wheels 42, $50_1$-$50_{10}$. The elastomeric material of the track 41 can include any polymeric material with suitable elasticity. In this embodiment, the elastomeric material includes rubber. Various rubber compounds may be used and, in some cases, different rubber compounds may be present in different areas of the track 22. In other embodiments, the elastomeric material of the track 41 may include another elastomer in addition to or instead of rubber (e.g., polyurethane elastomer).

While it is flexible, in this embodiment, the endless track 41 has certain rigidity characteristics which are useful for traction and other performance aspects of the track assembly $16_i$, as discussed later.

The endless track 41 comprises an elastomeric belt-shaped body 36 underlying its inner side 45 and its ground-engaging outer side 47. In view of its underlying nature, the body 36 can be referred to as a "carcass". The carcass 36 comprises elastomeric material 37 which allows the track 41 to flex around the wheels 42, $50_1$-$50_{10}$.

Figure 15:
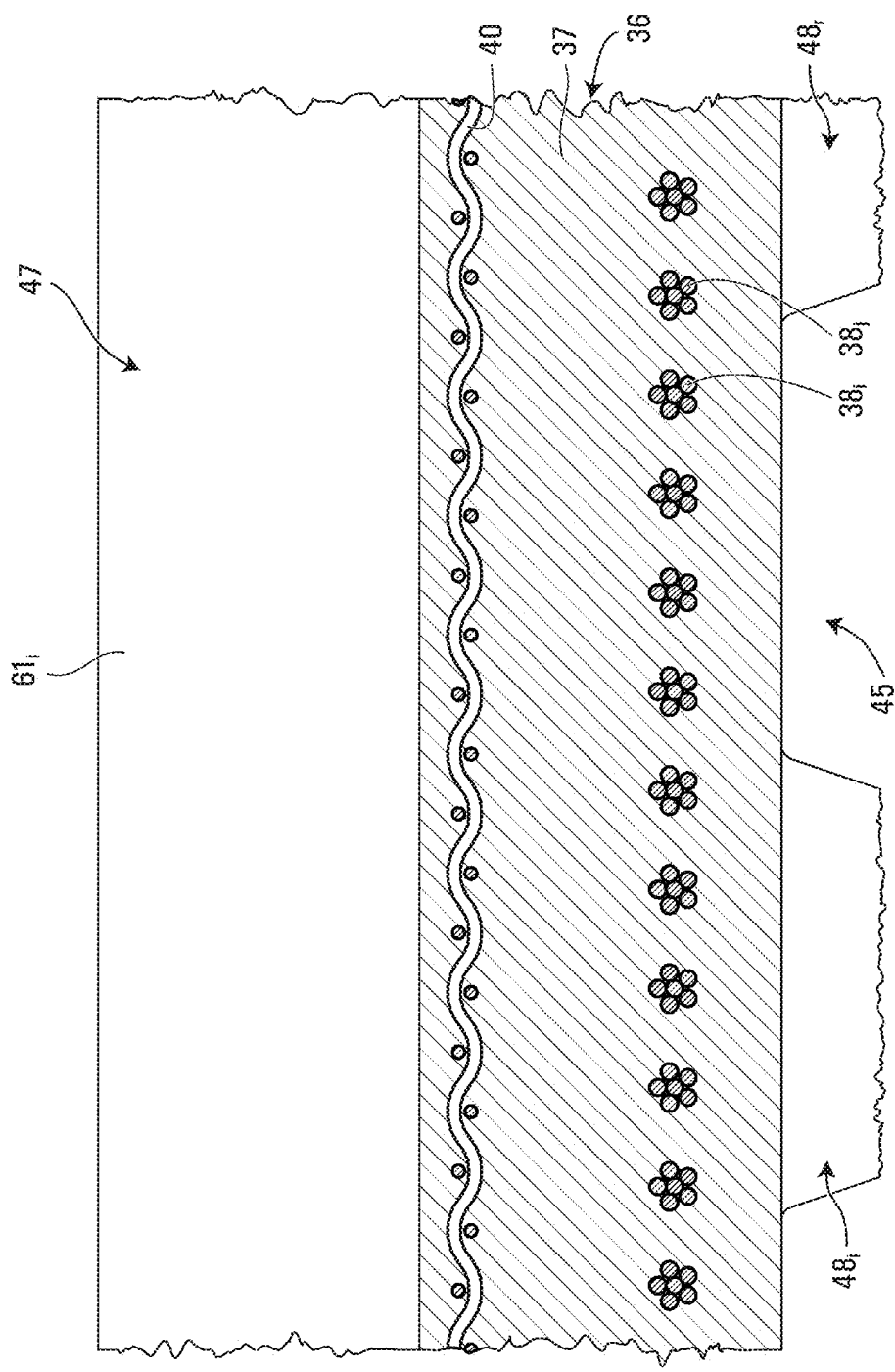
FIG. 15 shows a partial cross-sectional view of the endless track taken in a widthwise direction of the track.

As shown in FIG. 15, in this embodiment, the carcass 36 comprises a plurality of reinforcements embedded in its elastomeric material 37. One example of a reinforcement is a layer of reinforcing cables $38_1$-$38_C$ that are adjacent to one another and that extend in the longitudinal direction of the track 41 to enhance strength in tension of the track 41 along its longitudinal direction. In some cases, a reinforcing cable may be a cord or wire rope including a plurality of strands or wires. In other cases, a reinforcing cable may be another type of cable and may be made of any material suitably flexible longitudinally (e.g., fibers or wires of metal, plastic or composite material). Another example of a reinforcement is a layer of reinforcing fabric 40. Reinforcing fabric comprises pliable material made usually by weaving, felting, or knitting natural or synthetic fibers. For instance, a layer of reinforcing fabric may comprise a ply of reinforcing woven fibers (e.g., nylon fibers or other synthetic fibers). Various other types of reinforcements may be provided in the carcass 36 in other embodiments.

In this embodiment, the inner side 45 of the endless track 41 comprises an inner surface 32 of the carcass 36 and a plurality of wheel-contacting projections $48_1$-$48_N$ that project from the inner surface 32 and contact at least some of the wheels 42, $50_1$-$50_{10}$ and that are used to do at least one of driving (i.e., imparting motion to) the track 41 and guiding the track 41. In that sense, the wheel-contacting projections $48_1$-$48_N$ can be referred to as "drive/guide projections", meaning that each drive/guide projection is used to do at least one of driving the track 41 and guiding the track 41. Also, such drive/guide projections are sometimes referred to as "drive/guide lugs" and will thus be referred to as such herein. More particularly, in this embodiment, the drive/guide lugs $48_1$-$48_N$ interact with the drive wheel 42 in order to cause the track 41 to be driven, and also interact with the idler wheels $50_1$-$50_{10}$ in order to guide the track 41 as it is driven by the drive wheel 42. The drive/guide lugs $48_1$-$48_N$ are thus used to both drive the track 41 and guide the track 41 in this embodiment.

The drive/guide lugs $48_1$-$48_N$ are spaced apart along the longitudinal direction of the endless track 41. In this case, the drive/guide lugs $48_1$-$48_N$ are arranged in a plurality of rows that are spaced apart along the widthwise direction of the endless track 41. The drive/guide lugs $48_1$-$48_N$ may be arranged in other manners in other embodiments (e.g., a single row or more than two rows). Each drive/guide lug $48_i$ is an elastomeric drive/guide lug in that it comprises elastomeric material 68.

The ground-engaging outer side 47 of the endless track 41 comprises a ground-engaging outer surface 31 of the carcass 36 and a plurality of traction projections $61_1$-$61_M$ that project from the outer surface 31 and engage and may penetrate into the ground to enhance traction. The traction projections $61_1$-$61_M$, which can sometimes be referred to as "traction lugs" or "traction profiles", are spaced apart in the longitudinal direction of the track assembly $16_i$. The ground-engaging outer side 47 comprises a plurality of traction-projection-free areas $71_1$-$71_F$ (i.e., areas free of traction projections) between successive ones of the traction projections $61_1$-$61_M$. In this example, each traction projection $61_i$ is an elastomeric traction projection in that it comprises elastomeric material 69.

In this embodiment, respective ones of the traction projections $61_1$-$61_M$ comprise one or more recesses $93_1$-$93_F$ extending from their outer end 77 to enhance traction on certain types of ground surfaces, such as compacted snow and other snow surfaces. For instance, in a traction projection $61_i$ including a recess $93_x$, part of the traction projection's outer end 77 adjacent to the recess $93_x$ can apply more pressure on, and thus can have a greater tendency to penetrate, a compacted snow surface than if the recess $93_x$ was omitted. In this example, the recesses $93_1$-$93_F$ of successive ones of the traction projections $61_1$-$61_M$ are nonaligned in the widthwise direction of the endless track 41. For instance, snow can be compacted as it passes under a recess $93_x$ of a traction projection $61_i$ and a subsequent traction projection $61_k$ passing over the resulting compacted snow, with no recess aligned with the recess $93_x$ of the traction projection $61_i$ in the widthwise direction of the track 41, can engage and have better traction on the compacted snow.

The recesses $93_1$-$93_F$ of the traction projections $61_1$-$61_M$ may have any suitable shape. In this embodiment, the recesses $93_1$-$93_F$ of the traction projections $61_1$-$61_M$ taper in the thickness direction of the endless track 41. Also, in this embodiment, a recess $93_x$ of a traction projection $61_i$ has a depth $d_r$ measured from the outer end 77 of the traction projection $61_i$ which corresponds to a substantial fraction of an overall height $H_{t-o}$ of the traction projection $61_i$. For example, in some embodiments, a ratio $d_r/H_{t-o}$ of the depth $d_r$ of the recess $93_x$ of the traction projection $61_i$ over the overall height $H_{t-o}$ of the traction projection $61_i$ may be at least 0.15, in some cases at least 0.25, in some cases at least 0.35, in some cases at least 0.45, and in some cases even more (e.g., at least 0.50). The ratio $d_r/H_{t-o}$ may have any other suitable value in other embodiments.

In this example, the carcass 36 has a thickness $T_c$ which is relatively small. The thickness $T_c$ of the carcass 36 is measured from the inner surface 32 to the ground-engaging outer surface 31 of the carcass 35 between longitudinally-adjacent ones of the traction projections $61_1$-$61_M$. For example, in some embodiments, the thickness $T_c$ of the carcass 36 may be no more than 0.250 inches, in some cases no more than 0.240 inches, in some cases no more than 0.230 inches, in some cases no more than 0.220 inches, in some cases no more than 0.210 inches, in some cases no more than 0.200 inches, and in some cases even less (e.g., 0.180 or 0.170 inches). The thickness $T_c$ of the carcass 36 may have any other suitable value in other embodiments.

Figure 16:
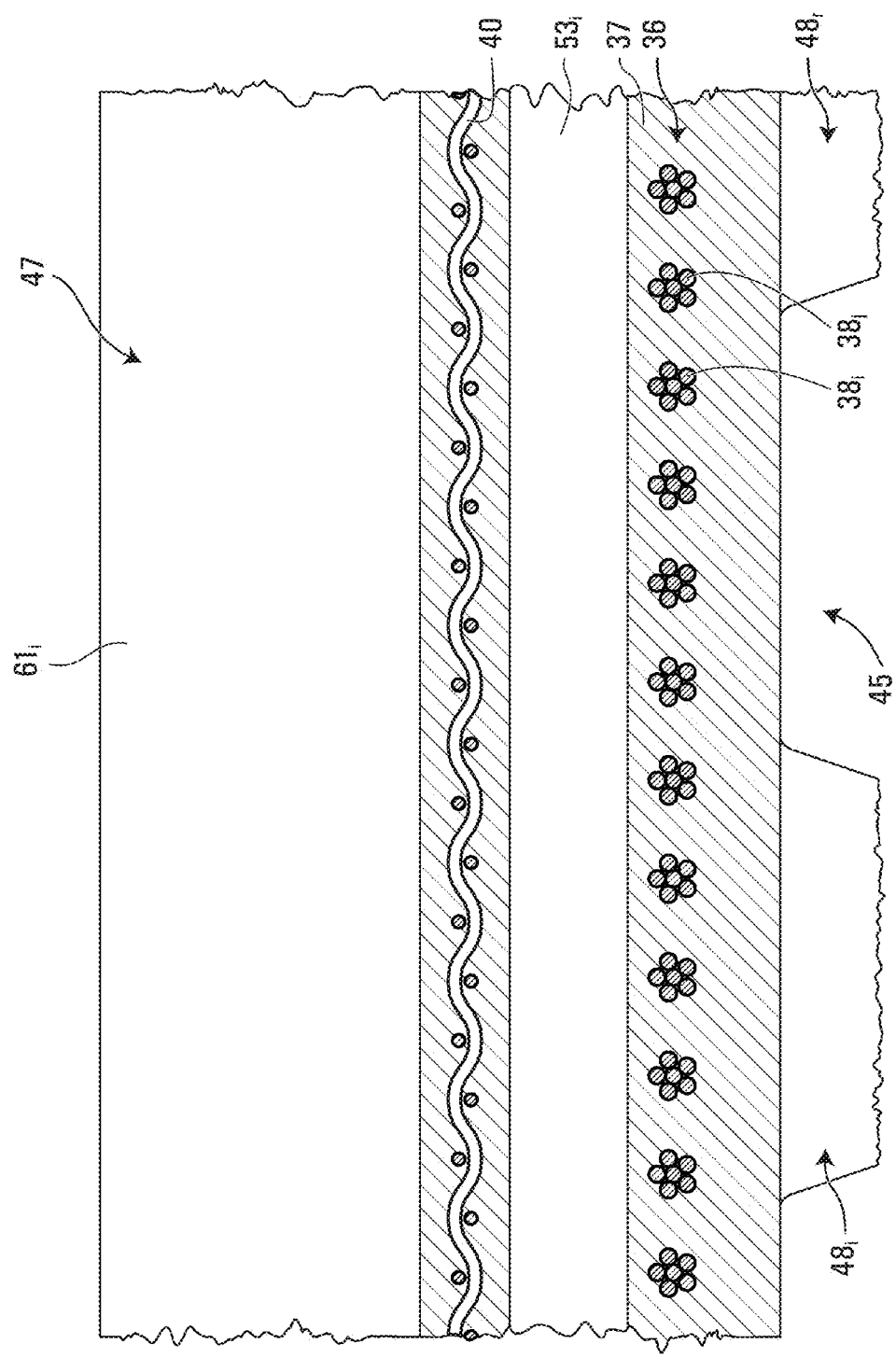
FIG. 16 shows a variant in which the endless track comprises transversal stiffening rods in other embodiments.
Figure 17:
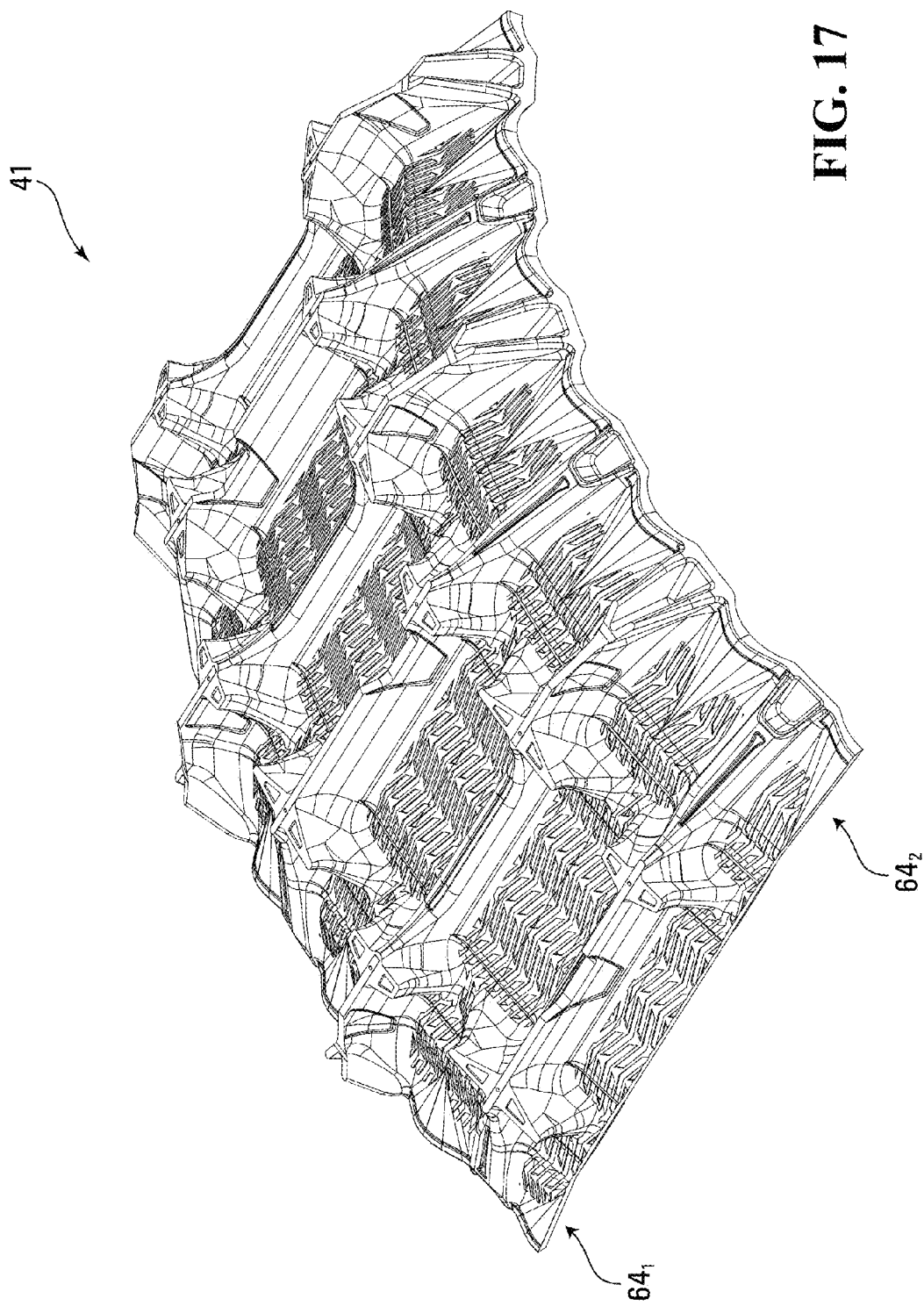
FIGS. 17 to 23 show views of a segment of the endless track of the front track assembly, which depict features of an inner side and a ground-engaging outer side of the endless track that are not depicted in FIGS. 1A, 1B, 3 and 4.
Figure 18:
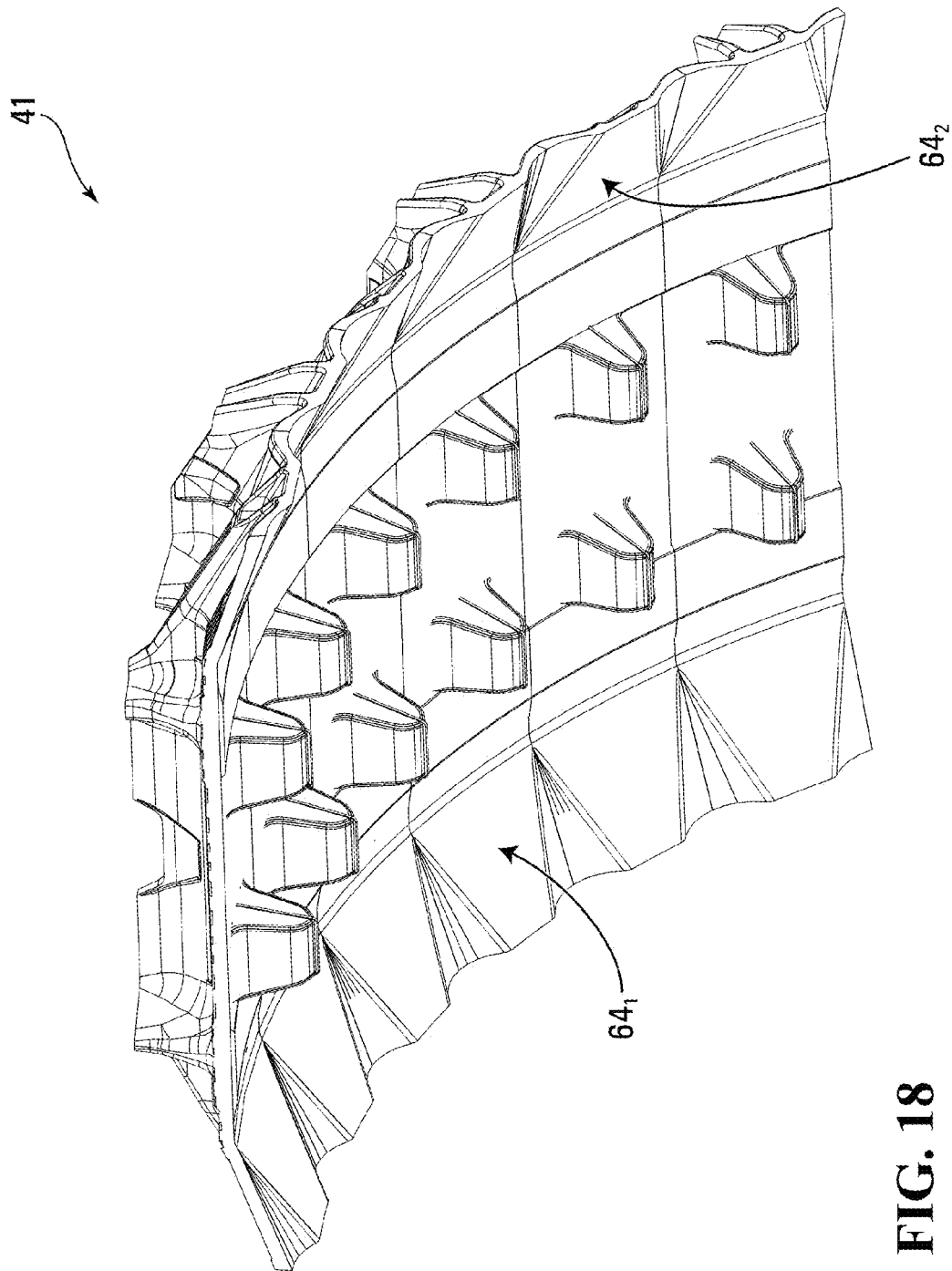
Figure 19:
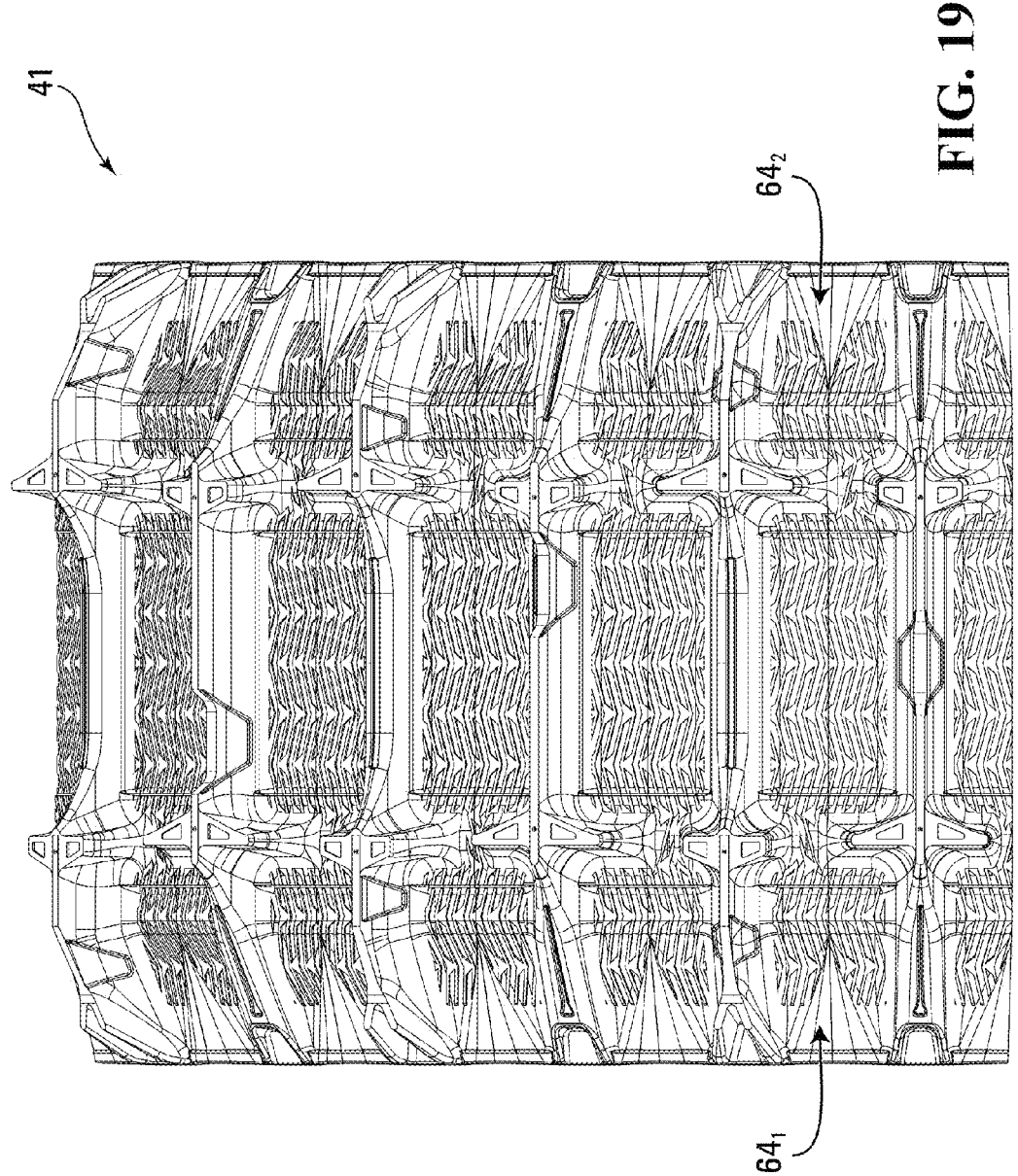
Figure 20:
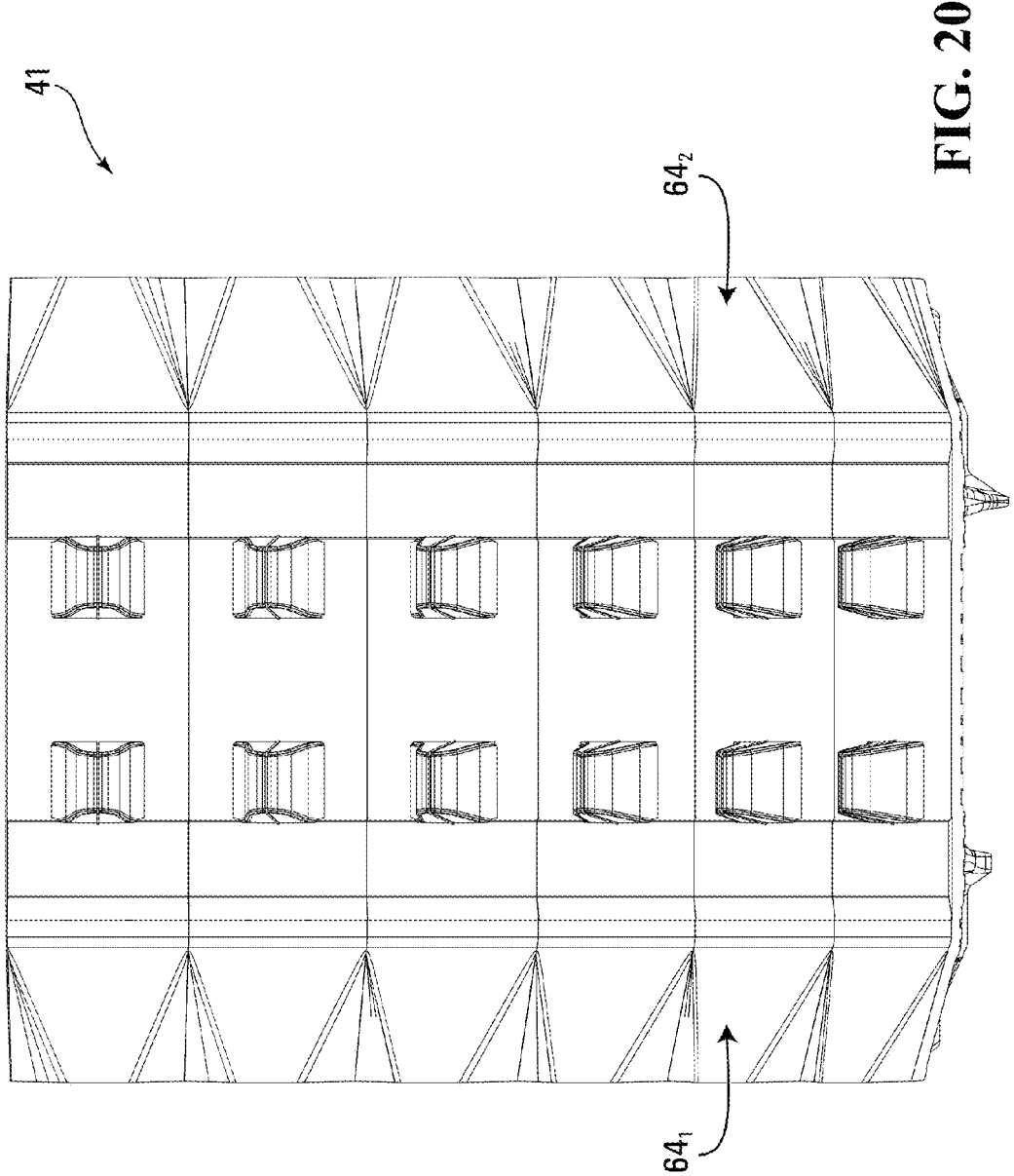
Figure 21:
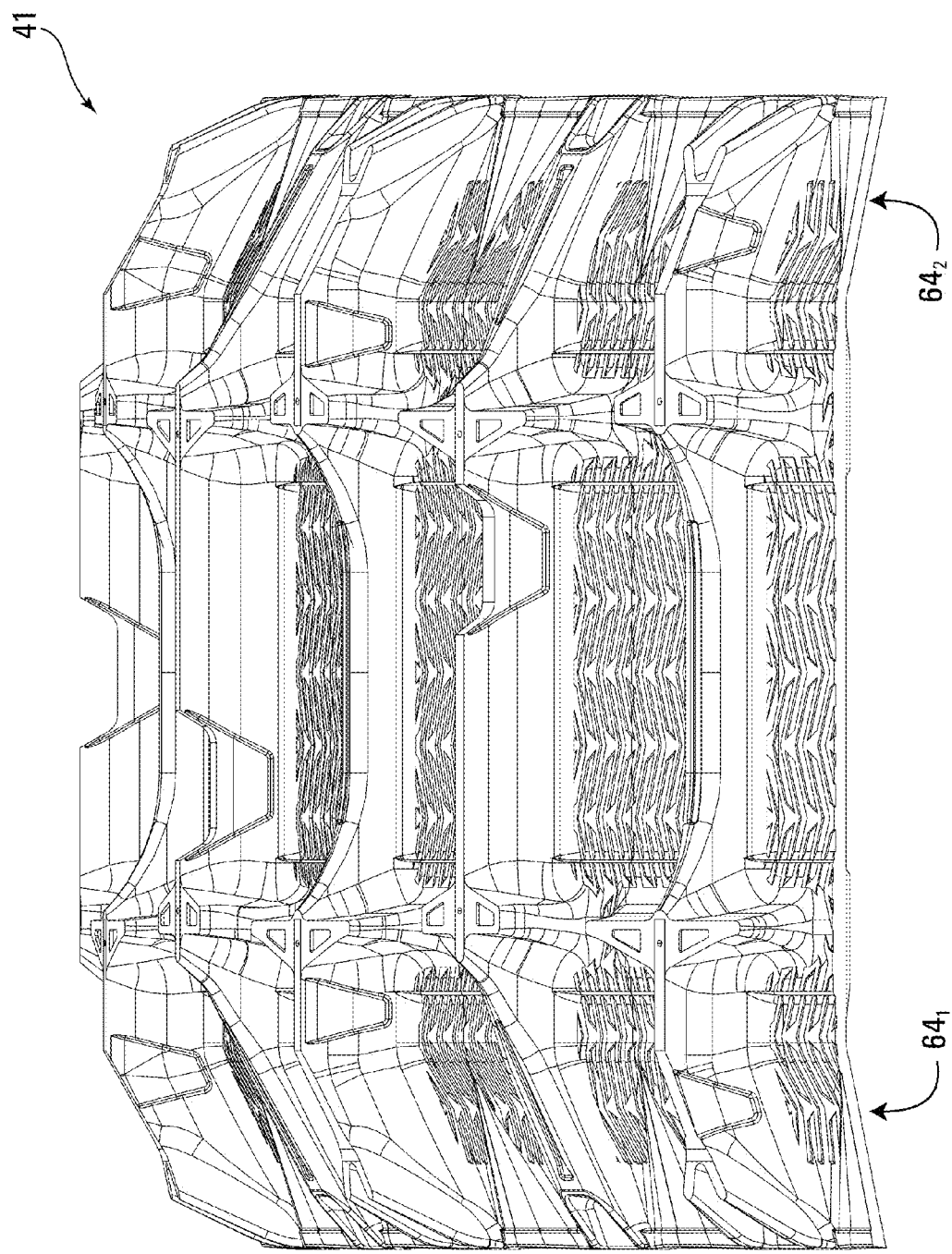
Figure 22:
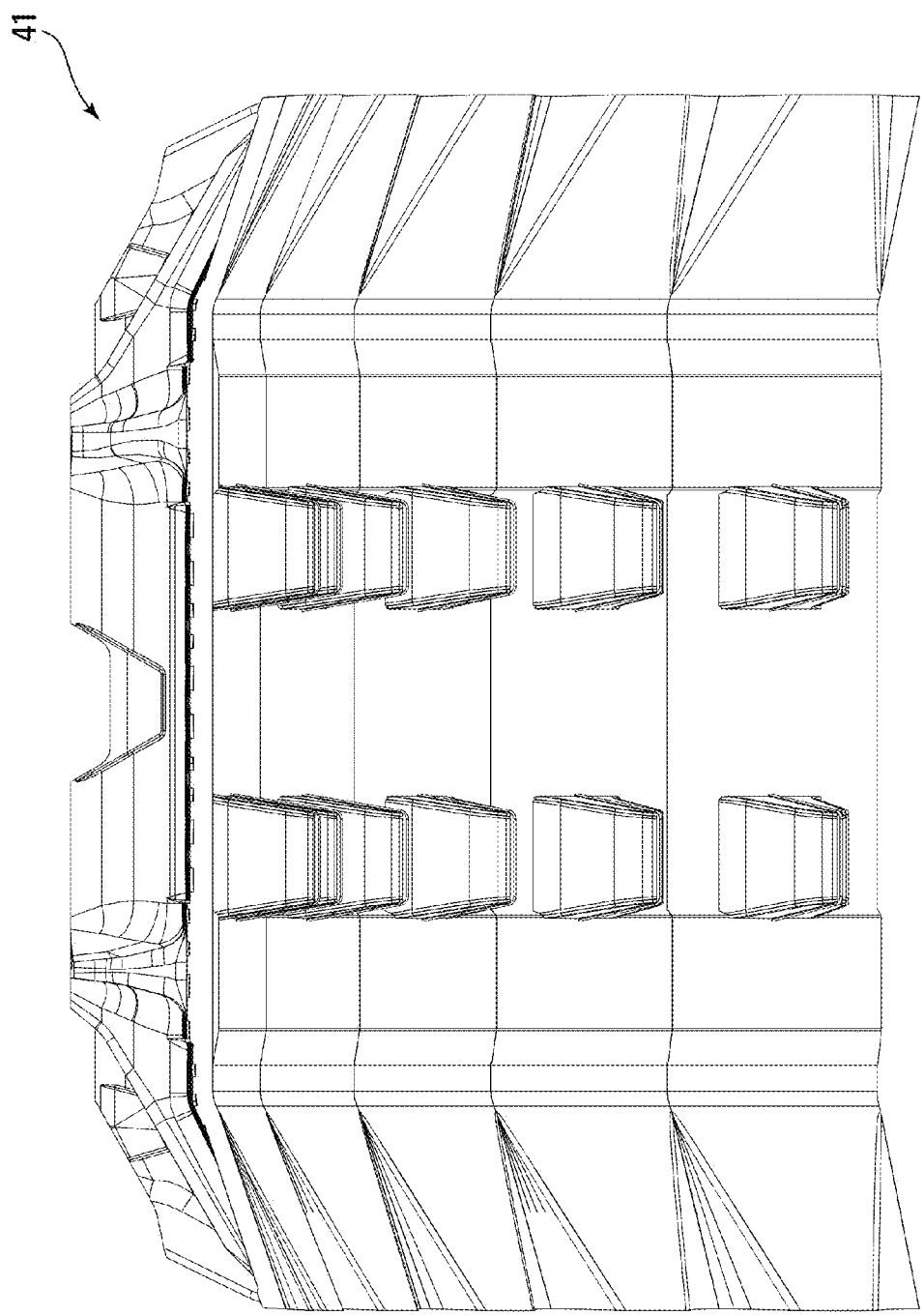
Figure 23:
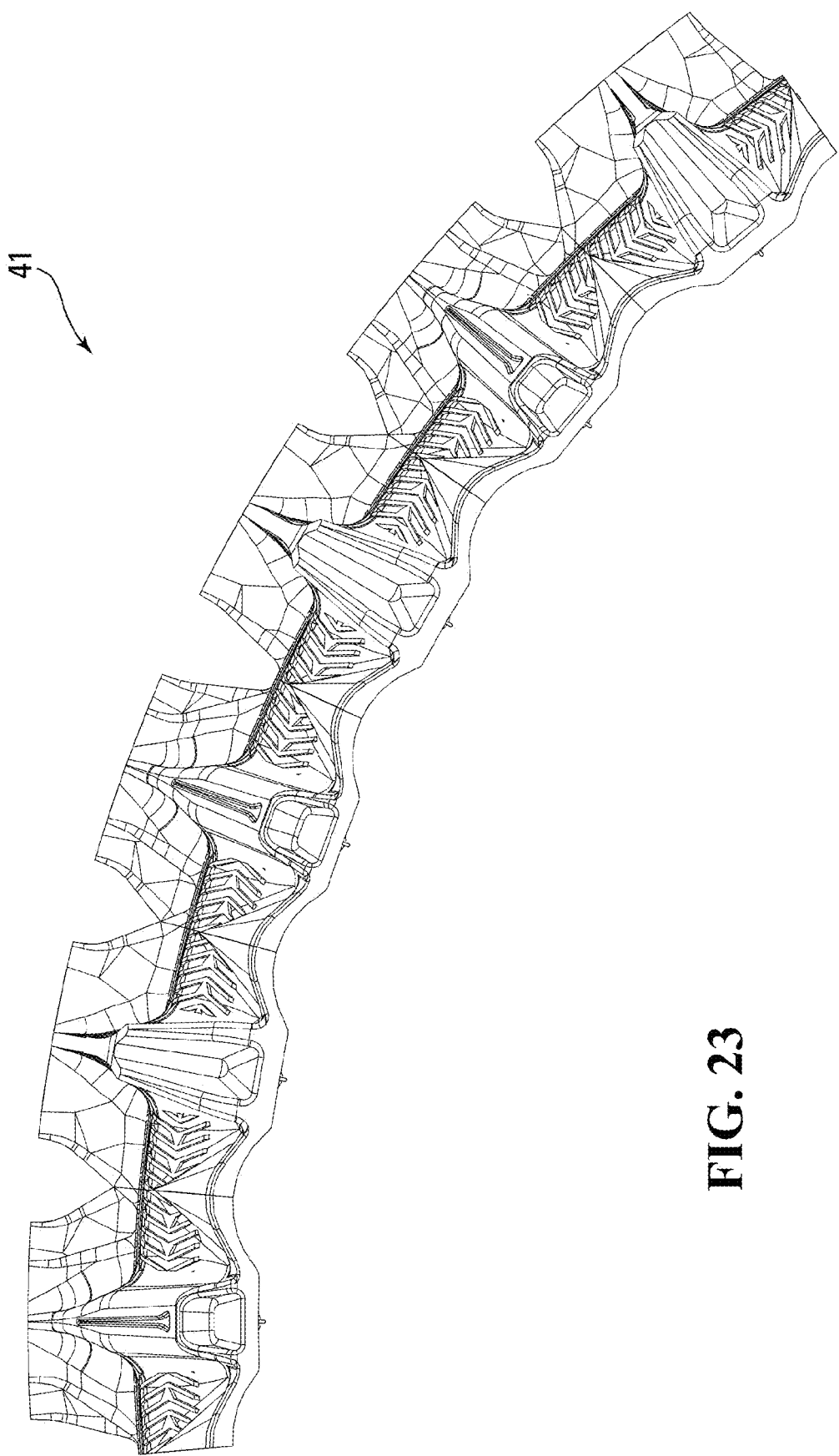

In this embodiment, as shown in FIG. 15, the endless track 41 is free of transversal stiffening rods embedded in its elastomeric material. That is, the track 41 does not comprise transversal stiffening rods embedded in its elastomeric material and extending transversally to its longitudinal direction. FIG. 16 shows a variant in which the track 41 may comprise transversal stiffening rods $53_1$-$53_M$ embedded in its elastomeric material and extending transversally to its longitudinal direction in other embodiments. This absence of transversal stiffening rods makes the track 41 more flexible in its widthwise direction than if the track 41 had the transversal stiffening rods $53_1$-$53_M$ but was otherwise identical.

The endless track 41 shown in FIGS. 7 to 14 is that of a given one of the rear track assemblies $16_3$, $16_4$. FIGS. 17 to 23 show the endless track 41 of a given one of the front track assemblies $16_1$, $16_2$, which is similar to the track 41 of the given one of the rear track assemblies $16_3$, $16_4$, except that it comprises bent lateral edge portions $64_1$, $64_2$ adjacent its lateral edges $63_1$, $63_2$ to facilitate steering of the given one of the front track assemblies $16_1$, $16_2$ on the ground, by creating a smaller ground-contacting area. More particularly, the carcass 36 of the track 41 of the given one of the front track assemblies $16_1$, $16_2$ is bent inwardly proximate the lateral edges $63_1$, $63_2$ of the track 41 such that its inner surface 32 and ground-engaging outer surface 31 are bent inwardly.

The endless track 41 may be constructed in various other ways in other embodiments. For example, in some embodiments, the track 41 may comprise a plurality of parts (e.g., rubber sections) interconnected to one another in a closed configuration, the track 41 may have recesses or holes that interact with the drive wheel 42 in order to cause the track 41 to be driven (e.g., in which case the drive/guide lugs $48_1$-$48_N$ may be used only to guide the track 41 without being used to drive the track 41), and/or the ground-engaging outer side 47 of the track 41 may comprise various patterns of traction projections.

The drive wheel 42 is rotatable about an axis of rotation 49 for driving the endless track 41. The axis of rotation 49 corresponds to an axle of the ATV 10. More particularly, in this example, the drive wheel 42 has a hub which is mounted to the axle of the ATV 10 such that power generated by the prime mover 12 and delivered over the powertrain of the ATV 10 rotates the axle, which rotates the drive wheel 42, which imparts motion of the track 41. In this embodiment in which the track assembly $16_i$ is mounted where a ground-engaging wheel $15_i$ could otherwise be mounted, the axle of the ATV 10 is capable of rotating the drive wheel 42 of the track assembly $16_i$ or the ground-engaging wheel $15_i$.

In this embodiment, the drive wheel 42 comprises a drive sprocket engaging the drive/guide lugs $48_1$-$48_N$ of the inner side 45 of the track 41 in order to drive the track 41. In this case, the drive sprocket 42 comprises a plurality of teeth $46_1$-$46_T$ distributed circumferentially along its rim to define a plurality of lug-receiving spaces therebetween that receive the drive/guide lugs $48_1$-$48_N$ of the track 41. The drive wheel 42 may be configured in various other ways in other embodiments. For example, in embodiments where the track 41 comprises recesses or holes, the drive wheel 42 may have teeth that enter these recesses or holes in order to drive the track 41. As yet another example, in some embodiments, the drive wheel 42 may frictionally engage the inner side 45 of the track 41 in order to frictionally drive the track 41.

The idler wheels $50_1$-$50_{10}$ are not driven by power supplied by the prime mover 12, but are rather used to do at least one of supporting part of the weight of the ATV 10 on the ground via the track 41, guiding the track 41 as it is driven by the drive wheel 42, and tensioning the track 41. More particularly, in this embodiment, the idler wheels $50_1$, $50_2$ and the idler wheels $50_9$, $50_{10}$ are respectively front idler wheels (leading idler wheels) and rear idler wheels (trailing idler wheels) that maintain the track 41 in tension, and can help to support part of the weight of the ATV 10 on the ground via the track 41. The idler wheels $50_3$-$50_8$ are roller wheels that roll on the inner side 45 of the track 41 along the bottom run 66 of the track 41 to apply the bottom run 66 on the ground. The idler wheels $50_1$-$50_{10}$ move on respective ones of a plurality of idler wheel paths $50_1$, $50_2$ of the inner surface 32 of the carcass 35 of the endless track 41. Each of the idler wheel paths $50_1$, $50_2$ extends adjacent to respective ones of the drive/guide lugs $48_1$-$48_N$ to allow these lugs to guide motion of the track 41. As the roller wheels $50_3$-$50_8$ roll on respective ones of the idler wheel paths $50_1$, $50_2$, these paths can be referred to as "rolling paths".

The idler wheels $50_1$-$50_{10}$ may be arranged in other configurations and/or the track assembly $16_i$ may comprise more or less idler wheels in other embodiments.

In this embodiment, the drive/guide lugs $48_1$-$48_N$ and the idler wheel paths $50_1$, $50_2$ of the endless track 41 are laterally offset towards the lateral edge $63_1$ of the track 41. In this example, the lateral edge $63_1$ of the track 41 is an inboard lateral edge of the track 41 that is closest to a centerline 81 of the ATV 10, while the lateral edge $63_2$ of the track 41 is an outboard lateral edge of the track 41 that is farthest from the centerline 81 of the ATV 10. This lateral offset may help for traction, stability and steering of the ATV 10 since it allows the track assembly $16_i$ to have a ground-contacting area (i.e., "contact patch") that emulates a ground-contacting area that a ground-engaging wheel $15_i$ would have if mounted in place of the track assembly $16_i$. Basically, the track assembly $16_i$ applies more pressure on the ground in a first half $83_1$ of the width of the track 41 that is adjacent the inboard lateral edge $63_1$ of the track 41 than in a second half $83_2$ of the width of the track 41 that is adjacent to the outboard lateral edge $63_2$ of the track 41, instead of applying substantially equal pressure on both halves $83_1$, $83_2$ of the track 41.

Figure 10:
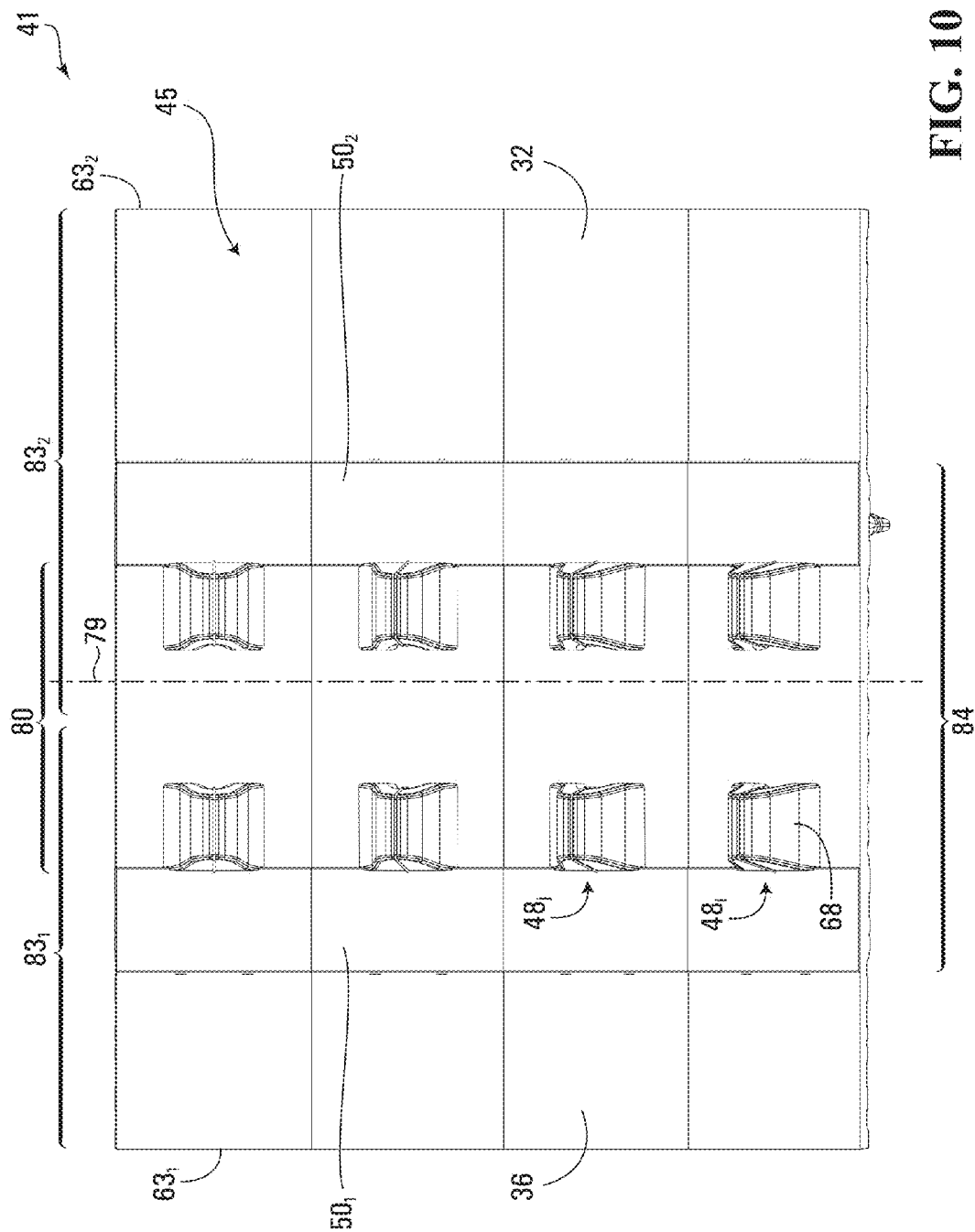
Figure 11:
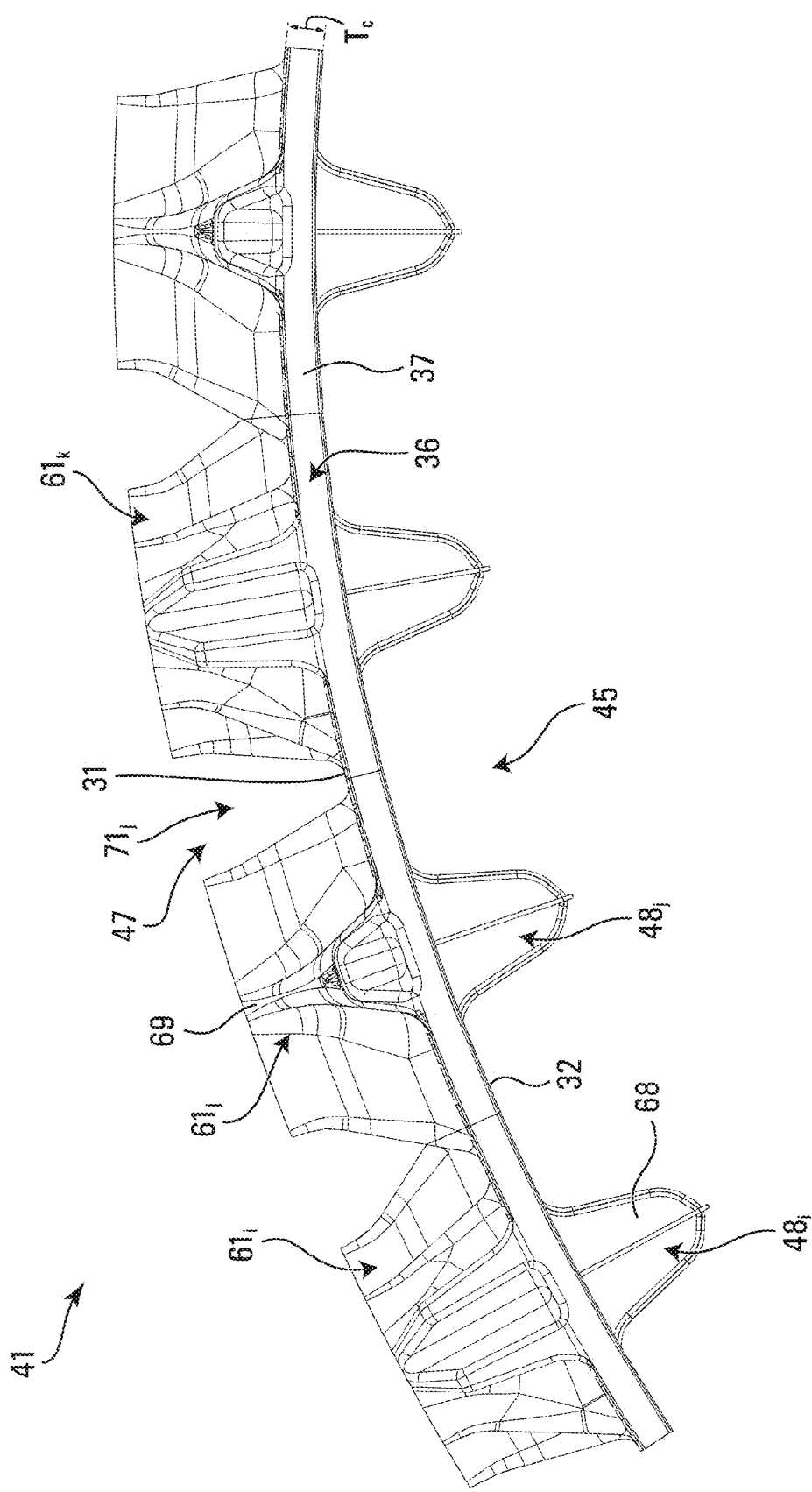
FIG. 11 shows a side view of the endless track of the rear track assembly.
Figure 12:
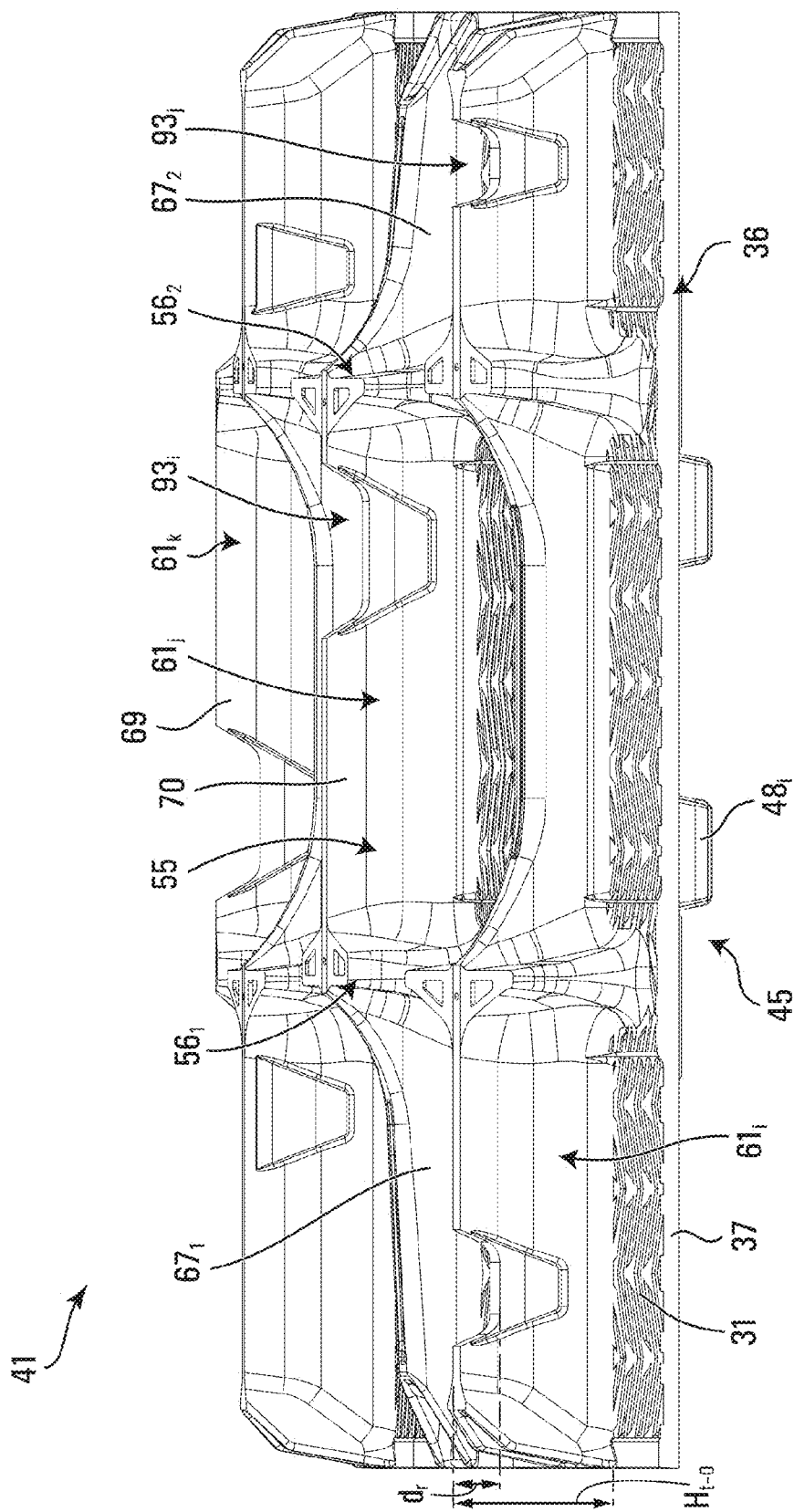
FIGS. 12 and 13 show other views of the endless track of the rear track assembly.
Figure 13:
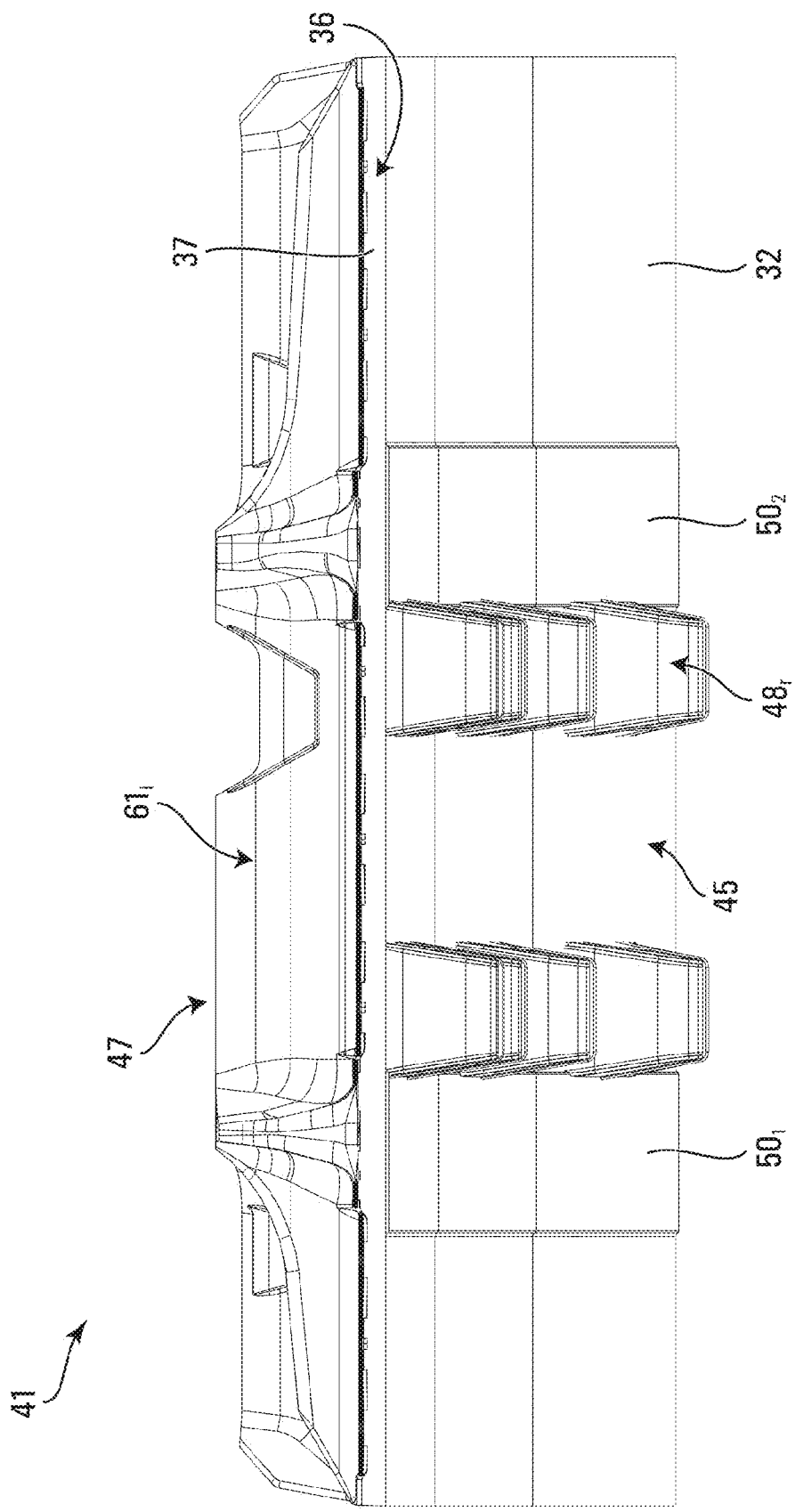

More particularly, in this embodiment, as shown in FIG. 10, the drive/guide lugs $48_1$-$48_N$ and the idler wheel paths $50_1$, $50_2$ are asymmetrically disposed relative to a centerline 79 bisecting the width of the track 41 into its halves $83_1$, $83_2$. Each of a widthwise span 80 of the drive/guide lugs $48_1$-$48_N$ and a widthwise span 84 the idler wheel paths $50_1$, $50_2$ is thus asymmetrically disposed relative to the centerline 79 and located closer the inboard lateral edge $63_1$ of the track 41 than to the outboard lateral edge $63_2$ of the track 41.

The frame 44 supports components of the track assembly $16_i$, including the idler wheels $50_1$-$50_{10}$. More particularly, in this embodiment, the front idler wheels $50_1$, $50_2$ are mounted to the frame 44 in a front longitudinal end region of the frame 44 proximate the front longitudinal end 57 of the track assembly $16_i$, while the rear idler wheels $50_9$, $50_{10}$ are mounted to the frame 44 in a rear longitudinal end region of the frame 44 proximate the rear longitudinal end 59 of the track assembly $16_i$. The roller wheels $50_3$-$50_8$ are mounted to the frame 44 in a central region of the frame 44 between the front idler wheels $50_1$, $50_2$ and the rear idler wheels $50_9$, $50_{10}$. Each of the roller wheels $50_3$-$50_8$ may be rotatably mounted directly to the frame 44 or may be rotatably mounted to a link which is pivotally mounted to the frame 44 to which is rotatably mounted an adjacent one of the roller wheels $50_3$-$50_8$, thus forming a "tandem".

The frame 44 is supported at a support area 39. More specifically, in this case, the frame 44 is supported by the axle of the ATV 10 to which is coupled the drive wheel 42, such that the support area 39 is intersected by the axis of rotation 49 of the drive wheel 42.

In this embodiment, the frame 44 is pivotable about a pivot axis 51 to facilitate motion of the track assembly $16_i$ on uneven terrain and enhance its traction on the ground. More particularly, in this embodiment, the pivot axis 51 corresponds to the axis of rotation 49 of the drive wheel 42 and the frame 44 can pivot about the axle of the ATV 10 to which the drive wheel 42 is coupled. In other embodiments, the pivot axis 51 of the frame 44 may be located elsewhere (e.g., lower) than the axis of rotation 49 of the drive wheel 42. In yet other embodiments, the frame 44 may not be pivotable.

Also, in this embodiment, the track assembly $16_i$ comprises an anti-rotation connector 52 to limit a pivoting movement of the track assembly $16_i$ relative to a chassis of the ATV 10. In this example, the anti-rotation connector 52 comprises a spring and a damper and is connected between the frame 44 of the track assembly $16_i$ and the chassis of the ATV 10 (e.g., via one or more mounting brackets and/or fasteners).

In this embodiment, the endless track 41 has rigidity characteristics which are useful for traction and other performance aspects of the track assembly $16_i$. For example, in this embodiment, the track 41 has a longitudinal rigidity (i.e., rigidity in its longitudinal direction) such that, although it can flex in its longitudinal direction to move around the wheels 42, $50_1$-$50_{10}$, it is sufficiently rigid in its longitudinal direction to help maintain a "smooth" shape of the bottom run 66 of the track 41 for proper traction, as conceptually represented in dotted line in FIG. 24A, by tending to prevent the bottom run 66 of the track 41 from flexing inwardly in gaps between adjacent ones of the idler wheels $50_1$-$50_{10}$ (e.g., when bearing against a rock, a bump, or other ground unevenness), as conceptually represented in dotted line in FIG. 24B. In addition, in this embodiment, the track 41 has a widthwise rigidity (i.e., rigidity in its widthwise direction) such that, although it can flex in its widthwise direction (e.g., notably since it has no transversal stiffening rods in this embodiment) to accommodate a ground surface which is uneven in its widthwise direction (e.g., a rut, bump, or side hill), it is sufficiently rigid in its widthwise direction to help maintain proper floatation and traction over the uneven ground surface, as conceptually represented in dotted line in FIG. 25A, by tending to prevent an excessive flexion of the track 41 in its widthwise direction, as conceptually represented in dotted line in FIG. 25B.

More particularly, in this embodiment, the traction projections $61_1$-$61_M$ are designed to control the rigidity characteristics of the endless track 41, while maintaining a weight of the track 41 relatively low. A shape and a material composition of each of the traction projections $61_1$-$61_M$ are selected to achieve the rigidity characteristics of the track 41. In this example, the traction projections $61_1$-$61_M$ have a dominant effect on the rigidity characteristics of the track 41 since the track 41 is free of transversal stiffening rods and its carcass 36 is thin.

Each traction projection $61_x$ extends transversally to the longitudinal direction of the endless track 41. That is, the traction projection $61_x$ has a longitudinal axis 54 extending transversally to the longitudinal direction of the track 41. In this example, the longitudinal axis 54 of the traction projection $61_x$ is substantially parallel to the widthwise direction of the track 41. In other examples, the longitudinal axis 54 of the traction projection $61_x$ may be transversal to the longitudinal direction of the track 41 without being parallel to the widthwise direction of the track 41.

In this embodiment, the traction projection $61_x$ extends across at least a majority of the width of the endless track 41. More particularly, in this example, the traction projection $61_x$ extends across substantially an entirety of the width of the track 41. The traction projection $61_x$ has longitudinal ends $60_1$, $60_2$ adjacent to respective ones of the lateral edges $63_1$, $63_2$ of the track 41. The traction projection $61_x$ may extend across any suitable part of the width of the endless track 41 in other embodiments.

Figure 14:
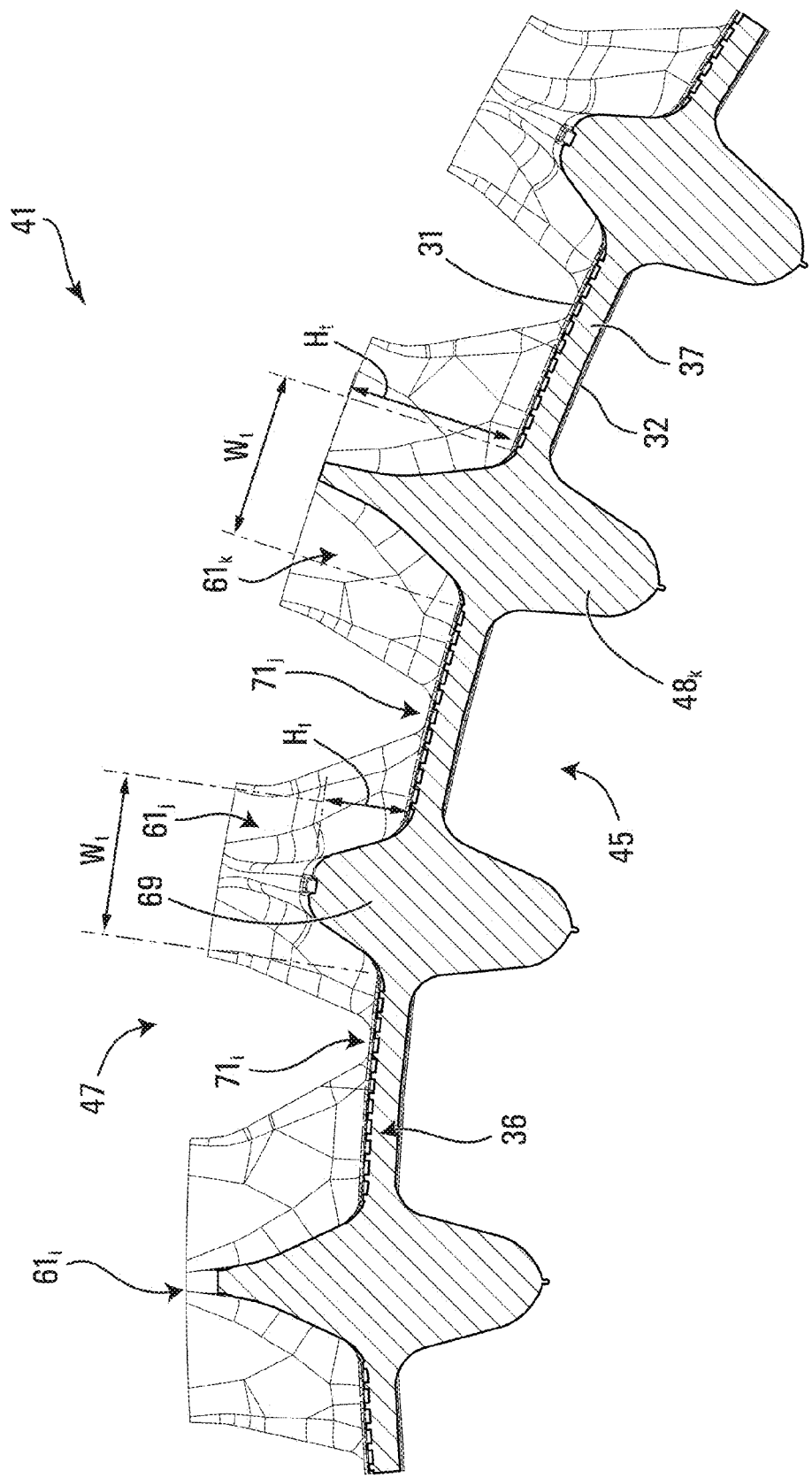
FIG. 14 shows a cross-sectional view of the endless track taken as indicated in FIG. 9.

The traction projection $61_x$ varies in cross-sectional shape along its longitudinal axis 54. That is, cross-sections of the traction projection $61_x$ at different positions along the longitudinal axis 54 of the traction projection $61_x$ are different. As shown in FIG. 14, a cross-section of the traction projection $61_x$ at a given position along the longitudinal axis 54 of the traction projection $61_x$ is taken parallel to the longitudinal direction of the track 41 and a has width $W_t$ (i.e., a maximal dimension in the longitudinal direction of the track 41) and a height $H_t$ (i.e., a maximal dimension in the thickness direction of the track 41). More particularly, in this embodiment, the traction projection $61_x$ varies in width and height along its longitudinal axis 54. Also, in this embodiment, at a given position along its longitudinal axis 54, the traction projection $61_x$ varies in widthwise dimension in the thickness direction of the track 41.

More particularly, in this embodiment, as shown in FIGS. 7, 9, 11 to 14, 26 and 27, the traction projection $61_x$ comprises a transversal protrusion 55 and a plurality of enlarged protrusions $56_1$, $56_2$ which comprise respective portions of its elastomeric material 69.

The transversal protrusion 55 of the traction projection $61_x$ extends transversally to the longitudinal direction of the endless track 41. Specifically, the transversal protrusion 55 extends along the longitudinal axis 54 of the traction projection $61_x$. In this embodiment, the transversal protrusion 55 comprises a lateral portion $67_1$ between the lateral edge $63_1$ of the track 41 and the enlarged protrusion $56_1$, a central portion 70 between the enlarged protrusions $56_1$, $56_2$, and a lateral portion $67_2$ between the lateral edge $63_2$ of the track 41 and the enlarged protrusion $56_2$. In this example, the central portion 70 and the lateral portions $67_1$, $67_2$ of the transversal protrusion 55 are generally straight such that the transversal protrusion 55 is generally straight. The transversal protrusion 55 may have any other suitable shape in other embodiments.

Each of the enlarged protrusions $56_1$, $56_2$ of the traction projection $61_x$ is larger in the longitudinal direction of the endless track 41 than the transversal protrusion 55 of the traction projection $61_x$. That is, a width $W_{t-e}$ of each of the enlarged protrusions $56_1$, $56_2$ is greater than a width $W_{t-t}$ of the transversal protrusion 55. Thus, the transversal protrusion 55 is a relatively narrow protrusion and each of the enlarged protrusions $56_1$, $56_2$ is a relative wide protrusion that is wider than the transversal protrusion 55. For example, in some embodiments, a ratio $W_{t-e}/W_{t-t}$ of the width $W_{t-e}$ of a given one of the enlarged protrusions $56_1$, $56_2$ over the width $W_{t-t}$ of the transversal protrusion 55 may be at least 2, in some cases at least 2.2, in some cases at least 2.4, in some cases at least 2.6, and in some cases even more (e.g., 3 or more). The ratio $W_{t-e}/W_{t-t}$ may have any other suitable value in other embodiments.

The width $W_{t-e}$ of each of the enlarged protrusions $56_1$, $56_2$ is therefore greater than a minimum width $W_{t-min}$ of the traction projection $61_x$. In this example in which the transversal protrusion 55 of the traction projection $61_x$ is generally straight, the minimum width $W_{t-min}$ of the traction projection $61_x$ corresponds to the width $W_{t-t}$ of the transversal protrusion 55. For example, in some embodiments, a ratio $W_{t-e}/W_{t-min}$ of the width $W_{t-e}$ of a given one of the enlarged protrusions $56_1$, $56_2$ over the minimum width $W_{t-t}$ of the traction projection $61_x$ may be at least 2, in some cases at least 2.2, in some cases at least 2.4, in some cases at least 2.6, and in some cases even more (e.g., 3 or more). The ratio $W_{t-e}/W_{t-min}$ may have any other suitable value in other embodiments.

The width $W_{t-e}$ of a given one of the enlarged protrusions $56_1$, $56_2$ is a maximum width $W_{t-max}$ of the traction projection $61_x$. In this embodiment, the widths $W_{t-e}$ of the enlarged protrusions $56_1$, $56_2$ are different such that the width $W_{t-e}$ of one of the enlarged protrusions $56_1$, $56_2$ is greater than width $W_{t-t}$ of the other one of the enlarged protrusions $56_1$, $56_2$ and is the maximum width $W_{t-max}$ of the traction projection $61_x$. For example, in some embodiments, a ratio $W_{t-max}/W_{t-min}$ of the maximum width $W_{t-max}$ of the traction projection $61_x$ over the minimum width $W_{t-min}$ of the traction projection $61_x$ may be at least 2, in some cases at least 2.2, in some cases at least 2.4, in some cases at least 2.6, and in some cases even more (e.g., 3 or more). The ratio $W_{t-max}/W_{t-min}$ may have any other suitable value in other embodiments.

The width $W_{t-e}$ of a given one of the enlarged protrusions $56_1$, $56_2$ of the traction projection $61_x$ corresponding to the maximum width $W_{t-max}$ of the traction projection $61_x$ is significant in relation to a longitudinal spacing $D_t$ of the traction projection $61_x$ and a traction projection $61_y$ which succeeds the traction projection $61_x$ in the longitudinal direction of the track 41. The longitudinal spacing $D_t$, which is a longitudinal distance between respective centers of the successive traction projections $61_x$, $61_y$, can be referred to as a "pitch" of the successive traction projections $61_x$, $61_y$. For example, in some embodiments, a ratio $W_{t-e}/D_t$ of the width $W_{t-e}$ of a given one of the enlarged protrusions $56_1$, $56_2$ of the traction projection $61_x$ over the pitch $D_t$ of the successive traction projections $61_x$, $61_y$ may be at least 0.8, in some cases at least 0.85, in some cases, at least 0.9, in some cases 0.95, in some cases at least 1.0, in some cases at least 1.05, and in some cases even more (e.g., 1.10 or more). In this example of implementation, the ratio $W_{t-e}/D_t$ is about 1.05. The ratio $W_{t-e}/D_t$ may have any other suitable value in other embodiments.

In this embodiment, each of the enlarged protrusions $56_1$, $56_2$ of a traction projection $61_x$ is elongated such that it has a longitudinal axis 62 transversal to the longitudinal axis 54 of the traction projection $61_x$. More particularly, in this example, each of the enlarged protrusions $56_1$, $56_2$ is elongated in the longitudinal direction of the track 41 such that its longitudinal axis 62 is substantially parallel to the longitudinal direction of the track 41. In this case, each of the enlarged protrusions $56_1$, $56_2$ has a tapered configuration, here a triangle-like configuration, at the outer end 77 of the traction projection $61_x$. This may be help for printing and traction of the traction projection $61_x$ on the ground (e.g., on a side hill by providing sideways support). Each of the enlarged protrusions $56_1$, $56_2$ may have any other suitable shape in other embodiments.

The enlarged protrusions $56_1$, $56_2$ of the traction projections $61_1$-$61_M$ are dimensioned and disposed relative to one another to enhance the longitudinal rigidity of the endless track 41, notably the longitudinal rigidity of the bottom run 66 of the track 41. In that sense, the enlarged protrusions $56_1$, $56_2$ of the traction projections $61_1$-$61_M$ constitute "longitudinal rigidifiers" which longitudinally rigidify (i.e., enhance the longitudinal rigidity of) the track 41.

The longitudinal rigidifiers constituted by respective ones of the enlarged protrusions $56_1$, $56_2$ of the traction projections $61_1$-$61_M$ form a plurality of elongated longitudinal rigidification structures $91_1$, $91_2$ which are spaced apart in the widthwise direction of the track 41. The enlarged protrusions $56_1$ of the traction projections $61_1$-$61_M$ form the elongated longitudinal rigidification structure $91_1$ and the enlarged protrusions $56_2$ of the traction projections $61_1$-$61_M$ form the elongated longitudinal rigidification structure $91_2$.

To that end, in this embodiment, the enlarged protrusion $56_1$ of a traction projection $61_i$ and the enlarged protrusion $56_1$ of a traction projection $61_j$ succeeding the traction projection $61_i$ in the longitudinal direction of the track 41 are aligned with one another in the widthwise direction of the track 41 (i.e., at least part of the enlarged protrusion $56_1$ of the traction projection $61_i$ and at least part of the enlarged protrusion $56_1$ of the traction projection $61_j$ overlap in the widthwise direction of the track 41) and the enlarged protrusion $56_2$ of the traction projection $61_i$ and the enlarged protrusion $56_2$ of the traction projection $61_j$ are aligned with one another in the widthwise direction of the track 41 (i.e., at least part of the enlarged protrusion $56_2$ of the traction projection $61_i$ and at least part of the enlarged protrusion $56_2$ of the traction projection $61_j$ overlap in the widthwise direction of the track 41). This contributes to forming the elongated longitudinal rigidification structures $91_1$, $91_2$ which longitudinally rigidify the track 41.

In this embodiment in which the widths $W_{t-e}$ of the enlarged protrusions $56_1$, $56_2$ of each of the traction projections $61_1$-$61_M$ are different, larger ones of the enlarged protrusions $56_1$, $56_2$ of the traction projections $61_1$-$61_M$ alternate from side to side of the track 41 over successive ones of the traction projections $61_1$-$61_M$ such that: the enlarged protrusion $56_1$ of the traction projection $61_j$, which is larger than the enlarged protrusion $56_2$ of the traction projection $61_i$ in the longitudinal direction of the track 41, is aligned in the widthwise direction of the track 41 with the enlarged protrusion $56_1$ of the traction projection $61_j$, which is smaller than the enlarged protrusion $56_2$ of the traction projection $61_j$ in the longitudinal direction of the track 41; and the enlarged protrusion $56_2$ of the traction projection $61_i$, which is smaller than the enlarged protrusion $56_1$ of the traction projection $61_i$ in the longitudinal direction of the track 41, is aligned in the widthwise direction of the track 41 with the enlarged protrusion $56_2$ of the traction projection $61_j$, which is larger than the enlarged protrusion $56_1$ of the traction projection $61_j$ in the longitudinal direction of the track 41.

In this example of implementation, the larger ones of the enlarged protrusions $56_1$, $56_2$ of the traction projections $61_i$, $61_j$, i.e., the enlarged protrusion $56_1$ of the traction projection $61_i$ and the enlarged protrusion $56_2$ of the traction projection $61_j$, overlap in the longitudinal direction of the track 41. There is a longitudinal overlap $V_{t-e}$ between the enlarged protrusion $56_1$ of the traction projection $61_i$ and the enlarged protrusion $56_2$ of the traction projection $61_j$.

The traction-projection-free area $71_x$ between the traction projections $61_i$, $61_j$ comprises a flex zone 74 where the traction-projection-free area $71_x$ bends most in the longitudinal direction of the track 41 as the track 41 moves around the wheels 42, $50_1$-$50_{10}$, and the enlarged protrusions $56_1$, $56_2$ of the traction projections $61_i$, $61_j$ are configured to limit a size of the flex zone 74 and therefore longitudinally rigidify the track 41.

More particularly, in this embodiment, each of a longitudinal gap $72_1$ between the enlarged protrusion $56_1$ of the traction projection $61_i$ and the enlarged protrusion $56_1$ of the traction projection $61_j$ and a longitudinal gap $72_2$ between the enlarged protrusion $56_2$ of the traction projection $61_i$ and the enlarged protrusion $56_2$ of the traction projection $61_j$ is significantly smaller than a largest longitudinal gap 73 between the traction projection $61_i$ and the traction projection $61_j$. Each of the longitudinal gaps $72_1$, $72_2$ thus forms a constriction of the flex zone 74 of the traction-projection-free area $71_x$ that makes the flex zone 74 "narrow" and helps to longitudinally rigidify the track 41.

A dimension $G_{t-e}$ of each of the longitudinal gaps $72_1$, $72_2$ between the enlarged protrusions $56_1$, $56_2$ of the traction projections $61_i$, $61_j$ is thus significantly less than a dimension $G_{t-max}$ of the largest longitudinal gap 73 between the traction projections $61_i$, $61_j$. For example, in some embodiments, a ratio $G_{t-e}/G_{t-max}$ of the dimension $G_{t-e}$ of each of the longitudinal gaps $72_1$, $72_2$ between the enlarged protrusions $56_1$, $56_2$ of the traction projections $61_i$, $61_j$ over the dimension $G_{t-max}$ of the largest longitudinal gap 73 between the traction projections $61_i$, $61_j$ may be no more than 0.4, in some cases no more than 0.35, in some cases no more than 0.3, in some cases no more than 0.25, in some cases no more than 0.2, and in some cases even less (e.g., no more than 0.15 or less). The ratio $G_{t-e}/G_{t-max}$ may have any other suitable value in other embodiments.

In this example, each of the longitudinal gaps $72_1$, $72_2$ between the enlarged protrusions $56_1$, $56_2$ of the traction projections $61_i$, $61_j$ is a smallest longitudinal gap between the traction projection $61_i$ and the traction projection $61_j$ such that its dimension $G_{t-e}$ is a dimension $G_{t-min}$ of the smallest longitudinal gap between these traction projections. Thus, in this example, a ratio $G_{t-min}/G_{t-max}$ of the dimension $G_{t-min}$ of the smallest longitudinal gap $72_1$ or $72_2$ between the traction projection $61_i$ and the traction projection $61_j$ over the dimension $G_{t-max}$ of the largest longitudinal gap 73 between the traction projection $61_i$ and the traction projection $61_j$ may be no more than 0.4, in some cases no more than 0.35, in some cases no more than 0.3, in some cases no more than 0.25, in some cases no more than 0.2, and in some cases even less (e.g., no more than 0.15 or less). The ratio $G_{t\text{-}min}/G_{t\text{-}max}$ may have any other suitable value in other embodiments.

In addition to limiting the size of the flex zone 74 of the traction-projection-free area $71_x$, in this embodiment, the enlarged protrusions $56_1$, $56_2$ of each of the traction projections $61_i$, $61_j$ impart a deviation of the flex zone 74 such that the flex zone 74 is not straight. That is, a centerline 75 of the flex zone 74 passing through the longitudinal gaps $72_1$, $72_2$ between the enlarged protrusions $56_1$, $56_2$ of the traction projections $61_i$, $61_j$ is not parallel to the widthwise direction of the track 41. This deviation of the flex zone 74 may further longitudinally rigidify the track 41 since it makes it harder for the track 41 to bend across its width.

To that end, in this embodiment, the longitudinal gaps $72_1$, $72_2$ between the enlarged protrusions $56_1$, $56_2$ of the traction projections $61_i$, $61_j$ are nonaligned with one another in the longitudinal direction of the track 41. There is a longitudinal offset $O_g$ between respective centers of the longitudinal gaps $72_1$, $72_2$ between the enlarged protrusions $56_1$, $56_2$ of the traction projections $61_i$, $61_j$. For example, in some embodiments, a ratio $O_g/G_{t\text{-}max}$ of the longitudinal offset $O_g$ of the longitudinal gaps $72_1$, $72_2$ between the enlarged protrusions $56_1$, $56_2$ of the traction projections $61_i$, $61_j$ over the dimension $G_{t\text{-}max}$ of the largest longitudinal gap 73 between the traction projection $61_i$ and the traction projection $61_j$ may be at least 0.1, in some cases at least 0.2, in some cases at least 0.3, and in some cases even more (e.g., at least 0.4 or more). The ratio $O_g/G_{t\text{-}max}$ may have any other suitable value in other embodiments. The longitudinal gaps $72_1$, $72_2$ between the enlarged protrusions $56_1$, $56_2$ of successive ones of the traction projections $61_1$-$61_M$ are thus staggered in the longitudinal direction of the track 41.

Figure 24A:
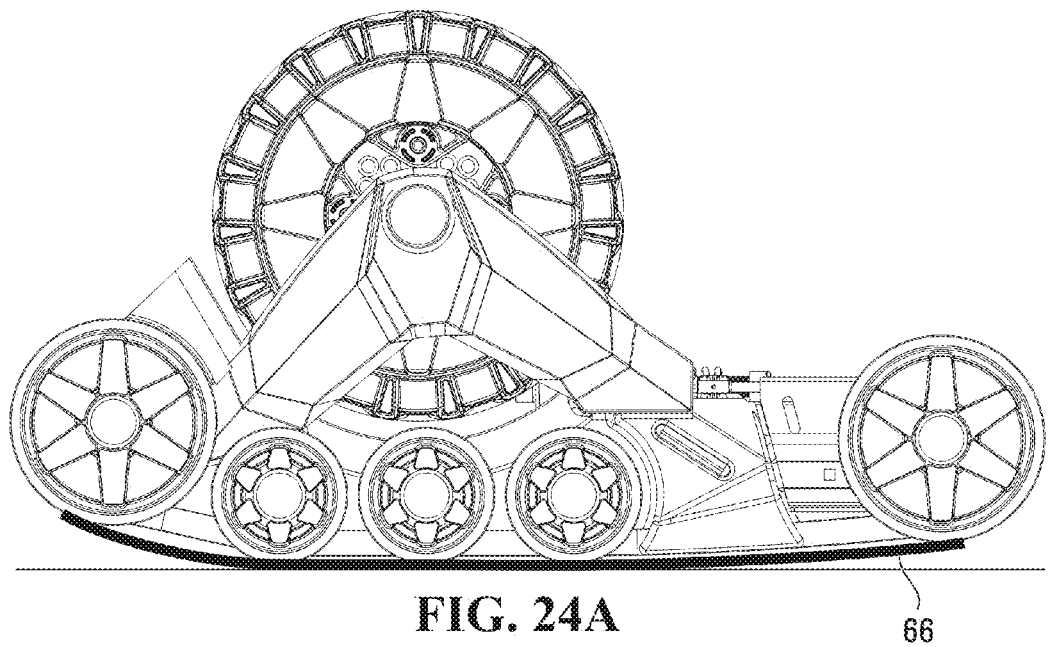
FIG. 24A represents a smooth shape of a bottom run of the endless track of the rear track assembly in contrast to FIG. 24B which represents an excessive flexion of the endless track in gaps between wheels of the rear track assembly that could occur if the endless track lacked certain features.
Figure 24B:
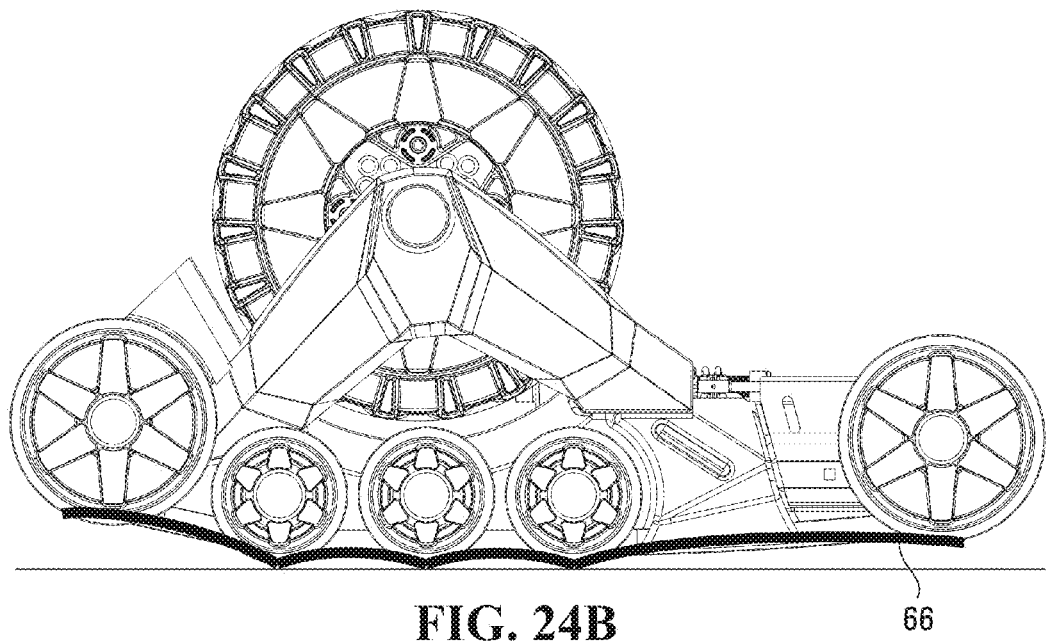
Figure 25A:
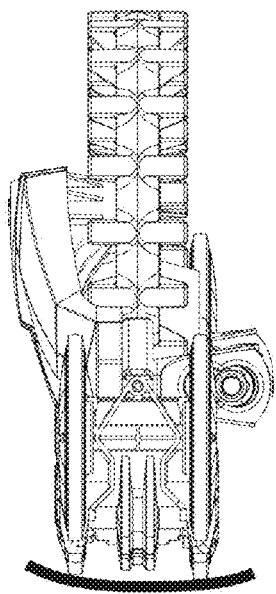
FIG. 25A shows a controlled flexion of the endless track in its widthwise direction in contrast to FIG. 25B which represents an excessive flexion of the endless track in its widthwise direction that could occur if the endless track lacked certain features.
Figure 25B:
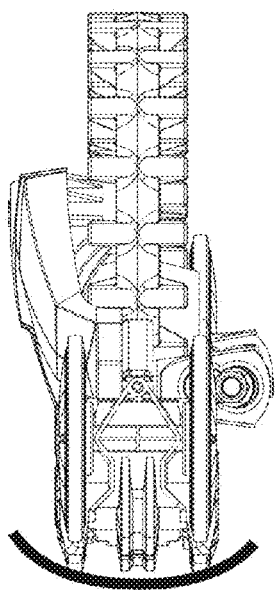
Figure 26:
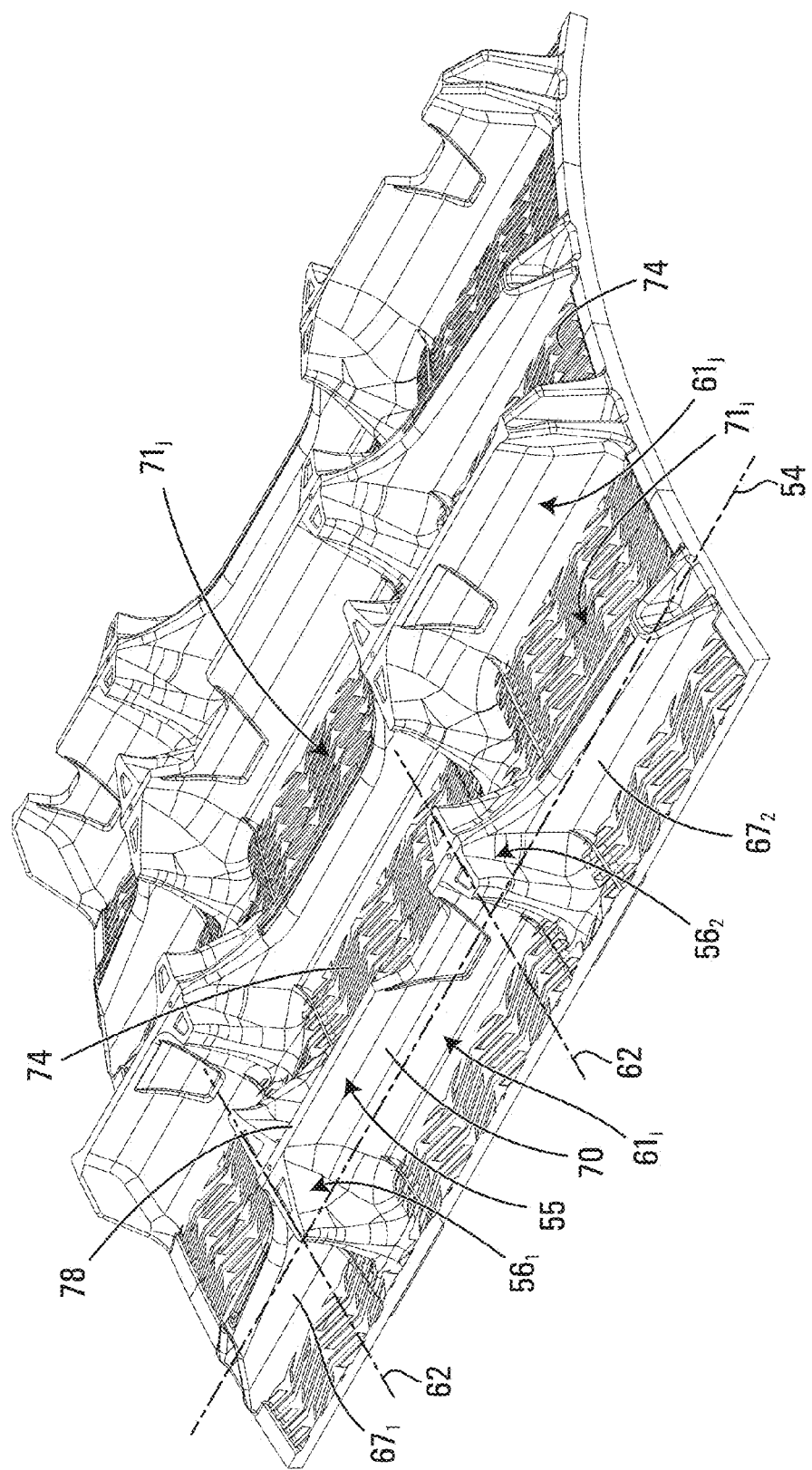
FIG. 26 shows a close-up perspective view of the endless track of the rear track assembly.
Figure 27:
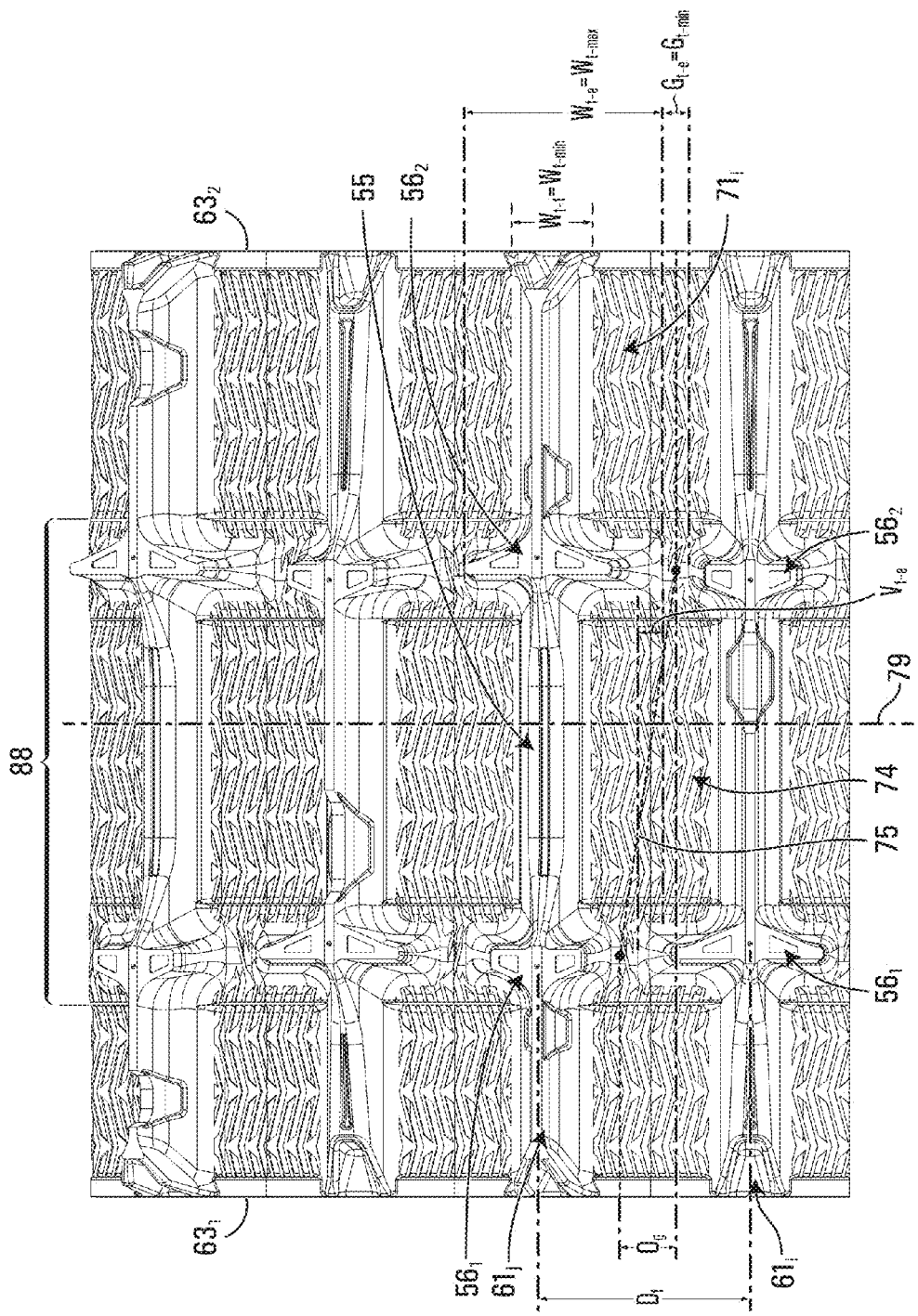
FIG. 27 shows another view of the ground-engaging outer side of the endless track.

In this embodiment, the enlarged protrusions $56_1$, $56_2$ of each of the traction projections $61_1$-$61_M$ enhance the longitudinal rigidity of the rolling paths $50_1$, $50_2$ of the inner surface 32 of the carcass 35 of the track 41 over which move the idler wheels $50_1$-$50_{10}$. In that sense, the enlarged protrusions $56_1$, $56_2$ of each of the traction projections $61_1$-$61_M$ constitute "rolling path rigidifiers". This may promote a smooth shape of the bottom run 66 of the track 41 for proper traction, as shown in FIG. 24A, by opposing a tendency of the bottom run 66 of the track 41 to bend inwardly in gaps between adjacent ones of the idler wheels $50_1$-$50_{10}$ (e.g., when bearing against a rock, a bump, or other ground unevenness), as shown in FIG. 24B.

More particularly, in this embodiment, the enlarged protrusions $56_1$, $56_2$ of each of the traction projections $61_1$-$61_M$ are aligned in the widthwise direction of the endless track 41 with the rolling paths $50_1$, $50_2$ of the inner surface 32 of the carcass 35 of the track 41 over which move the idler wheels $50_1$-$50_{10}$ (i.e., at least part of the enlarged protrusion $56_1$ of a traction projection $61_x$ overlaps the rolling path $50_1$ in the widthwise direction of the track 41, and at least part of the enlarged protrusion $56_2$ of the traction projection $61_x$ overlaps the rolling path $50_2$ in the widthwise direction of the track 41). Respective ones of the idler wheels $50_1$-$50_{10}$ rolling on the rolling paths $50_1$, $50_2$ thus bear against more rigid regions of the traction projections $61_1$-$61_M$ which causes less bending of the bottom run 66 of the track 41 where these wheels are located.

In this example of implementation, the relatively high ratio $W_{t\text{-}e}/D_t$ of the width $W_{t\text{-}e}$ of a given one of the enlarged protrusions $56_1$, $56_2$ of each of the traction projections $61_1$-$61_M$ over the pitch $D_t$ of successive ones of the traction projections $61_1$-$61_M$ helps to keep respective ones of the idler wheels $50_1$-$50_{10}$ longer on more rigid regions of the track 41. This may help to reduce vibrations in the track 41.

The width $W_{t\text{-}e}$ of an enlarged protrusion $56_y$ of a traction projection $61_i$ over which passes a roller wheel $50_y$ may be significant in relation to a diameter $D_w$ of the roller wheel $50_y$. For example, in some embodiments, a ratio $W_{t\text{-}e}/D_w$ of the width $W_{t\text{-}e}$ of the enlarged protrusion $56_y$ over the diameter $D_w$ of the roller wheel $50_y$ may be at least 0.3, in some cases at least 0.4, in some cases at least 0.5, and in some cases even more (e.g., 0.6 or more). The ratio $W_{t\text{-}e}/D_w$ may have any other suitable value in other embodiments.

Also, in this embodiment, the longitudinal gaps $72_1$, $72_2$ between the enlarged protrusions $56_1$, $56_2$ of successive traction projections $61_i$, $61_j$ are aligned in the widthwise direction of the track 41 with the rolling paths $50_1$, $50_2$ of the inner surface 32 of the carcass 35 of the track 41. Since these longitudinal gaps $72_1$, $72_2$ are relatively small, respective ones of the idler wheels $50_1$-$50_{10}$ on the rolling paths $50_1$, $50_2$ spend less time on the flex zone 74 of the traction-projection-free area $71_x$ of the successive traction projections $61_i$, $61_j$ which causes less bending of the bottom run 66 of the track 41 where these wheels are located.

The dimension $G_{t\text{-}e}$ of a longitudinal gap $72_y$ between aligned ones of the enlarged protrusions $56_1$, $56_2$ of the successive traction projections $61_i$, $61_j$ over which passes a roller wheel $50_y$ may be relatively small in relation to the diameter $D_w$ of the roller wheel $50_y$. For example, in some embodiments, a ratio $G_{t\text{-}e}/D_w$ of the dimension $G_{t\text{-}e}$ of the longitudinal gap $72_y$ between aligned ones of the enlarged protrusions $56_1$, $56_2$ of the successive traction projections $61_i$, $61_j$ over the diameter $D_w$ of the roller wheel $50_y$ may be no more than 0.15, in some cases no more than 0.10, in some cases no more than 0.08, and in some cases even less (e.g., 0.05 or less). The ratio $G_{t\text{-}e}/D_w$ may have any other suitable value in other embodiments.

Furthermore, in this embodiment, since the longitudinal gaps $72_1$, $72_2$ between the enlarged protrusions $56_1$, $56_2$ of successive traction projections $61_i$, $61_j$ are nonaligned with one another in the longitudinal direction of the track 41, respective ones of the idler wheels $50_1$-$50_{10}$ on the rolling paths $50_1$, $50_2$ may not pass over these longitudinal gaps $72_1$, $72_2$ simultaneously, and this may cause less bending of the bottom run 66 of the track 41 where these wheels are located. This may also reduce vibrations and noise since the idler wheels $50_1$-$50_{10}$ transition between rigid and flexible regions at different times.

The longitudinal offset $O_g$ of the longitudinal gaps $72_1$, $72_2$ between the enlarged protrusions $56_1$, $56_2$ of successive traction projections $61_i$, $61_j$ over which pass roller wheels $50_y$, $50_z$ may be related to the diameter $D_w$ of each of the roller wheels $50_y$, $50_z$. For example, in some embodiments, a ratio $O_g/D_w$ of the longitudinal offset $O_g$ of the longitudinal gaps $72_1$, $72_2$ between the enlarged protrusions $56_1$, $56_2$ of the traction projections $61_i$, $61_j$ over the diameter $D_w$ of each of the roller wheels $50_y$, $50_z$ may be at least 0.05, in some cases at least 0.1, in some cases at least 0.15, and in some cases even more (e.g., at least 0.2 or more). The ratio $O_g/D_w$ may have any other suitable value in other embodiments.

Since in this embodiment the rolling paths $50_1$, $50_2$ of the inner side 45 of the track 41 are laterally offset towards the inboard lateral edge $63_1$ of the track 41 and the enlarged protrusions $56_1$, $56_2$ of each of the traction projections $61_1$-$61_M$ are aligned in the widthwise direction of the track 41 with the rolling paths $50_1$, $50_2$, the enlarged protrusions $56_1$, $56_2$ of each of the traction projections $61_1$-$61_M$ are thus also laterally offset towards the inboard lateral edge $63_1$ of the track 41. More particularly, in this embodiment, the enlarged protrusions $56_1$, $56_2$ of each of the traction projections $61_1$-$61_M$ are asymmetrically disposed relative to the centerline 79 bisecting the width of the track 41 into its halves $83_1$, $83_2$. A widthwise span 88 of the enlarged protrusions $56_1$, $56_2$ of each of the traction projections $61_1$-$61_M$ is thus asymmetrically disposed relative to the centerline 79 and located closer the inboard lateral edge $63_1$ of the track 41 than to the outboard lateral edge $63_2$ of the track 41.

With respect to the widthwise rigidity of the endless track 41, in this embodiment, each traction projection $61_x$ is designed such that a cross-section of the traction projection $61_x$ has an area moment of inertia (i.e., a second moment of area) $I_t$ which is relatively high and/or its elastomeric material 69 has a modulus of elasticity $E_t$ which is relatively high. As a result, a bending stiffness $B_t=E_tI_t$ of the traction projection $61_x$ in the widthwise direction of the track 41 is relatively high, while a weight of the traction projection $61_x$ may be kept relatively low.

Figure 28:
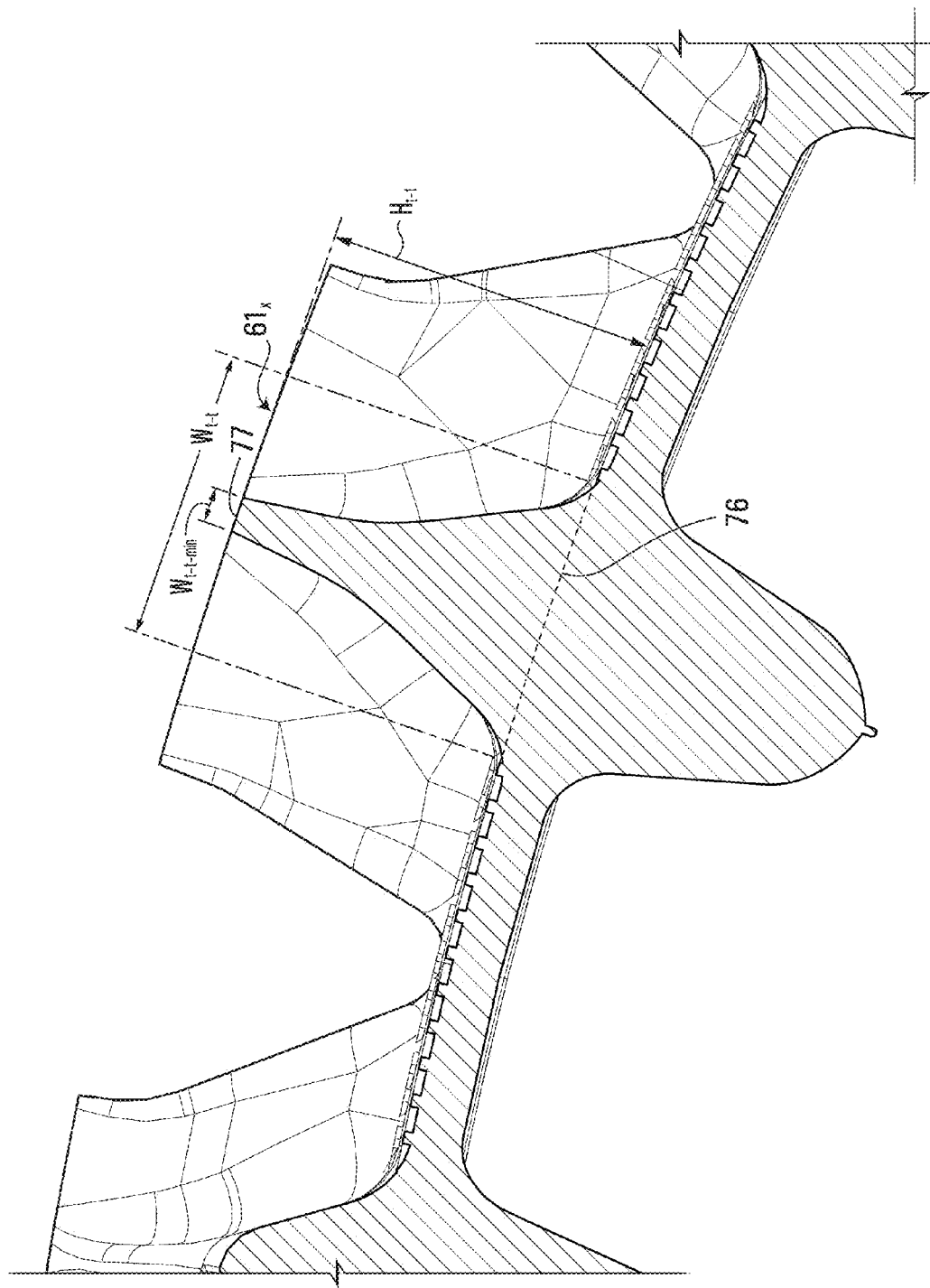
FIG. 28 shows a close-up of the cross-sectional view of the endless track taken as indicated in FIG. 9.

Referring additionally to FIG. 28, in this example, the cross-section of the traction projection $61_x$ is taken in the transversal protrusion 55 of the traction projection $61_x$. The area moment of inertia $I_t$ is calculated with respect to an axis parallel to the longitudinal direction of the track 41 at a base 76 of the cross-section of the traction projection $61_x$. In cases where the modulus of elasticity $E_t$ of the elastomeric material 69 of the traction projection $61_x$ varies along the traction projection $61_x$, the modulus of elasticity $E_t$ at the cross-section of the traction projection $61_x$ is considered. A cross-sectional weight per unit length $M_t$ of the traction projection $61_x$ at the cross-section of the traction projection $61_x$ is calculated by multiplying a density $\rho_t$ of the elastomeric material 69 of the traction projection $61_x$ at the cross-section by a cross-sectional area $A_t$ of the traction projection $61_x$ at the cross-section ($M_t=\rho_tA_t$).

For example, in some embodiments, a ratio $B_t/M_t$ of the bending stiffness $B_t$ of the traction projection $61_x$ in the widthwise direction of the endless track 41 (in lb·in.$^2$) over the cross-sectional weight per unit length $M_t$ of the traction projection $61_x$ at the cross-section of the traction projection $61_x$ (in lb/in.) may be at least 5000 in.$^3$, in some cases at least 5200 in.$^3$, in some cases at least 5400 in.$^3$, and in some cases even more (e.g., 5500 in.$^3$ or more). The ratio $B_t/M_t$ may have any other suitable value in other embodiments.

In some embodiments, a hardness $S_t$ of the elastomeric material 69 of the traction projection $61_x$ may be used to characterize this elastomeric material, instead of its modulus of elasticity $E_t$. In cases where the hardness $S_t$ of the elastomeric material 69 of the traction projection $61_x$ varies along the traction projection $61_x$, the hardness $S_t$ at the cross-section of the traction projection $61_x$ is considered. For instance, in some embodiments, the hardness $S_t$ of the elastomeric material 69 of the traction projection $61_x$ may be at least 75 durometers Shore A, in some cases at least 80 durometers Shore A, and in some cases even more (e.g., 85 durometers Shore A).

The cross-section of the transversal protrusion 55 of the traction projection $61_x$ may have any suitable shape.

In this embodiment, the cross-section of the transversal protrusion 55 of the traction projection $61_x$ tapers in the thickness direction of the endless track 41. A minimal dimension $w_{t\text{-}t\text{-}min}$ of the cross-section of the transversal protrusion 55 in the longitudinal direction of the track 41 is less than the width $W_{t\text{-}t}$ of the cross-section of the transversal protrusion 55. For example, in some embodiments, a ratio $W_{t\text{-}t}/w_{t\text{-}t\text{-}min}$ of the width $W_{t\text{-}t}$ of the cross-section of the transversal protrusion 55 over the minimal dimension $w_{t\text{-}t\text{-}min}$ of the cross-section of the transversal protrusion 55 in the longitudinal direction of the track 41 may be at least 4, in some cases at least 4.5, in some cases at least 5, in some cases at least 5.5, and in some cases even more (e.g., 6 or more). The ratio $W_{t\text{-}t}/w_{t\text{-}t\text{-}min}$ may have any other suitable value in other embodiments.

More particularly, in this embodiment, the cross-section of the transversal protrusion 55 of the traction projection $61_x$ tapers in such a way that the minimal dimension $w_{t\text{-}t\text{-}min}$ of the cross-section of the transversal protrusion 55 in the longitudinal direction of the track 41 is at the outer end 77 of the traction projection $61_x$. In this example, the cross-section of the transversal protrusion 55 tapers continuously outwardly from the base 76 to the outer end 77 of the traction projection $61_x$. The transversal protrusion 55 thus comprises a "thin" or "sharp" outer edge 78 in this case. The minimal dimension $w_{t\text{-}t\text{-}min}$ of the cross-section of the transversal protrusion 55 in the longitudinal direction of the track 41 may be located between the base 76 and the outer end 77 of the traction projection $61_x$ in other embodiments.

Also, in this embodiment, a height $H_{t\text{-}t}$ of the cross-section of the transversal protrusion 55 of the traction projection $61_x$ is significantly larger than the minimal dimension $w_{t\text{-}t\text{-}min}$ of the cross-section of the transversal protrusion 55 in the longitudinal direction of the track 41. For example, in some embodiments, a ratio $H_{t\text{-}t}/w_{t\text{-}t\text{-}min}$ of the height $H_{t\text{-}t}$ of the cross-section of the transversal protrusion 55 over the minimal dimension $w_{t\text{-}t\text{-}min}$ of the cross-section of the transversal protrusion 55 in the longitudinal direction of the track 41 may be at least 6, in some cases at least 7, in some cases at least 8, and in some cases even more (e.g., 9 or more). The ratio $H_{t\text{-}t}/w_{t\text{-}t\text{-}min}$ may have any other suitable value in other embodiments.

In this example, the cross-section and the material properties of the elastomeric material 69 of the transversal protrusion 55 of the traction projection $61_x$ are such that the transversal protrusion 55 is relatively stiff in the widthwise direction of the endless track 41, which may help to prevent excessive bending of the track 21 in its widthwise direction and therefore help for proper traction and floatation. At the same time, the cross-section and the material properties of the elastomeric material 69 of the transversal protrusion 55 of the traction projection $61_x$ are such that the transversal protrusion 55 extends relatively high and is flexible at its thin or sharp outer edge 78 in the track's longitudinal direction, which may help for proper traction, vibration absorption, and durability.

Figure 29A:
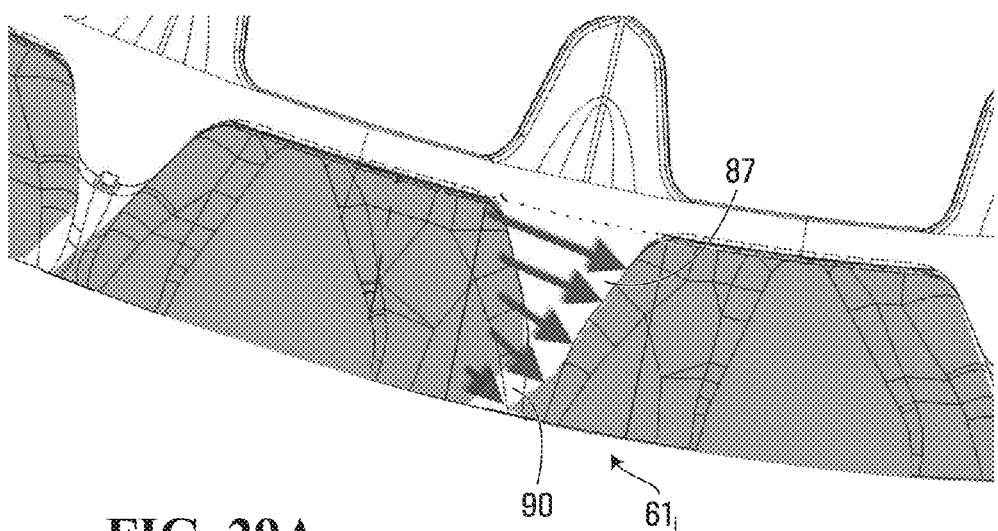
FIG. 29A shows an example of flexion of a traction projection of the endless track in the track's longitudinal direction.
Figure 29B:
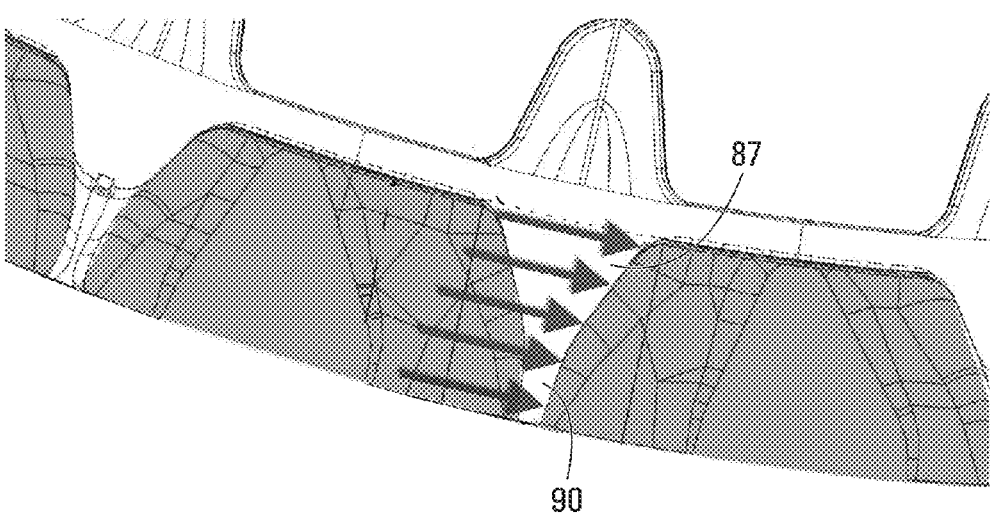
FIG. 29B shows a situation if the traction projection of the endless track was not flexing in the track's longitudinal direction.

For instance, in this embodiment, as shown in FIG. 29A, the flexibility of the transversal protrusion 55 of the traction projection $61_x$ in the longitudinal direction of the track 41 may allow an outer end portion 90 of the traction projection $61_x$ adjacent to its outer end 77 to flex relative to a base portion 87 of the traction projection $61_x$ adjacent to its base 76 for proper traction on certain ground surfaces. For example, on compacted snow, flexion of the outer end portion 90 of the traction projection $61_x$ relative to the base portion 87 of the traction projection $61_x$ may cause a gradual pressure variation on the snow engaged by the traction projection $61_x$ which may avoid a stress concentration in the snow that could "break" the snow and result in traction loss. Basically, as shown in FIG. 29B, if the outer end portion 90 of the traction projection $61_x$ did not flex relative to the base portion 87 of the traction projection $61_x$, an abrupt pressure variation on the snow engaged by the traction projection $61_x$ would induce a stress concentration in the snow that could break the snow and result in traction loss. While the transversal protrusion 55 of the traction projection $61_x$ bends as shown in FIG. 29A, the enlarged protrusions $56_1$, $56_2$ of the traction projection $61_x$ may not bend or bend less than the transversal protrusion 55 in the track's longitudinal direction due to their size. The flexibility of the transversal protrusion 55 of the traction projection $61_x$ in the longitudinal direction of the track 41 may be useful on other types of snow (e.g., medium-density snow if the track 41 undergoes high-speed spinning) or other types of grounds (e.g., hard terrain where this flexibility may give more traction into terrain details).

Also, in this embodiment, as shown in FIG. 30A, the traction projection $61_x$ allows the track 41 to be relatively stiff without being rigid in its widthwise direction to provide proper traction as well as moderate side support on certain ground surfaces. For instance, on compacted snow, this results in a gradual pressure variation which may avoid a stress concentration in the snow that could break the snow and cause a loss of traction. In contrast, as shown in FIG. 30B, if the traction projection $61_x$ was too flexible in the widthwise direction of the track 41, although it would have high side support, the track 41 could bend too much in its widthwise direction and cause an abrupt pressure variation resulting in a stress concentration that could lead to traction loss. Conversely, as shown in FIG. 30C, if the track 41 was rigid in its widthwise direction, floatation could be maximized but there would be little or no side support.

The traction projections $61_1$-$61_M$ may be configured in various other ways in other embodiments.

For example, in other embodiments, the enlarged protrusions $56_1$, $56_2$ of each of the traction projections $61_1$-$61_M$ may have any other suitable shape. In other embodiments, a traction projection $61_x$ may comprise any other number of enlarged protrusions such as the enlarged protrusions $56_1$, $56_2$ (e.g., only one or three or more). In yet other embodiments, a traction projection $61_x$ may not comprise any enlarged protrusion such as the enlarged protrusions $56_1$, $56_2$.

As another example, in other embodiments, the enlarged protrusions $56_1$, $56_2$ of a traction projection $61_i$ and the enlarged protrusion $56_1$, $56_2$ of a traction projection $61_j$ succeeding the traction projection $61_i$ in the longitudinal direction of the track 41 may be aligned with one another in the widthwise direction of the track 41 and arranged such that, when the traction projections $61_i$, $61_j$ are on the ground, the enlarged protrusions $56_1$ of the traction projections $61_i$, $61_j$ touch one another and/or the enlarged protrusions $56_2$ of the traction projections $61_i$, $61_j$ touch one another (i.e., the longitudinal gaps $72_1$, $72_2$ discussed above become closed such that the enlarged protrusions $56_1$ of the traction projections $61_i$, $61_j$ become contiguous and/or the enlarged protrusions $56_2$ of the traction projections $61_i$, $61_j$ become contiguous when the traction projections $61_i$, $61_j$ are on the ground).

As another example, in other embodiments, the cross-section and the material properties of the elastomeric material 69 of the transversal protrusion 55 of a traction projection $61_x$ may respectively have any other suitable shape and/or any other suitable values. For instance, in other embodiments, the height $H_{t-t}$ of the cross-section of the transversal protrusion 55 of a traction projection $61_x$ may be lower and the modulus of elasticity $E_t$ and/or the hardness $S_t$ of the elastomeric material 69 of the transversal protrusion 55 may be higher.

Figure 31:
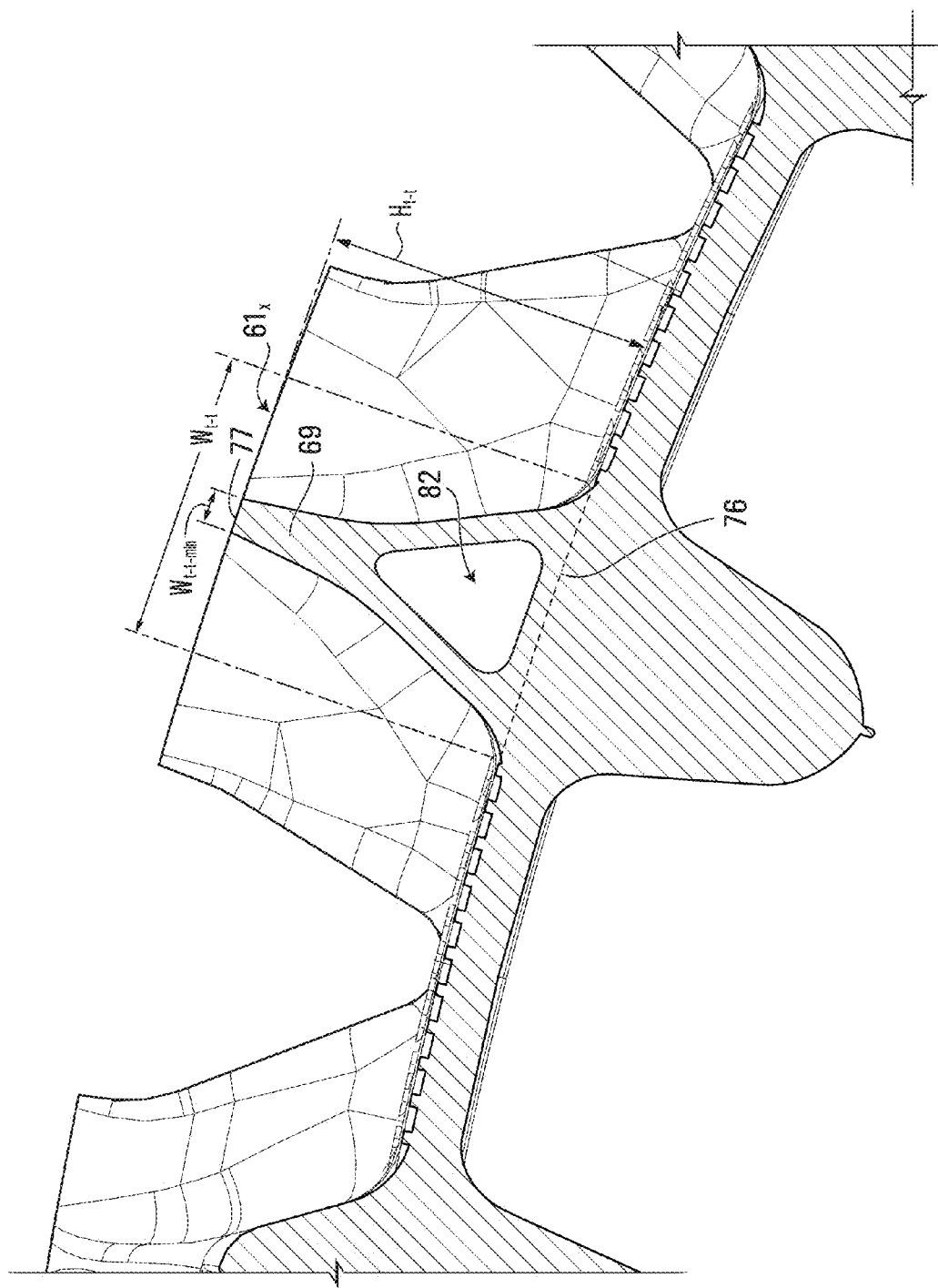
FIGS. 31 and 32 show variants of the endless track in accordance with other embodiments of the invention in which a traction projection of the track comprises an internal cavity.
Figure 32:
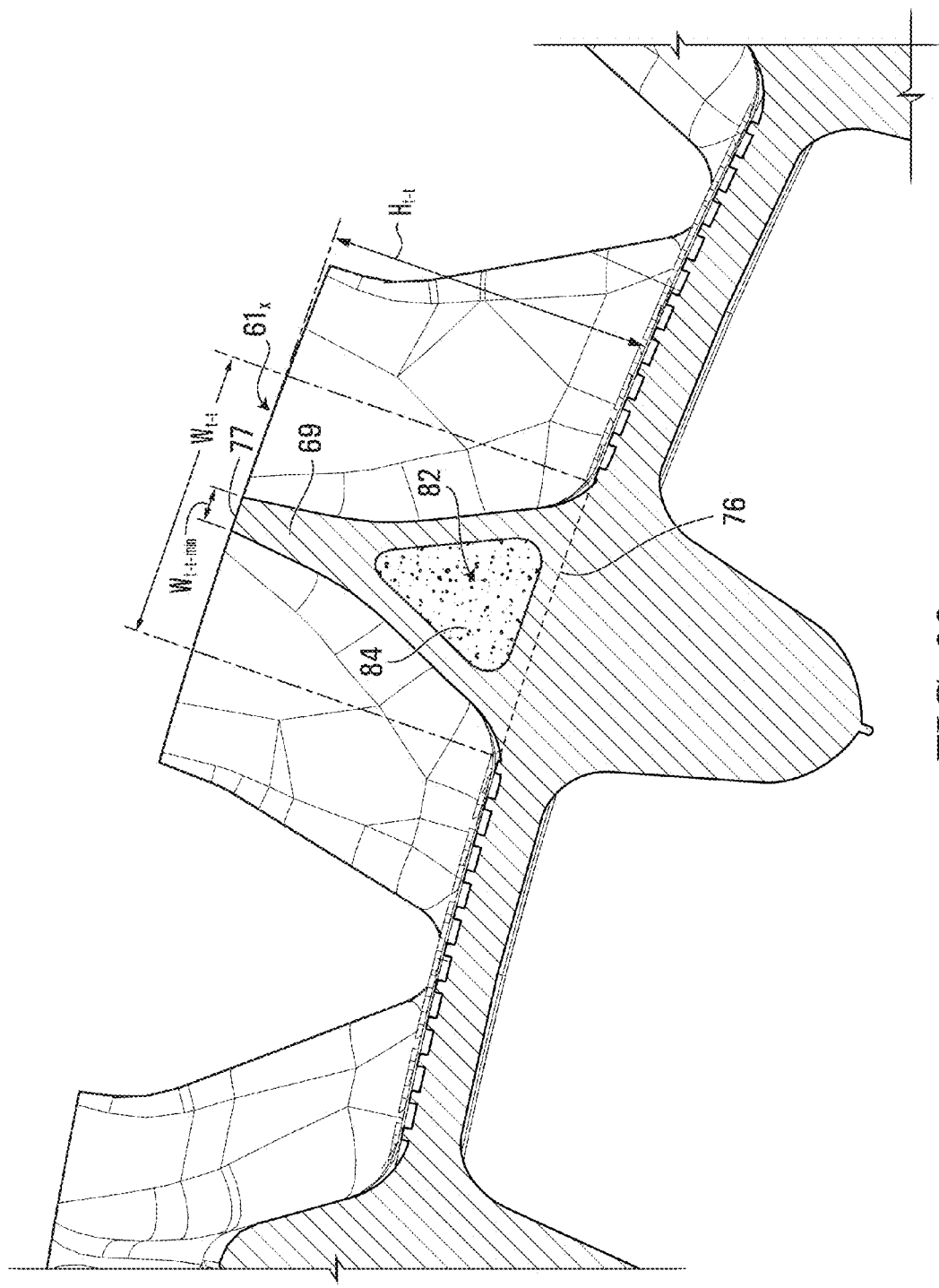

As another example, in other embodiments, as shown in FIG. 31, a traction projection $61_x$ may have an internal cavity 82 to increase the area moment of inertia $I_t$ of the cross-section of the traction projection $61_x$ while keeping the weight of the traction projection $61_x$ relatively low. Basically, the internal cavity 82 allows more area of the cross-section of the traction projection $61_x$ to be spread outwardly, thus increasing its area moment of inertia $I_t$ (e.g., the cross-section of the traction projection $61_x$ may be wider and/or higher). In some cases, as shown in FIG. 31, the internal cavity 82 may be left empty after manufacturing of the track 41 such that it constitutes a hollow cavity. The internal cavity 82 may be formed, for instance, by placing an insert (e.g., a rod) where the internal cavity 82 is to be created during molding of the track 41 and by removing the insert after molding of the track 41 to reveal the hollow cavity. In other cases, as shown in FIG. 32, the internal cavity 82 may contain a filler 84 having a density lower than that of the elastomeric material 69 of the cross-section of the traction projection $61_x$ such that the weight of the traction projection $61_x$ is less than if the cavity 82 was omitted and replaced by more of the elastomeric material 69. For instance, in some examples of implementation, the filler 84 may be a foam material. In other examples of implementation, the filler 84 may comprise a rod, a roll of fabric, cord or fiber glass, or any other suitable material.

Figure 33:
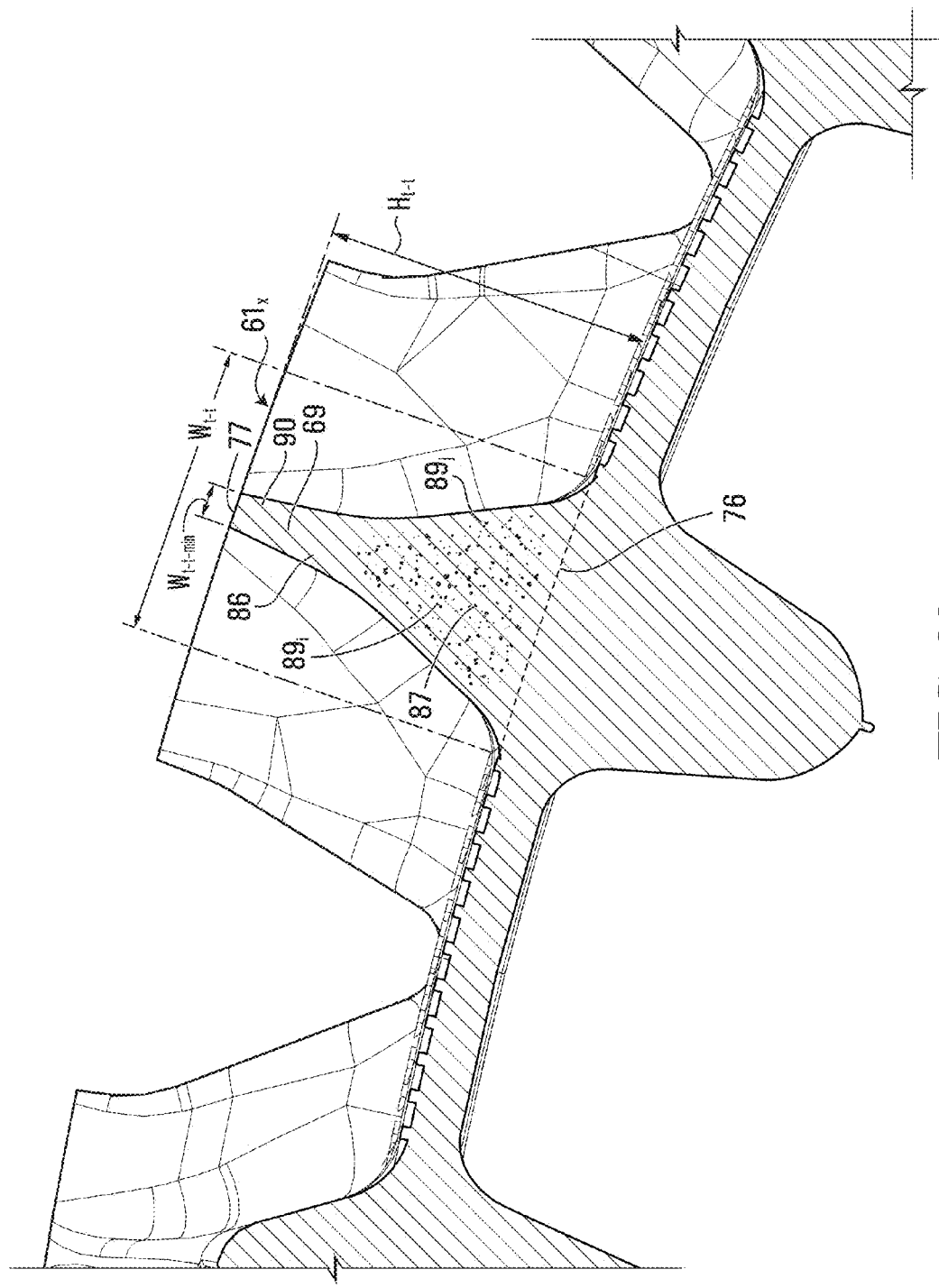
FIG. 33 shows a variant of the endless track in accordance with another embodiment of the invention in which a traction projection of the track comprises composite elastomeric material.

As another example, in other embodiments, as shown in FIG. 33, the elastomeric material 69 of a traction projection $61_x$ may be a composite elastomeric material to control its modulus of elasticity $E_t$. The composite elastomeric material 69 is constituted of an elastomer matrix (e.g., a rubber matrix) 86 in which reinforcements $89_1$-$89_R$ are disposed. For instance, in some embodiments, the reinforcements $89_1$-$89_R$ may be arranged such that the modulus of elasticity $E_t$ is greater in one part of the traction projection $61_x$ than in another part of the traction projection $61_x$. For example, in this embodiment, the modulus of elasticity $E_t$ is greater in the base portion 87 of the traction projection $61_x$ adjacent to its base 76 than in the outer end portion 90 of the traction projection $61_x$ adjacent to its outer end 77 such that the base portion 87 is more rigid than the outer end portion 90, which is more flexible. This is achieved by providing a greater concentration of the reinforcements $89_1$-$89_R$ in the base portion 87 than in the outer end portion 90 (which may have none of the reinforcements $89_1$-$89_R$).

In this embodiment, the composite elastomeric material 69 is a fiber-reinforced elastomeric material 69 such that the reinforcements $89_1$-$89_R$ are fibers. For instance, in some cases, each of the fibers $89_1$-$89_R$ may extend along at least a majority of the length of the traction projection $61_x$. In other cases, the fibers $89_1$-$89_R$ may be shorter (e.g., the fibers $89_1$-$89_R$ may be "chopped" or otherwise cut fibers which are few millimeters or centimeters long and are distributed throughout the traction projection $61_x$). The fibers $89_1$-$89_R$ may be implemented in various manners. For example, in some embodiments, the fibers $89_1$-$89_R$ may be polymeric fibers (e.g., aramid fibers, polyvinyl alcohol (PVA) fibers, etc.), bamboo fibers, metallic fibers, carbon fibers, glass fibers, etc.

Figure 34:
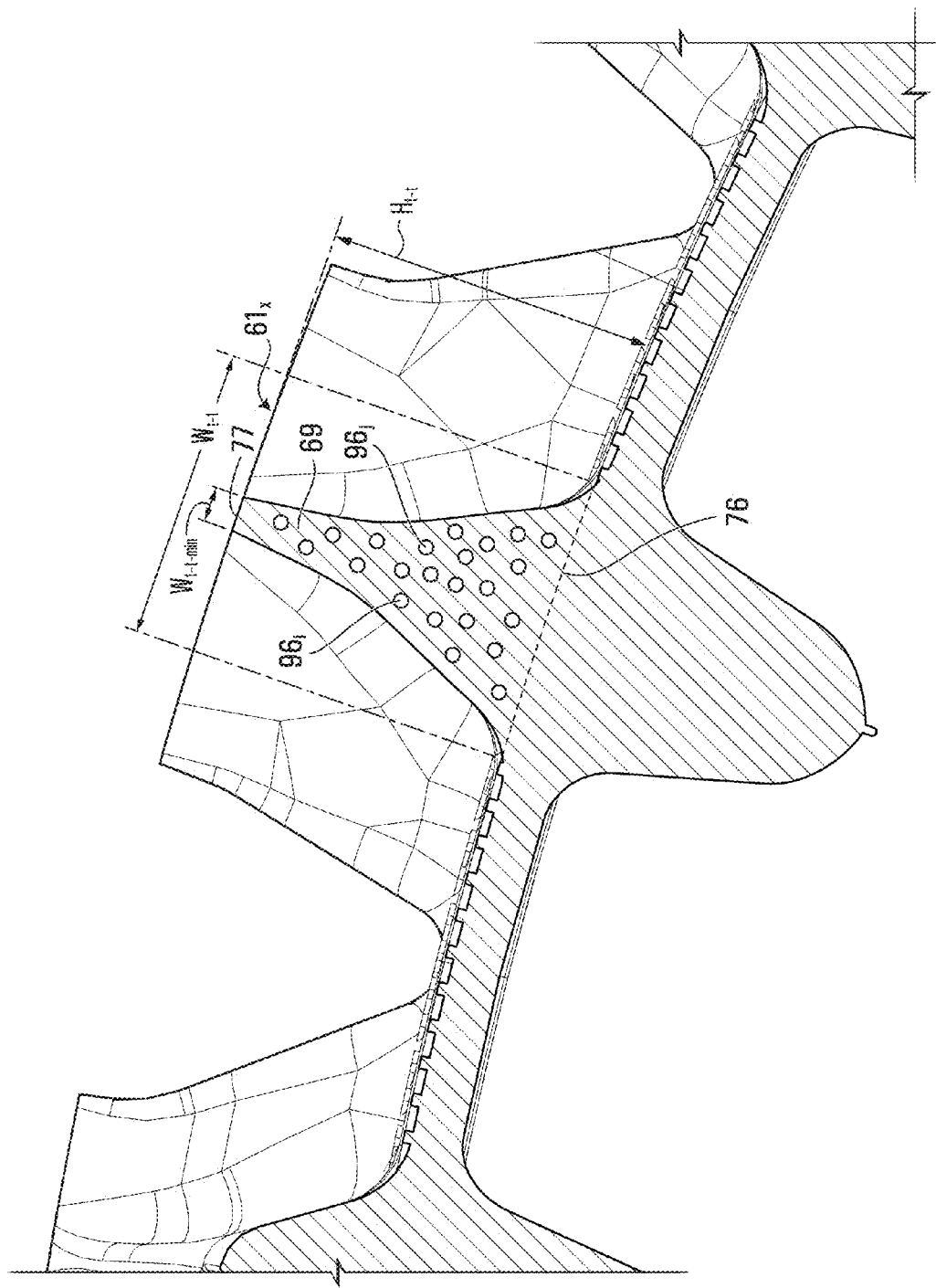
FIG. 34 shows a variant of the endless track in accordance with another embodiment of the invention in which a traction projection of the track comprises composite cellular elastomeric material.

As another example, in other embodiments, as shown in FIG. 34, the elastomeric material 69 of a traction projection $61_x$ may be cellular elastomeric material (e.g., cellular rubber) which contains cells (e.g., bubbles) $96_1$-$96_C$ created by introducing a gas (e.g., air) or a gas-producing agent (e.g., sodium bicarbonate) during manufacturing of the cellular elastomeric material 69 to reduce weight of the material. The cells $96_1$-$96_C$ of the cellular elastomeric material 69 may include closed cells and/or open cells.

Figure 35:
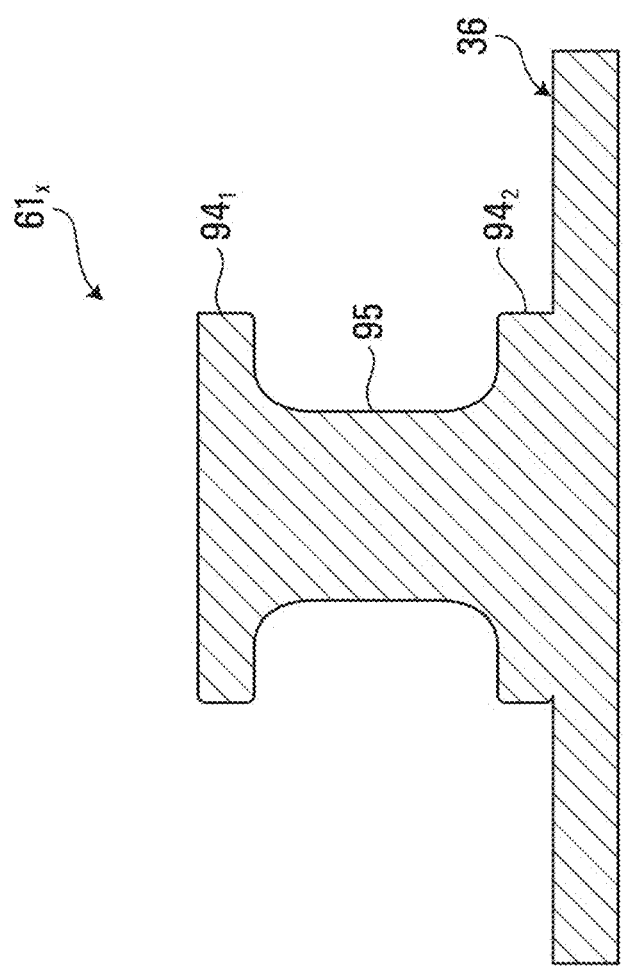
FIGS. 35 and 36 show variants of the endless track in accordance with other embodiments of the invention which depict examples of other shapes of a traction projection of the track.
Figure 36:
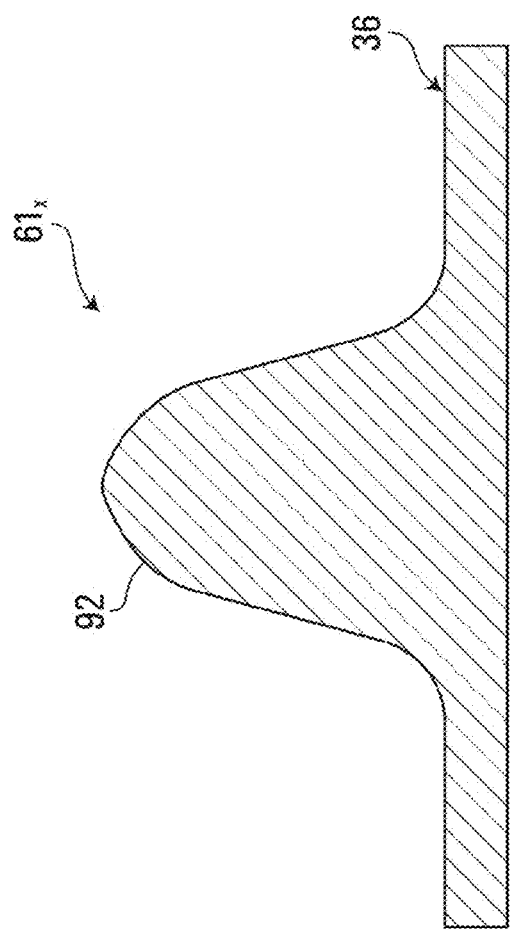

As another example, in other embodiments, the traction projections $61_1$-$61_M$ may have any other suitable shape. For example, in some embodiments, as shown in FIG. 35, the cross-section (e.g., of the transversal protrusion 55) of a traction projection $61_x$ may be a flanged cross-section, which includes one or more flanges and one or more webs, to increase its area moment of inertia $I_t$. For instance, in this embodiment, the cross-section of the traction projection $61_x$ is an I-shaped cross-section with top and bottom flanges $94_1$, $94_2$ and a web 95. As another example, in some embodiments, as shown in FIG. 36, the cross-section (e.g., of the transversal protrusion 55) of a traction projection $61_x$ may have a generally convex outer surface 92 which may help to promote gradual pressure variation and thus reduce stress concentration when the track 41 is on certain types of ground surfaces, such as compacted snow, similar to what was discussed above.

Figure 37:
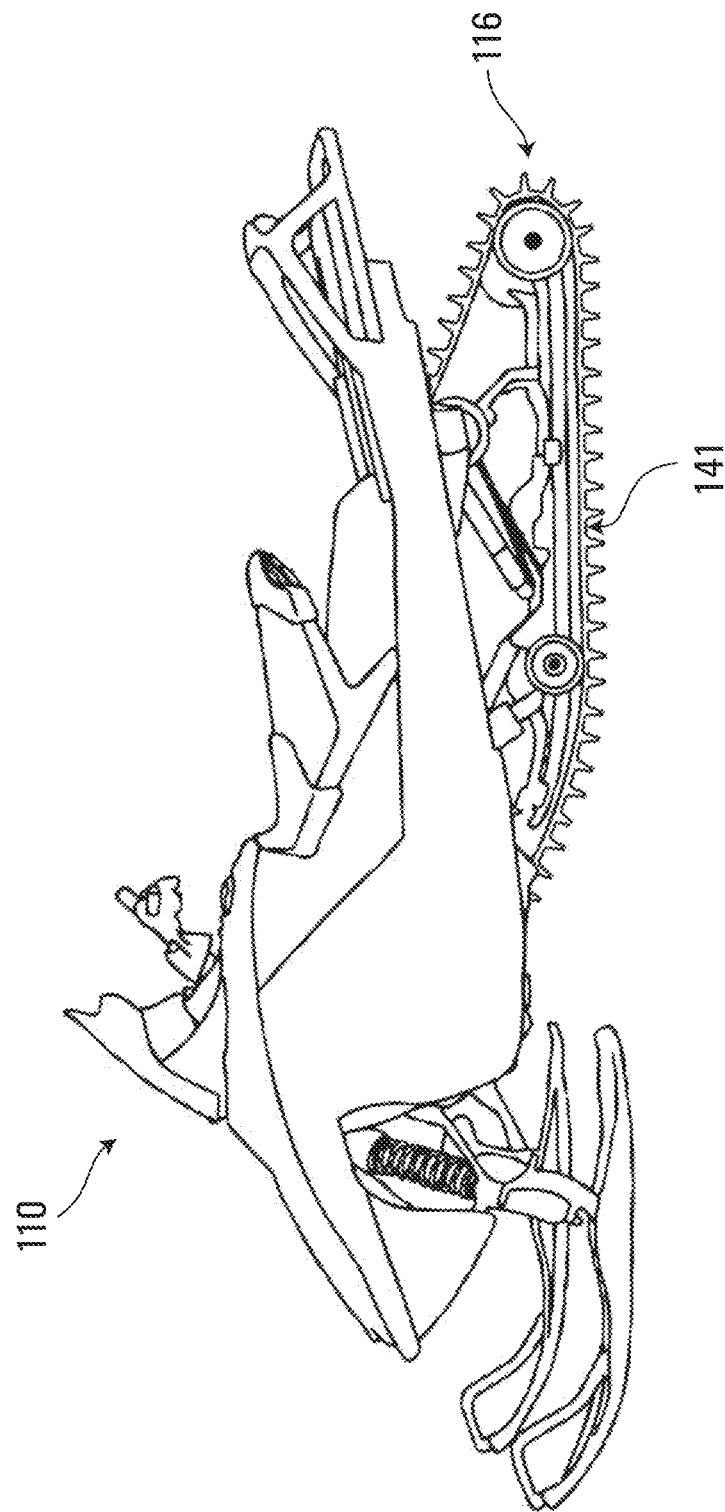
FIG. 37 shows an example of a snowmobile comprising an elastomeric endless track in accordance with another embodiment of the invention.

While in this embodiment the track assembly $16_i$ is part of an ATV, in other embodiments, a track assembly, including an endless track, constructed according to principles discussed herein may be used as part of track assemblies of other types of off-road vehicles. For example, in some embodiments, as shown in FIG. 37, an endless track 141 constructed according to principles discussed herein may be used as part of a track assembly 116 of a snowmobile 110.

The ATV 10 and the snowmobile 110 considered above are examples of recreational vehicles. While they can be used for recreational purposes, such recreational vehicles may also be used for utility purposes in some cases. Also, while these examples pertain to recreational vehicles, a track assembly, including an endless track, constructed according to principles discussed herein may be used as part of track assemblies of off-road vehicles other than recreational ones.

Any feature of any embodiment discussed herein may be combined with any feature of any other embodiment discussed herein in some examples of implementation.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. An endless track for traction of an off-road vehicle, the endless track being mountable around a plurality of track-contacting wheels which includes a drive wheel for driving the endless track, the endless track comprising elastomeric material allowing the endless track to flex around the track-contacting wheels, the endless track comprising:
   an inner side for facing the track-contacting wheels; and
   a ground-engaging outer side for engaging the ground, the ground-engaging outer side comprising a plurality of traction projections distributed along a longitudinal direction of the endless track, each traction projection of the plurality of traction projections comprising:
   a transversal protrusion extending transversally to the longitudinal direction of the endless track;
   a first enlarged protrusion larger in the longitudinal direction of the endless track than the transversal protrusion of the traction projection; and
   a second enlarged protrusion larger in the longitudinal direction of the endless track than the transversal protrusion of the traction projection, the first enlarged protrusion and the second enlarged protrusion of the traction projection being spaced apart in a widthwise direction of the endless track, the first enlarged protrusion of the traction projection being larger in the longitudinal direction of the endless track than the second enlarged protrusion of the traction projection.

2. The endless track claimed in claim 1, wherein a given one of the first enlarged protrusion and the second enlarged protrusion of the traction projection is elongated such that a longitudinal axis of the given one of the first enlarged protrusion and the second enlarged protrusion of the traction projection extends transversally to a longitudinal axis of the traction projection.

3. The endless track claimed in claim 2, wherein the longitudinal axis of the given one of the first enlarged protrusion and the second enlarged protrusion of the traction projection is substantially parallel to the longitudinal direction of the endless track.

4. The endless track claimed in claim 1, wherein a given one of the first enlarged protrusion and the second enlarged protrusion of a first one of the traction projections and a given one of the first enlarged protrusion and the second enlarged protrusion of a second one of the traction projections which succeeds the first one of the traction projections in the longitudinal direction of the endless track are aligned with one another in the widthwise direction of the endless track.

5. The endless track claimed in claim 1, wherein the first enlarged protrusion of a first one of the traction projections and the second enlarged protrusion of a second one of the traction projections are aligned with one another in the widthwise direction of the endless track.

6. The endless track claimed in claim 5, wherein the second enlarged protrusion of the first one of the traction projections and the first enlarged protrusion of the second one of the traction projections are aligned with one another in the widthwise direction of the endless track.

7. The endless track claimed in claim 1, wherein the first enlarged protrusion of a first one of the traction projections and the first enlarged protrusion of a second one of the traction projections overlap in the longitudinal direction of the endless track.

8. The endless track claimed in claim 1, wherein the transversal protrusion of the traction projection comprises a first lateral portion between a first lateral edge of the endless track and the first enlarged protrusion of the traction projection, a central portion between the first enlarged protrusion and the second enlarged protrusion of the traction projection, and a second lateral portion between a second lateral edge of the endless track and the second enlarged protrusion of the traction projection.

9. The endless track claimed in claim 1, wherein the transversal protrusion has a width in the longitudinal direction of the endless track, the first enlarged protrusion has a width in the longitudinal direction of the endless track, and a ratio of the width of the first enlarged protrusion over the width of the transversal protrusion is at least 2.

10. The endless track claimed in claim 1, wherein the traction projection has a maximum width in the longitudinal direction of the endless track and a minimum width in the longitudinal direction of the endless track, and a ratio of the maximum width of the traction projection over the minimum width of the traction projection is at least 2.

11. The endless track claimed in claim 1, wherein a ratio of (i) a width of the first enlarged protrusion of a first one of the traction projections in the longitudinal direction of the endless track over (ii) a longitudinal spacing of the first one of the traction projections and a second one of the traction projections which succeeds the first one of the traction projections in the longitudinal direction of the endless track is at least 0.8.

12. The endless track claimed in claim 11, wherein the ratio of (i) the width of the first enlarged protrusion of the first one of the traction projections over (ii) the longitudinal spacing of the first one of the traction projections and the second one of the traction projections is at least 0.9.

13. The endless track claimed in claim 12, wherein the ratio of (i) the width of the first enlarged protrusion of the first one of the traction projections over (ii) the longitudinal spacing of the first one of the traction projections and the second one of the traction projections is at least 1.

14. The endless track claimed in claim 1, wherein a ratio of (i) a dimension of a longitudinal gap between a given one of the first enlarged protrusion and the second enlarged protrusion of a first one of the traction projections and a given one of the first enlarged protrusion and the second enlarged protrusion of a second one of the traction projections which succeeds the first one of the traction projections in the longitudinal direction of the endless track over (ii) a dimension of a largest longitudinal gap between the first one of the traction projections and the second one of the traction projections is no more than 0.4.

15. The endless track claimed in claim 1, wherein a ratio of (i) a dimension of a smallest longitudinal gap between a first one of the traction projections and a second one of the traction projections which succeed one another in the longitudinal direction of the endless track over (ii) a dimension of a largest longitudinal gap between the first one of the traction projections and the second one of the traction projections is no more than 0.4.

16. The endless track claimed in claim 1, wherein the ground-engaging outer side comprises a plurality of traction-projection-free areas between respective ones of the traction projections which succeed one another in the longitudinal direction of the endless track, the first enlarged protrusion and the second enlarged protrusion of a first one of the traction projections and the first enlarged protrusion and the second enlarged protrusion of a second one of the traction projections imparting a deviation of a flex zone of the traction-projection-free area between the first one of the traction projections and the second one of the traction projections such that a centerline of the flex zone is not parallel to a widthwise direction of the endless track.

17. The endless track claimed in claim 1, wherein a longitudinal gap between the first enlarged protrusion of a first one of the traction projections and the second enlarged protrusion of a second one of the traction projections which succeeds the first one of the traction projections in the longitudinal direction of the endless track and a longitudinal gap between the second enlarged protrusion of the first one of the traction projections and the first enlarged protrusion of the second one of the traction projections are nonaligned in the longitudinal direction of the endless track such that there is a longitudinal offset between a center of the longitudinal gap between the first enlarged protrusion of the first one of the traction projections and the second enlarged protrusion of the second one of the traction projections and a center of the longitudinal gap between the second enlarged protrusion of the first one of the traction projections and the first enlarged protrusion of the second one of the traction projections.

18. The endless track claimed in claim 17, wherein a ratio of (i) the longitudinal offset between the center of the longitudinal gap between the first enlarged protrusion of the first one of the traction projections and the second enlarged protrusion of the second one of the traction projections and the center of the longitudinal gap between the second enlarged protrusion of the first one of the traction projections and the first enlarged protrusion of the second one of the traction projections over (ii) a dimension of a largest longitudinal gap between the first one of the traction projections and the second one of the traction projections is at least 0.1.

19. The endless track claimed in claim 1, wherein the plurality of track-contacting wheels includes a plurality of roller wheels for rolling on the bottom run of the endless track along a rolling path of the inner side of the endless track, and a given one of the first enlarged protrusion and the second enlarged protrusion of the traction projection is aligned with the rolling path in a widthwise direction of the endless track.

20. The endless track claimed in claim 19, wherein the given one of the first enlarged protrusion and the second enlarged protrusion of the traction projection has a width in the longitudinal direction of the endless track, a given one of the roller wheels positioned to roll along the rolling path has a diameter, and a ratio of the width of the given one of the first enlarged protrusion and the second enlarged protrusion of the traction projection over the diameter of the given one of the roller wheels is at least 0.3.

21. The endless track claimed in claim 19, wherein a ratio of (i) a dimension of a longitudinal gap between the first enlarged protrusion of a first one of the traction projections and the second enlarged protrusion of a second one of the traction projections which succeeds the first one of the traction projections in the longitudinal direction of the endless track over (ii) a diameter of a given one of the roller wheels positioned to roll along the rolling path is no more than 0.15.

22. The endless track claimed in claim 1, wherein the plurality of track-contacting wheels includes a first plurality of roller wheels for rolling on the bottom run of the endless track along a first rolling path of the inner side of the endless track and a second plurality of roller wheels for rolling on the bottom run of the endless track along a second rolling path of the inner side of the endless track, the first rolling path and the second rolling path being spaced apart in the widthwise direction of the endless track, the first enlarged protrusion of the traction projection being aligned with the first rolling path in the widthwise direction of the endless track and the second enlarged protrusion of the traction projection being aligned with the second rolling path in the widthwise direction of the endless track.

23. The endless track claimed in claim 22, wherein the first enlarged protrusion and the second enlarged protrusion of the traction projection are offset in the widthwise direction of the endless track towards a lateral edge of the endless track.

24. The endless track claimed in claim 23, wherein the lateral edge of the endless track is an inboard lateral edge of the endless track.

25. The endless track claimed in claim 1, wherein a cross-section of the traction projection tapers in a thickness direction of the endless track.

26. The endless track claimed in claim 1, wherein a cross-section of the traction projection has a width in the longitudinal direction of the endless track and a minimal dimension in the longitudinal direction of the endless track that is less than the width of the cross-section of the traction projection.

27. The endless track claimed in claim 26, wherein a ratio of the width of the cross-section of the traction projection over the minimal dimension of the cross-section of the traction projection in the longitudinal direction of the endless track is at least 4.

28. The endless track claimed in claim 26, wherein the cross-section of the traction projection has a height, and a ratio of the height of the cross-section of the traction projection over the minimal dimension of the cross-section of the traction projection in the longitudinal direction of the endless track is at least 6.

29. The endless track claimed in claim 1, wherein a ratio of (i) a bending stiffness of the traction projection in a widthwise direction of the endless track over (ii) a cross-sectional weight per unit length of the traction projection at a cross-section of the traction projection is at least 5000 in3.

30. The endless track claimed in claim 29, wherein the ratio of (i) the bending stiffness of the traction projection in the widthwise direction of the endless track over (ii) the cross-sectional weight per unit length of the traction projection at the cross-section of the traction projection is at least 5200 in3.

31. The endless track claimed in claim 30, wherein the ratio of (i) the bending stiffness of the traction projection in the widthwise direction of the endless track over (ii) the cross-sectional weight per unit length of the traction projection at the cross-section of the traction projection is at least 5400 in3.

32. The endless track claimed in claim 1, wherein the transversal protrusion of the traction projection is generally straight.

33. The endless track claimed in claim 1, wherein the traction projection extends across at least a majority of a width of the endless track.

34. The endless track claimed in claim 33, wherein the traction projection extends across substantially an entirety of the width of the endless track.

35. The endless track claimed in claim 1, wherein the endless track is free of transversal stiffening rods extending transversally to the longitudinal direction of the endless track.

36. The endless track claimed in claim 1, wherein the traction projection comprises a recess extending from an outer end of the traction projection.

37. The endless track claimed in claim 36, wherein the recess of a first one of the traction projections is located such that a second one of the traction projections has no recess aligned with the recess of the first one of the traction projections in the widthwise direction of the endless track.

38. The endless track claimed in claim 36, wherein a ratio of a depth of the recess of the traction projection over an overall height of the traction projection is at least 0.15.

39. The endless track claimed in claim 1, wherein, when the traction projection engages snow, an outer end portion of the transversal protrusion flexes relative to a base portion of the transversal protrusion.

40. The endless track claimed in claim 1, wherein the plurality of track-contacting wheels includes a plurality of roller wheels for rolling on the bottom run of the endless track along a rolling path of the inner side of the endless track, and a rigidity of the bottom run of the endless track in the longitudinal direction of the endless track tending to prevent the bottom run of the endless track from flexing inwardly in a gap between adjacent ones of the roller wheels.

41. The endless track claimed in claim 1, wherein the endless track is a snowmobile track or an ATV track.

* * * * *